July 28, 1953

I. MOLNAR 2,647,249

SPACE RESERVATION SYSTEM

Filed Dec. 30, 1948

INVENTOR.
IMRE MOLNAR

BY

ATTORNEY

SENDER

INVENTOR.
IMRE MOLNAR

July 28, 1953

I. MOLNAR 2,647,249

SPACE RESERVATION SYSTEM

Filed Dec. 30, 1948

INVENTOR.
IMRE MOLNAR

BY

ATTORNEY

July 28, 1953     I. MOLNAR     2,647,249
SPACE RESERVATION SYSTEM
Filed Dec. 30, 1948     31 Sheets-Sheet 23

*INVENTOR.*
IMRE MOLNAR
BY
ATTORNEY

July 28, 1953     I. MOLNAR     2,647,249
SPACE RESERVATION SYSTEM
Filed Dec. 30, 1948     31 Sheets-Sheet 25
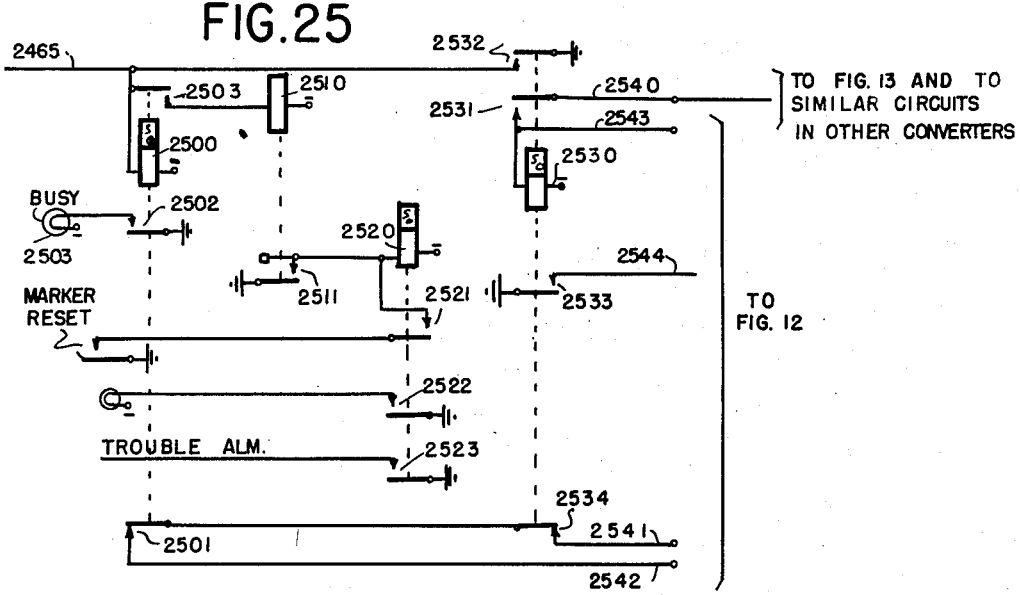
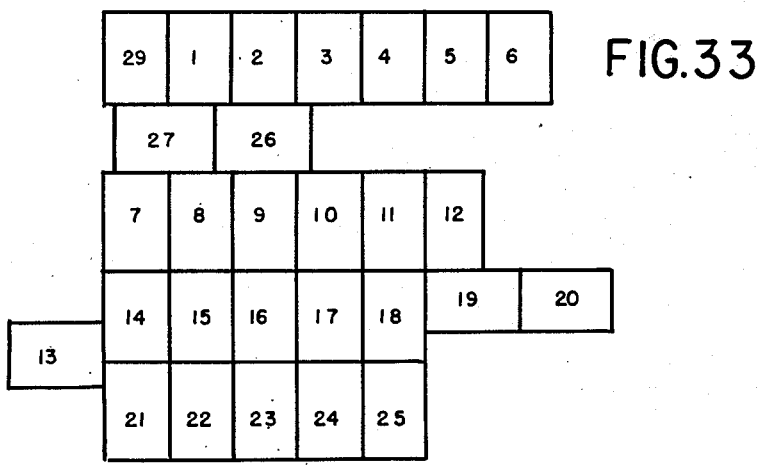
*INVENTOR.*
IMRE MOLNAR
BY
ATTORNEY

INVENTOR.
IMRE MOLNAR
BY
ATTORNEY

July 28, 1953     I. MOLNAR     2,647,249
SPACE RESERVATION SYSTEM
Filed Dec. 30, 1948     31 Sheets-Sheet 27
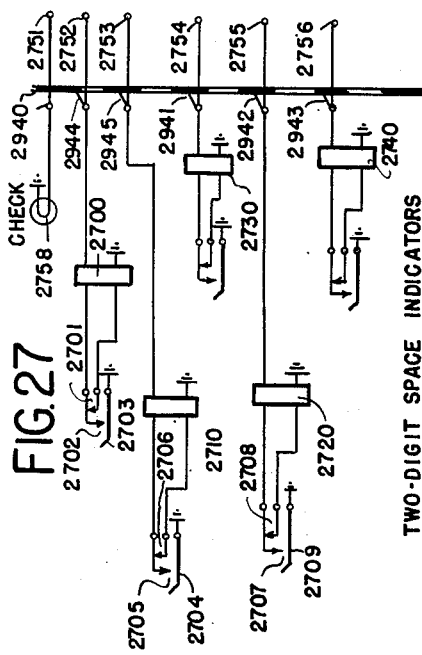
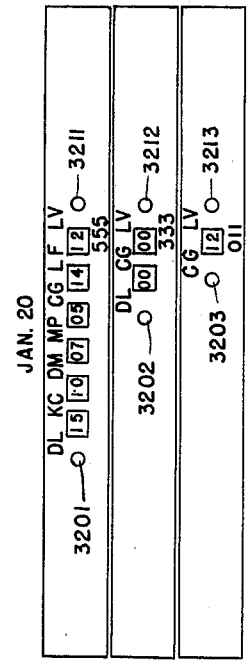
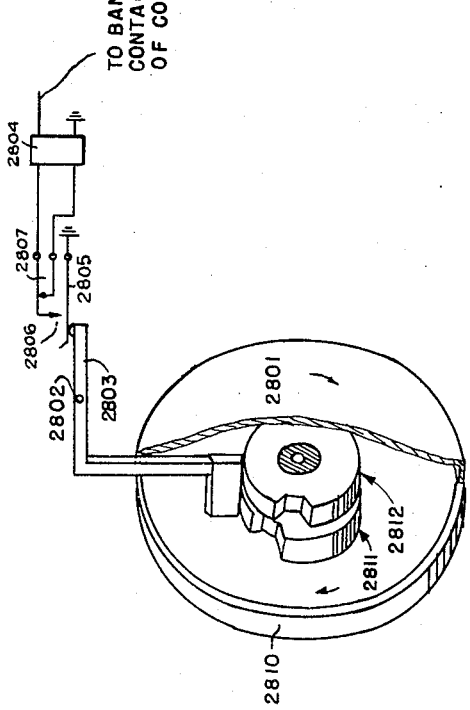
*INVENTOR.*
IMRE MOLNAR
BY
ATTORNEY

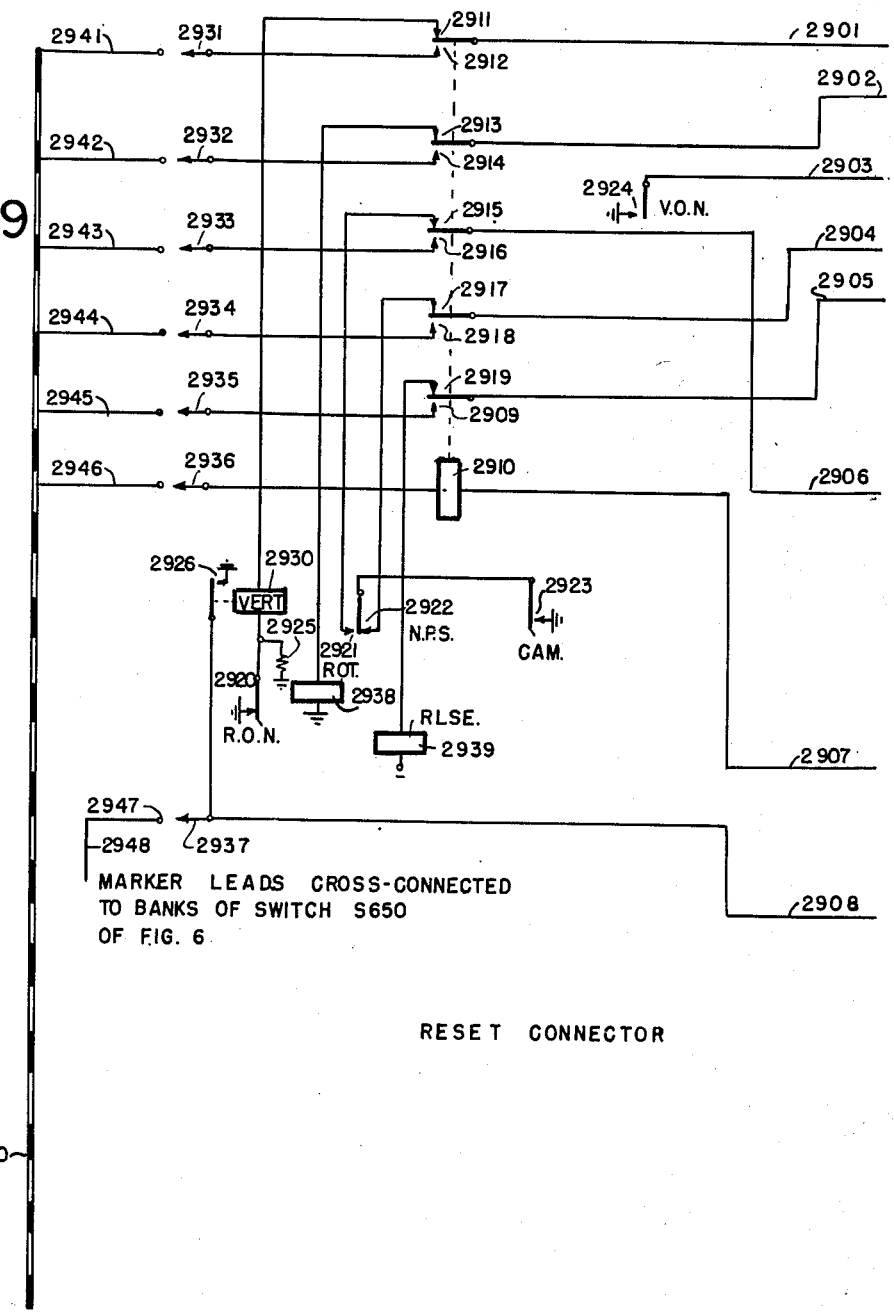

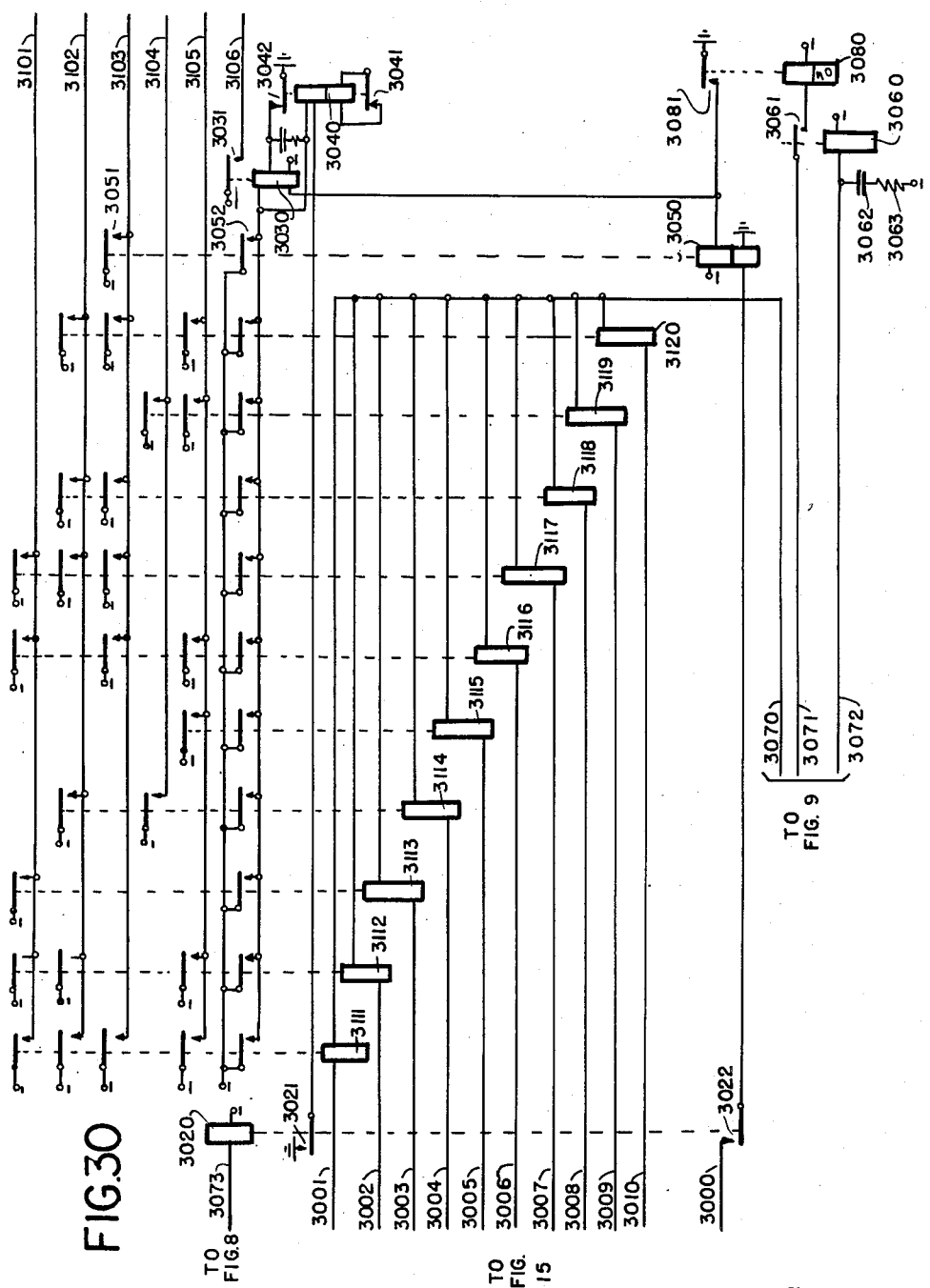

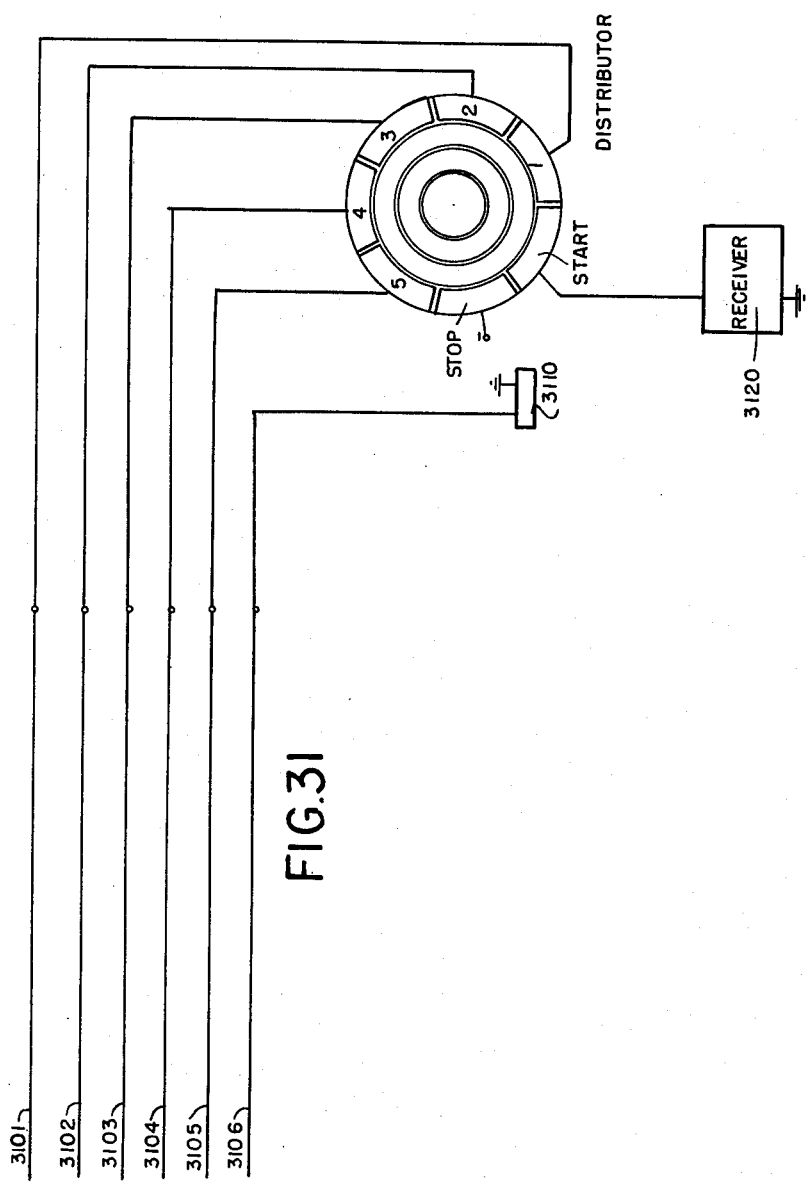

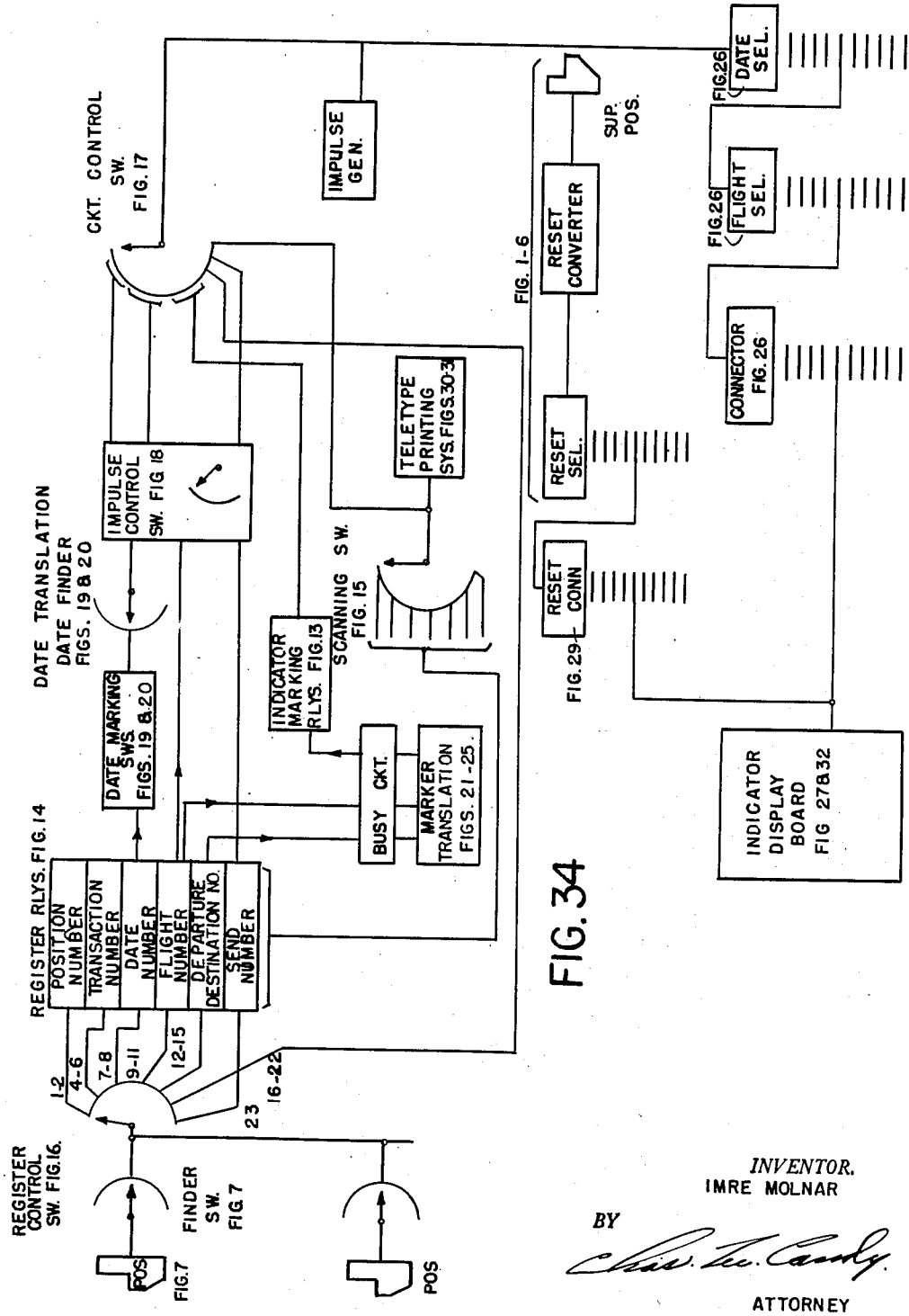

Patented July 28, 1953

2,647,249

UNITED STATES PATENT OFFICE 2,647,249

SPACE RESERVATION SYSTEM

Imre Molnar, Chicago, Ill., assignor to Automatic Electric Laboratories, Inc., Chicago, Ill., a corporation of Delaware Application December 30, 1948, Serial No. 68,273

32 Claims. (Cl. 340—153)

The present invention is a space reservation system which facilitates the registering and recording of seat or space reservations. The particular preferred system described herewith is adapted for use at an air line office in which it is desirable to have all of the reservations which are made by reservation clerks registered locally at a common display panel, and in addition to have complete information of the reservations recorded automatically and quickly at distant offices.

The display panel contains a space indicator for each stop in each flight to indicate the number of spaces available for reservation. The indicators are arranged in rows corresponding to flights, and the rows are arranged in groups corresponding to dates. The indicators corresponding to the stops of a flight for which reservations are requested are selected by operating keys at any one clerk's position to register the date of reservation, flight number, city of departure, and destination. After the correct row of space indicators has been selected to indicate the date and flight desired, the indicators corresponding to the stops between the city of departure and the city of destination are operated to subtract from the previously displayed number of unreserved spaces.

The information is recorded at the local office and at distant offices and includes the transaction number, the office making the reservation, the date and flight number, city of departure, city of destination, and the number of spaces requested.

The principal object of the present invention is to provide a system for enabling reservation clerks to make space reservations.

Another object of the invention is to notify a supervisor and to disable a clerk's operating position when that clerk attempts to reserve a number of seats in excess of the available seats in a selected flight.

Another object is to store the information by electrical means and to check that information before it is transmitted to the display board.

Still another object is to make automatically permanent records of the information at the local office and at the distant offices immediately after the reservation has been completed.

Another object is to register and record cancellations.

A feature of the invention is the means for selecting a plurality of space indicators at one time and for enabling the operating circuits of the desired ones of the selected indicators.

Another feature is the means for automatically resetting the space indicators to display the total number of spaces available on the corresponding flights before any reservations are registered.

Another feature is the circuit arrangement for translating two digits of a calendar date to connect a clerk's position to the particular circuits for controlling indicators assigned to that date. Means are provided for manually resetting circuits to translate each new date for which reservations are made into the correct code corresponding to the group of indicators assigned to that date.

Another feature is the means under control of the supervisor's equipment for automatically resetting either the indicators corresponding to a flight or a group of indicators corresponding to a date.

Still another feature limits the number of reservations that a clerk may register in one transaction. A supervisor, however, may register a greater number of reservations in one operation. Other features of the invention will become apparent upon perusal of the following description taken in conjunction with the accompanying drawings arranged as shown in Figure 33.

Fig. 34 is a schematic one line diagram of the system and shows briefly the interconnections of the circuits controlled by a reservation clerk to operate space indicators and to make a permanent record on a "Teletype" printing system. A finder switch connects a clerk's position to a local converter circuit which includes a register control switch, register relays, indicator marking relays, a date finder, a circuit control switch, an impulse generator, an impulse control switch, and a scanning switch. After the converter circuit has been been connected to a clerk's position, digits are stored on the register relays to control selectors and connectors for selecting a group of space indicators, for operating certain indicators in the selected group, and subsequently for controlling a "Teletype" printing system. Fig. 34 also shows the circuit interconnections between a supervisor's position and the space indicators for resetting the indicators.

Figs. 1 to 6 inclusive show circuits of a reset converter and a reset selector which are controlled from a supervisor's position. Usually, only one reset converter is required for an office.

Figs. 19 and 20 show thirty-one date marking switches which are common to a group of regular converters.

Figs. 21 to 25 show marking circuits which are accessible to the regular converters, and which are seized only momentarily for operating certain indicator marking relays of Fig. 13.

Fig. 27 shows the circuits of a group of two-digit space indicators. The indicators are accessible through connector circuits such as shown in Fig. 26.

Fig. 28 shows an arrangement for operating the off-normal springs of an indicator.

Fig. 29 shows one of a number of reset connectors which are accessible to the reset selector. The connectors have access to the space indicators.

Figs. 30 and 31 show circuits for connecting standard "Teletype" printing systems to the regular converter circuits.

Figure 1:
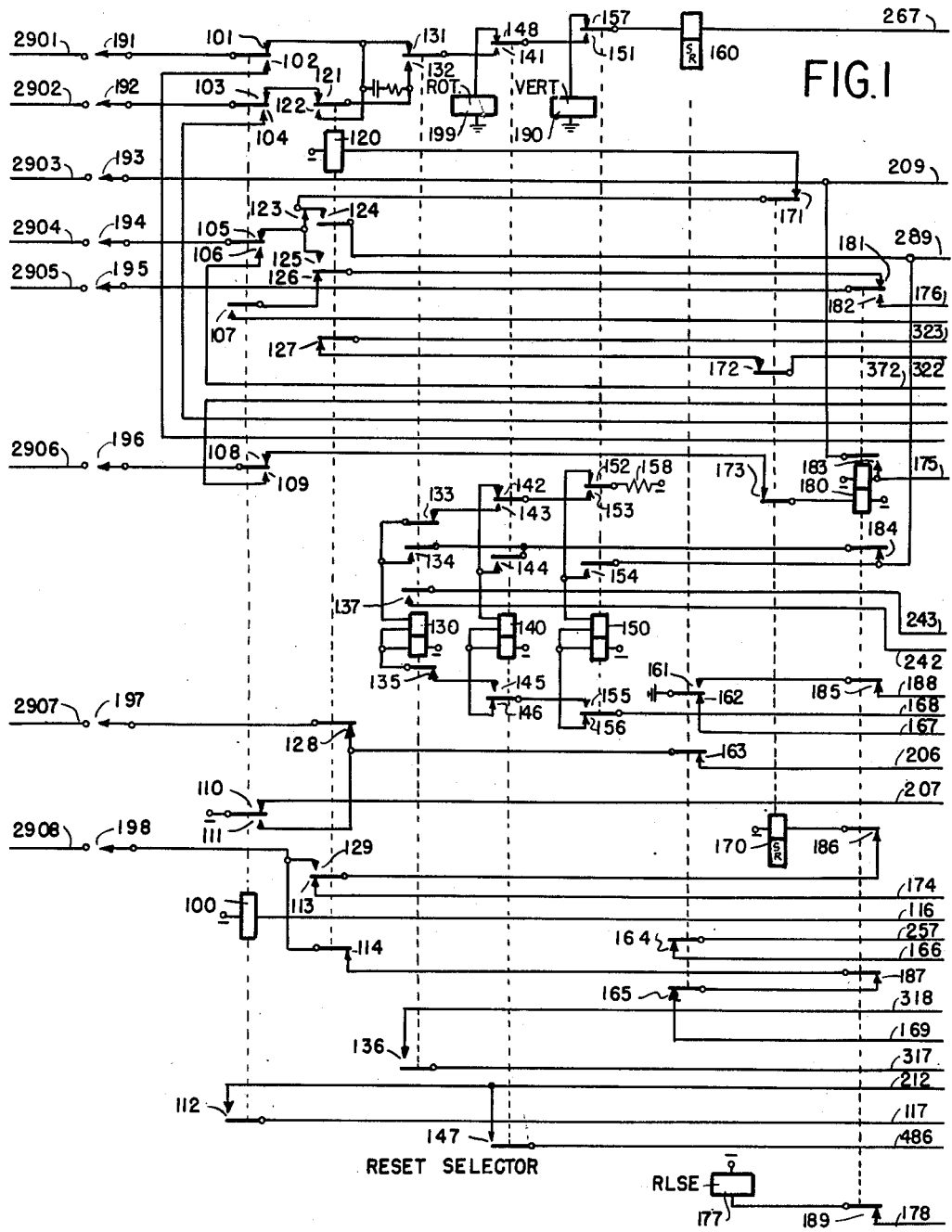

Finally, Fig. 32 shows a portion of the display board upon which are mounted the two-digit space indicators.

Display board

In the present system, the number of available reservations are displayed for flights that are scheduled for a period of ten days. Two-digit space indicators are arranged in horizontal rows corresponding to flights, and the rows are arranged in groups according to dates. A portion of a panel for one date is shown in Fig. 32 in which indicators for the three flights 555, 333, and 011 are shown. Six indicators, a red busy lamp 3201, and a check lamp 3211 are shown for flight 555; two indicators, a busy lamp 3202, and a check lamp 3212 for flight 333; and a busy lamp 3203, and check lamp 3213, and only one indicator, for flight 011 which has but two terminal stops. The stops are designated by code letters such as DL and KC of flight 555. As shown, fifteen unreserved spaces are available between the stop DL and the stop KC, the space indicator disposed directly below the space separating these code designations therefore displays "15." As shown for flight 333, all spaces have been previously reserved for this particular date and the indicators display "00."

Two-digit space indicator

The two-digit space indicator shown schematically in Fig. 28 comprises a tens digit-wheel 2810, a units digit-wheel 2801, a stepping magnet 2804, off-normal springs 2805, and cams 2811 and 2812. Cam 2811 is operated with digit-wheel 2810, and cam 2812 is operated with digit-wheel 2801. Each of the cams has one notch, the notches being in alignment while the display is being changed from "00" to "99." The lever arm 2803, which is pivoted at point 2802 bears against both cams, and operates when the notches are aligned. The indicator is operated in response to each deenergization of the stepping magnet 2804 to display a number one less than that previously displayed. Normally, contacts 2806 of the off-normal springs are open, and contacts 2807 are closed to connect the windings of the stepping magnet in series. However when the digit-wheels are rotated simultaneously to change the display from "00" to "99," off-normal springs 2805 are momentarily operated by arm 2803 to close contacts 2806 and open contacts 2807. At contacts 2807, the lower winding of magnet 2804 is disconnected from the upper winding and at contacts 2806 the upper winding is connected directly to ground potential. The upper winding is connected directly to ground potential to operate a marginal relay in an impulsing circuit as subsequently described.

Reset connector and reset converter circuits

Circuits for resetting the indicators of Fig. 27 are shown in Figs. 1 to 6, inclusive, and in Fig. 29. By a simple operation, a supervisor may reset all indicators for one day, or, if desired, the supervisor may reset the space indicators that are included in only one flight. The indicators are accessible to a reset connector such as illustrated in Fig. 29. The number of reset connectors required is determined by the number of space indicators in the system. The reset connectors are accessible to the reset selector switch of Fig. 1. In a reasonably large system only one selector is required. The relays and circuits shown in Figs. 1 to 6, inclusive, all of which taken together, constitute the reset converter and reset selector, show the control of the selector switch and the connector switch, thereby, to select particular groups of space indicators, and, also, to transmit impulses to the selected space indicators.

The connector switch of Fig. 29 is a Strowger, step-by-step, two-motion switch having seven wipers, 2931 to 2937 inclusive; a vertical magnet 2930; a rotary magnet 2938; and a release magnet 2939. The switch also includes interrupter springs 2925 operated by the vertical magnet, vertical off-normal springs 2924 which are operated in the first vertical step of the wipers, cam springs 2923 which are operated on the eleventh rotary step on any level, and normal post springs N. P. S. which are operated on the eleventh rotary step when the wipers are at the tenth level only. In addition to the switch, the connector circuit includes connect relay 2910 to connect impulsing circuits to a group of five space indicators after they have been selected by the connector switch.

Figure 2:
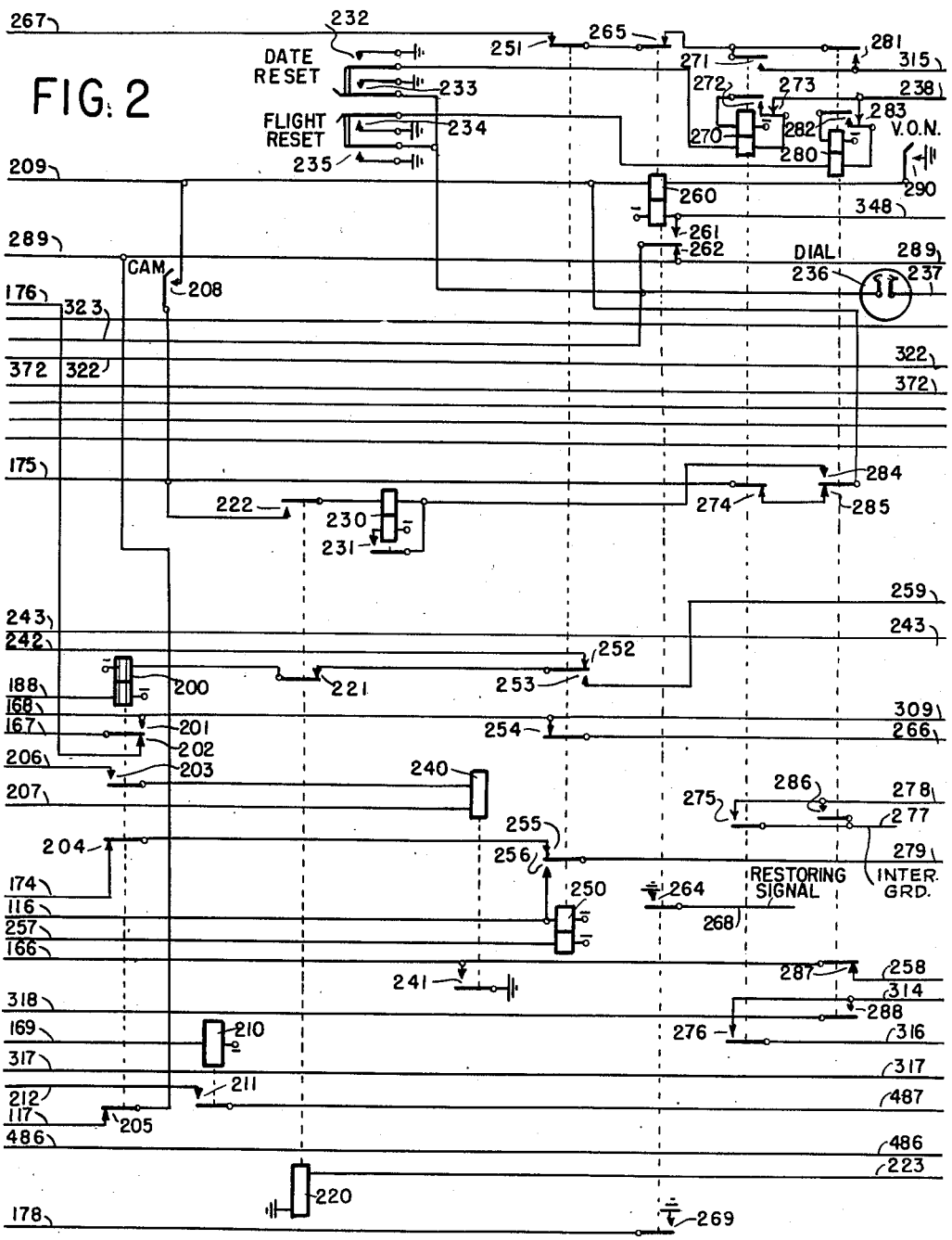
Figure 3:
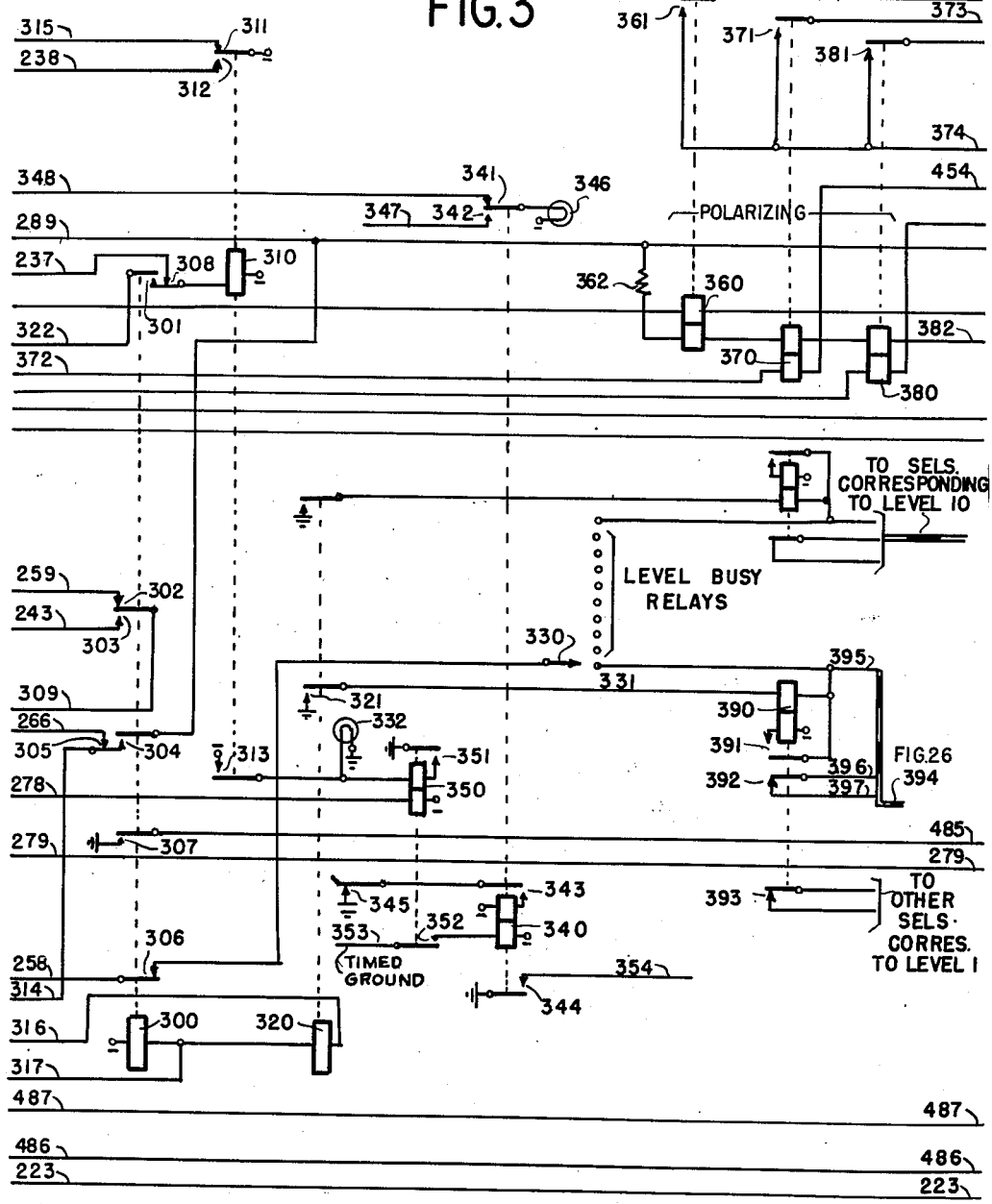
Figure 4:
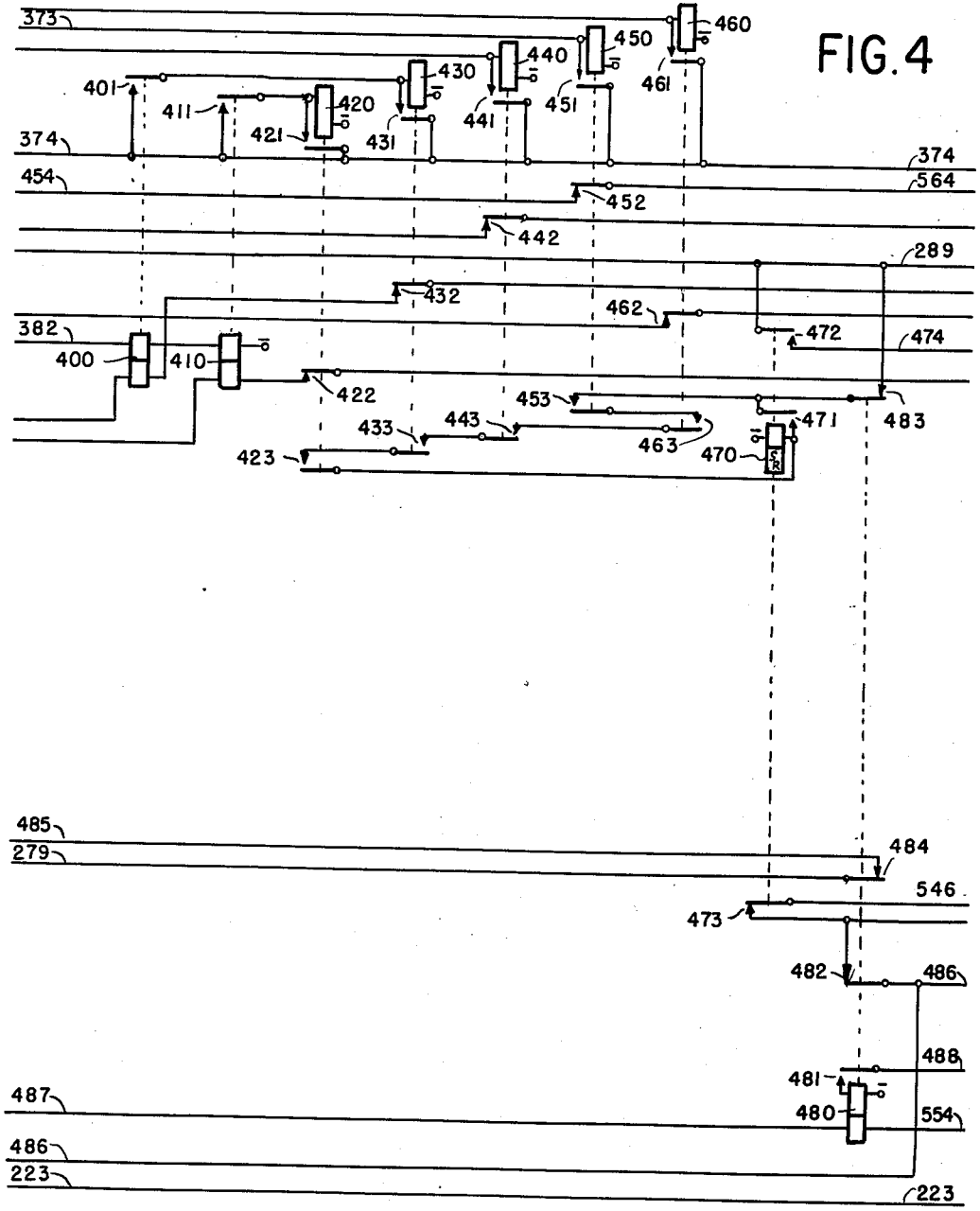

The selector switch is a Strowger switch having eight wipers, 191 to 198, a vertical stepping magnet 190; a rotary stepping magnet 199; a release magnet 177; vertical off-normal springs 290 shown at the right of Fig. 2; and cam springs 208 which operate when the wipers are rotated to the eleventh position at the tenth level.

The selector switch also has a vertical wiper 330 (Fig. 3) which is operated in a vertical step-by-step manner by the vertical magnet to engage successive vertical bank contacts associated therewith.

The resetting of the indicators is controlled from the supervisor's position by the Date Reset and Flight Reset keys, and by the dial 236 of Fig. 2. Relay 270 operates in response to the operation of the Date Reset key to condition the converter circuits for subsequently resetting all indicators for a date; or relay 280 operates in response to the operation of the Flight Reset key to condition the converter circuits for resetting only those indicators associated with a selected flight. In response to the operation of dial 236, impulsing relay 310 of Fig. 3 operates to step vertically the wipers of the reset selector switch. One of the relays 130, 140, or 150 operate after each series of impulses to transfer the impulsing circuit to a different stepping magnet for rotating the wipers of the selector switch and for operating the connector switch to select a group of space indicators. Relays 160 and 200 are transfer-control relays which operate and release in response to each series of impulses to operate the transfer relays.

Figure 5:
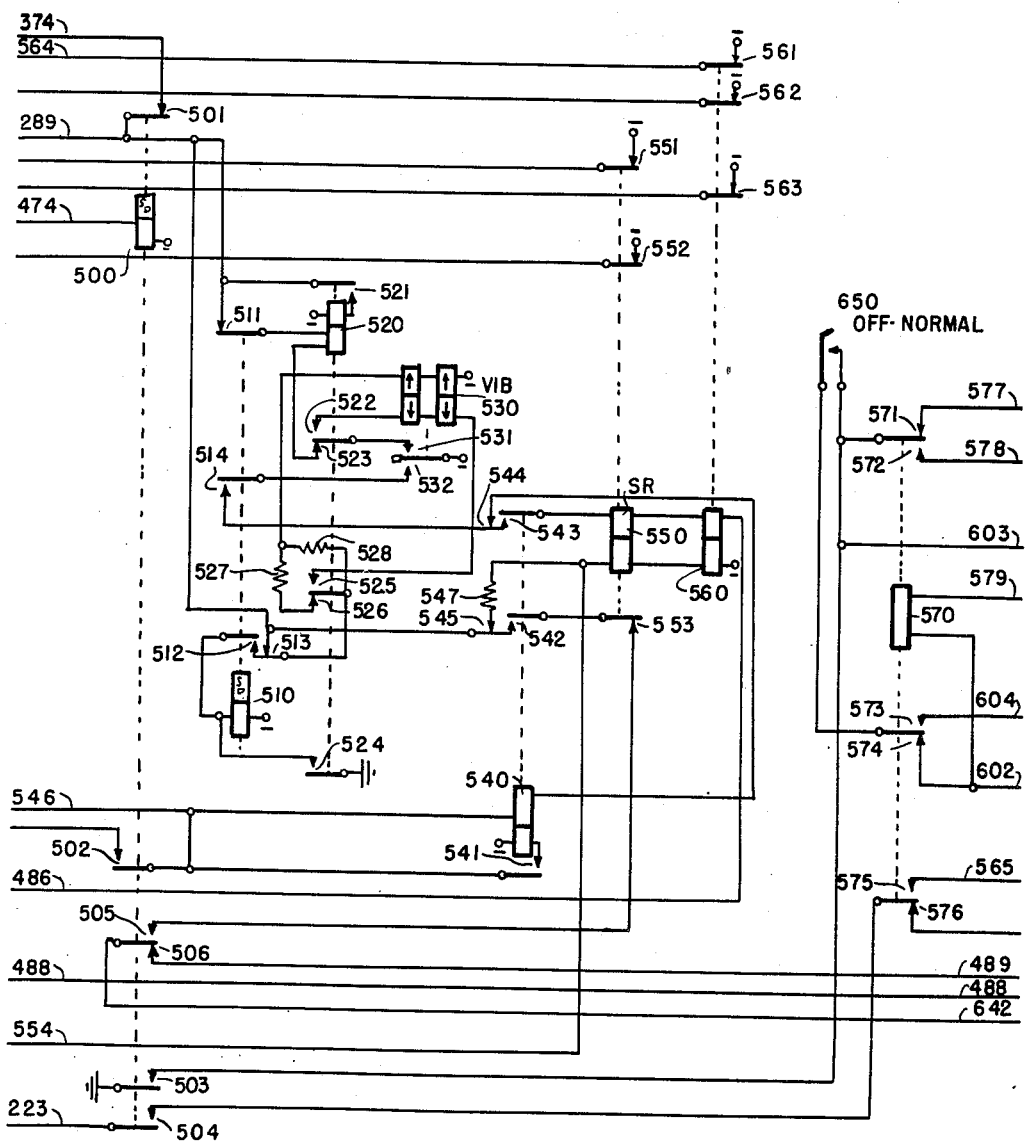
Figure 6:
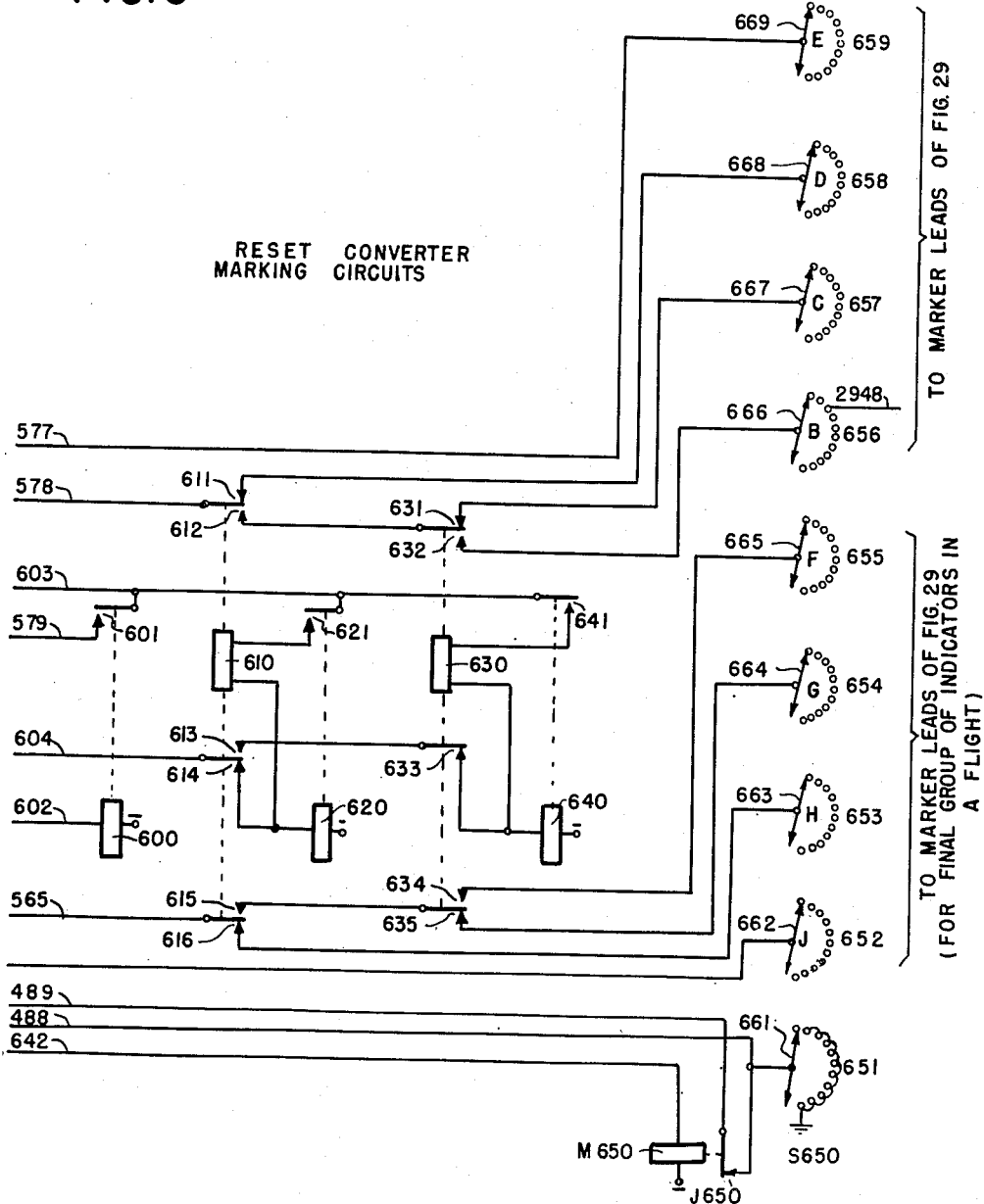

After a group of space indicators have been selected in response to the operation of the selector switch and one of the connector switches, cut-off relay 100 of Fig. 1, and pick-up relay 540 of Fig. 5 operate. Relay 540 operates for connecting impulsing relays 550 and 560 to contacts of vibrator 530. Relays 550 and 560 respond to the vibrator to interrupt circuits of the previously selected indicators. When each space indicator steps from "00" to "99," a corresponding one of the cut-off relays 360, 370, 380, 400 or 410 of Figs. 3 and 4, operates to complete a circuit for one of the relays 420, 430, 440, 450 or 460. The operation of one of the last mentioned relays disconnects the impulsing circuit from the corresponding indicator. When all of the impulsing circuits have been disconnected and the indicators in the group display "99," relays 470 and 500 operate, and reconnect the impulsing circuits to the indicators, and also completes a circuit to operate stepping magnet M650 of Fig. 6 for controlling the associated marking circuits. The reset converter marking circuits include relay 570 of Fig. 5, the relays of Fig. 6, and the ten level, 25 position rotary switch S650. The wipers 661 to 669 of switch S650 are advanced one step each time stepping magnet M650 is deenergized. Off-normal springs 650 are actuated once for each one-half revolution of the wipers 661 to 669 and the relays of the marking circuits are responsive to the operation of the off-normal springs for connecting different wipers to marking circuits for each one-half revolution. This arrangement permits a twenty-five position switch to be employed for testing successively 100 circuits in each of two groups of test circuits.

The indicators and the wipers of switch S650 step in unison until a marking circuit is completed through one of the wipers to operate cut-off relay 210. A marking circuit for terminating the transmission of impulses to each group of indicators that are not the final group for a flight is completed through one of the wipers 666 to 669; a marking circuit for a final group is completed through wipers 662 to 665. When the circuit is completed through the wipers 662 to 665, relay 220, in addition to relay 210, operates. Providing the Flight Reset key is operated, the converter circuits restore in response to the operation of relay 220, but if the Date Reset key is operated, relay 220 has no effect. Various relays, including relay 540, are released in response to the operation of relay 210; and in response to the releasing of relay 540, the transmission of impulses to the indicators is terminated. The previously selected indicators now display the number of unreserved spaces that are initially available in the corresponding flight.

After a group of five indicators have been reset, some of the previously operated relays restore, and then reoperate to rotate the wipers of the connector one step and to complete circuits for resetting a newly selected group of indicators. Furthermore, after all indicators accessible to one level of contacts have been reset, the wipers of the reset connector are automatically raised to a next level of bank contacts through the operation of cam springs CAM of Fig. 29, transfer relay 120, and slow-operating relay 170 of Fig. 1. After all indicators accessible to all levels of a reset connector have been reset, normal post springs N. P. S., and cam springs CAM of Fig. 29 are actuated to operate relay 180 of Fig. 1. In response to the operation of relay 180, transfer relays 130 and 140 restore, and a series of operations is initiated to rotate the wipers of the reset selector to a next set of contacts to select a new reset connector. A newly selected reset connector is operated to select successively all of the indicators accessible thereto. When all indicators for one date have been reset, the reset selector is operated to operate cam springs CAM of Fig. 2 to energize release relay 260. In response to the operation of relay 260, the operated switches and all operated relays except relays 260 and 270, are restored to normal and an audible alarm is given. Finally, the releasing of the Date Reset key restores relays 260 and 270.

*Circuits for registering transactions*

Figure 7:
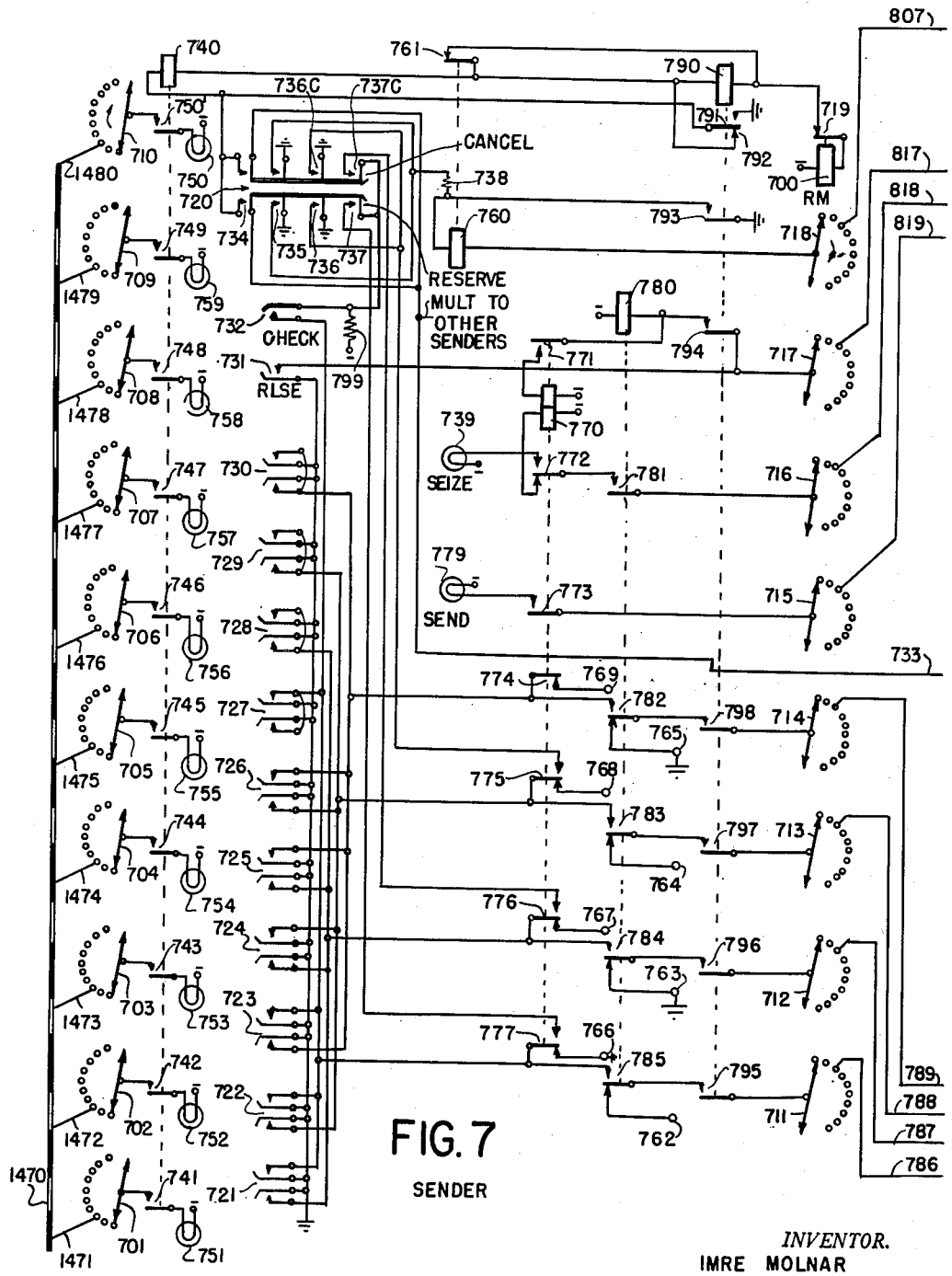
Fig. 7 shows a sender which is located at a reservation clerk's position, and a rotary finder switch which connects the sender to an idle regular converter.

Each of the reservation clerk's positions comprises a non-locking cancel-reserve key 720 of Fig. 7, ten non-locking digit keys 721-730, a release key 731, a check key 732, a seize lamp 739, and a send lamp 779. Moreover, ten digit check lamps 750-759 are located so that they may be viewed readily by the clerk.

In response to the operation of key 720 to either the cancel or to the reserve position, the finder switch of Fig. 7 operates to connect the circuits of the clerk's sender to circuits of an idle converter. The local converter comprises the equipment shown in Figures 8 to 20 and includes the register relays, the scanning switch, the register control switch, the circuit control switch, the impulse control switch, the date translating circuits, the date finder switch and the impulse generator. The finder switch is a rotary stepping switch having eighteen levels of contacts accessible to wipers 701-718, respectively. The stepping magnet 700 and interrupter springs 719 cooperate to rotate the wipers.

Figure 8:
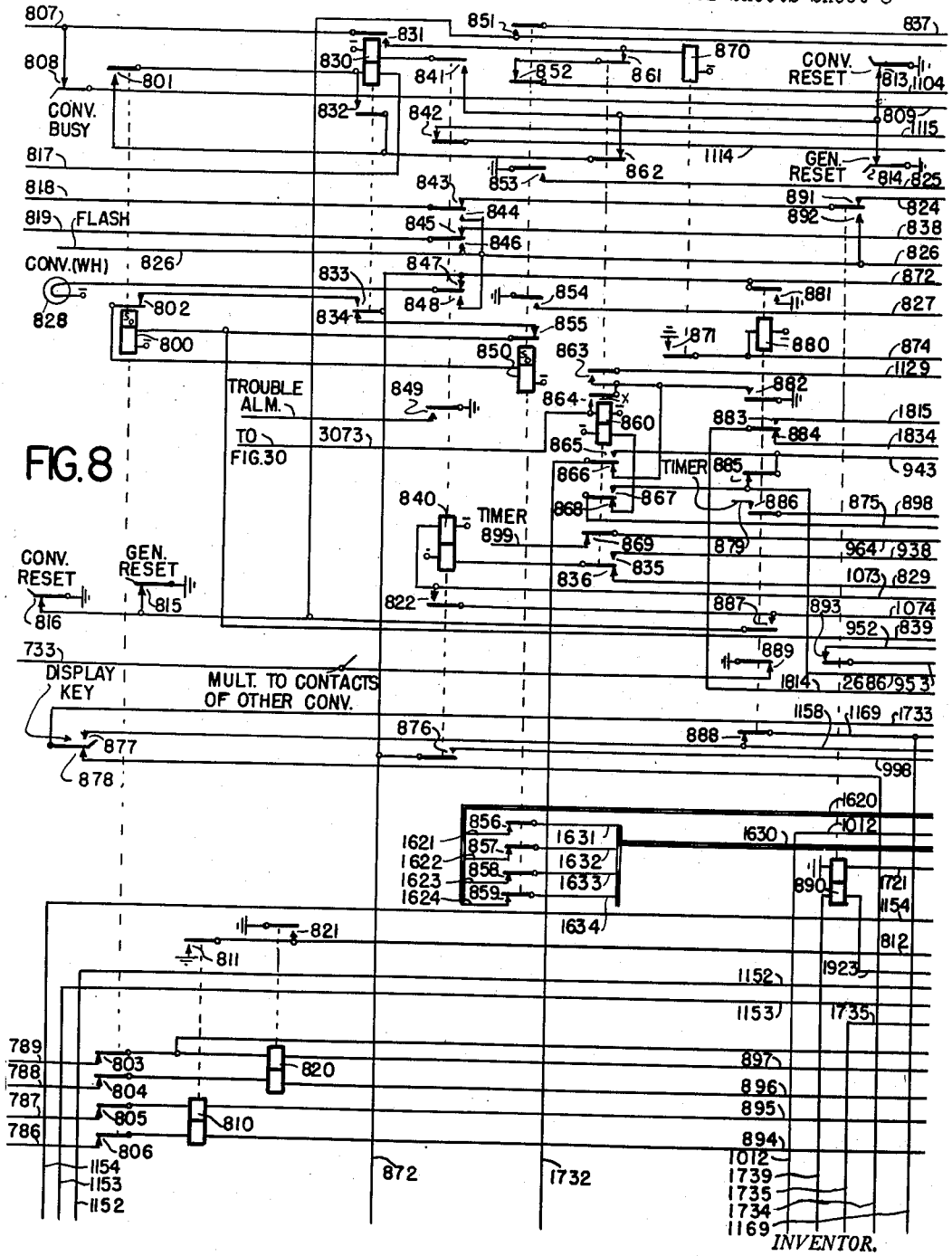
Figs. 8 to 20 show circuits of a regular converter accessible to the senders located at the different reservation clerk's position.
Figure 12:
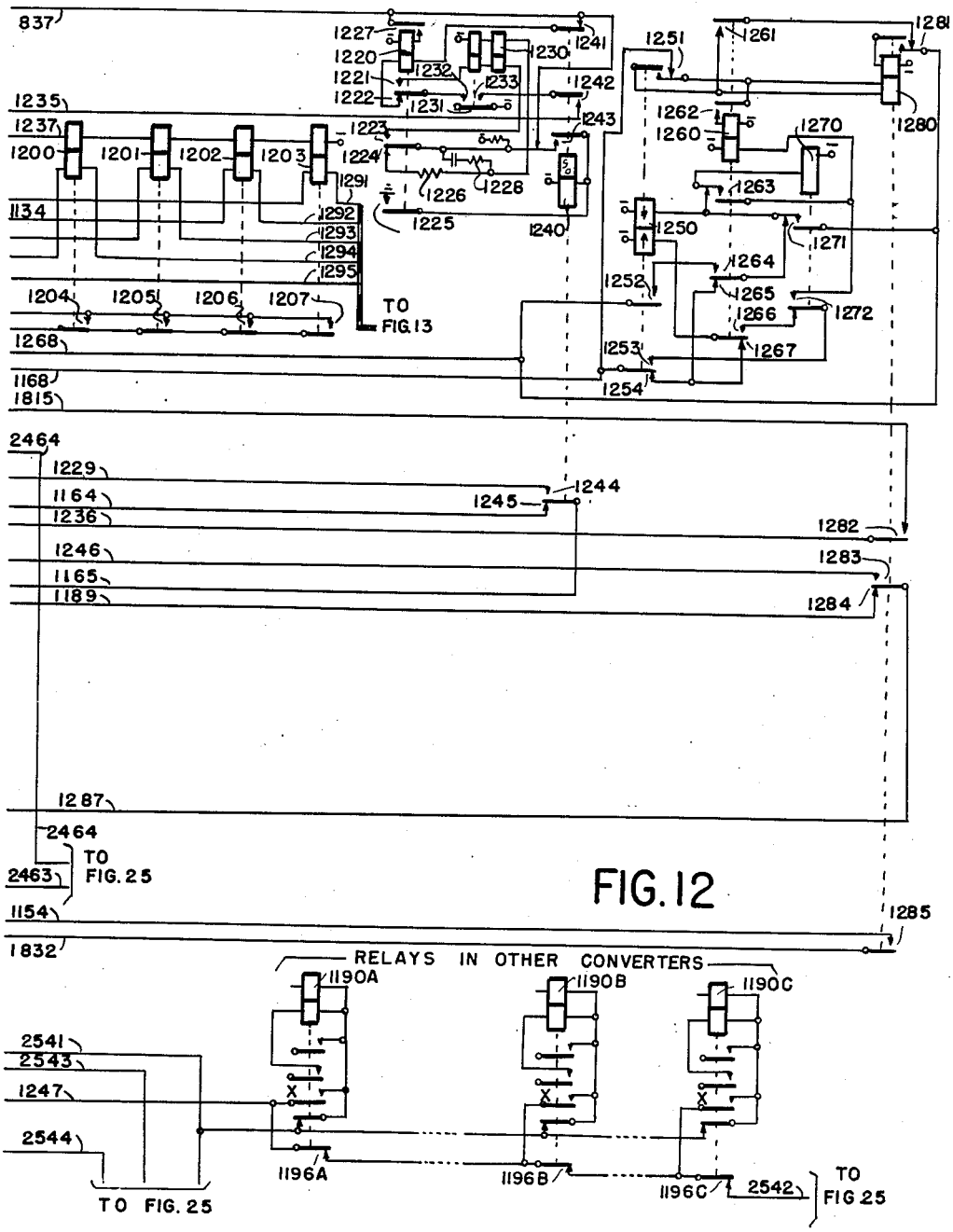

In response to the seizure of a converter, control relays of Fig. 8 operate to prepare locking circuits for various relays, and to start the relay vibrator 1230 of Fig. 12. Immediately after the converter is seized, two digits representing the clerk's position are registered automatically on two different sets of register relays of Fig. 14. The first digit is determined by which contacts of relay 780 of Fig. 7 are connected to ground potential; and likewise, the second digit, by contacts of relay 770. The contacts that are strapped to ground potential complete the operating circuits of corresponding register relays.

Figure 14:
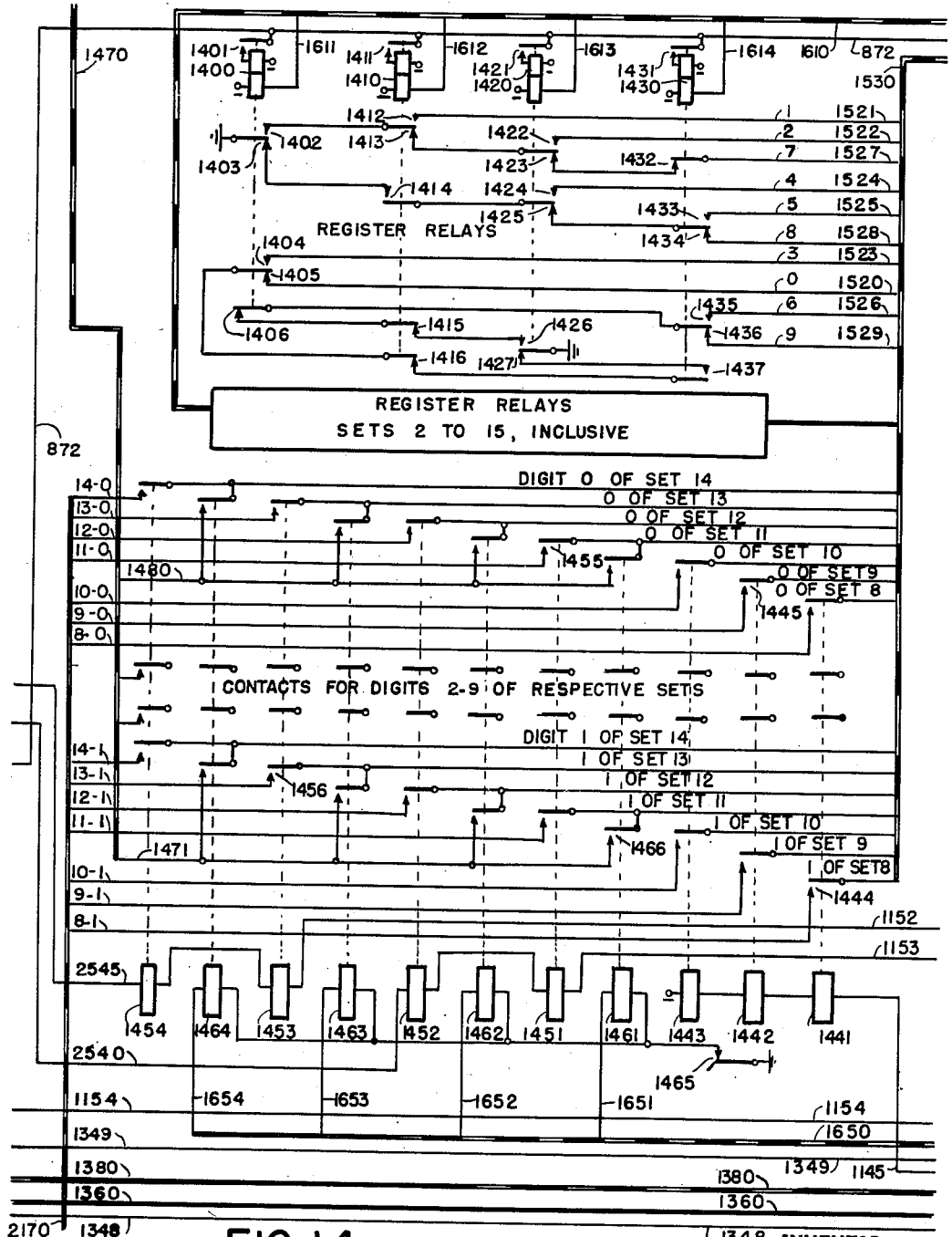

Of a total of fifteen similar sets of register relays, only the first set of Fig. 14 is shown in detail. A combination of the relays in each set of four is operable for connecting ground potential to any one of ten conductors corresponding to digits. Four common conductors connected to the sender of Fig. 7 are connected to successive sets of the register relays through wipers 1601, 1602, 1604, and 1605 of the register control switch of Fig. 16.

Figure 16:
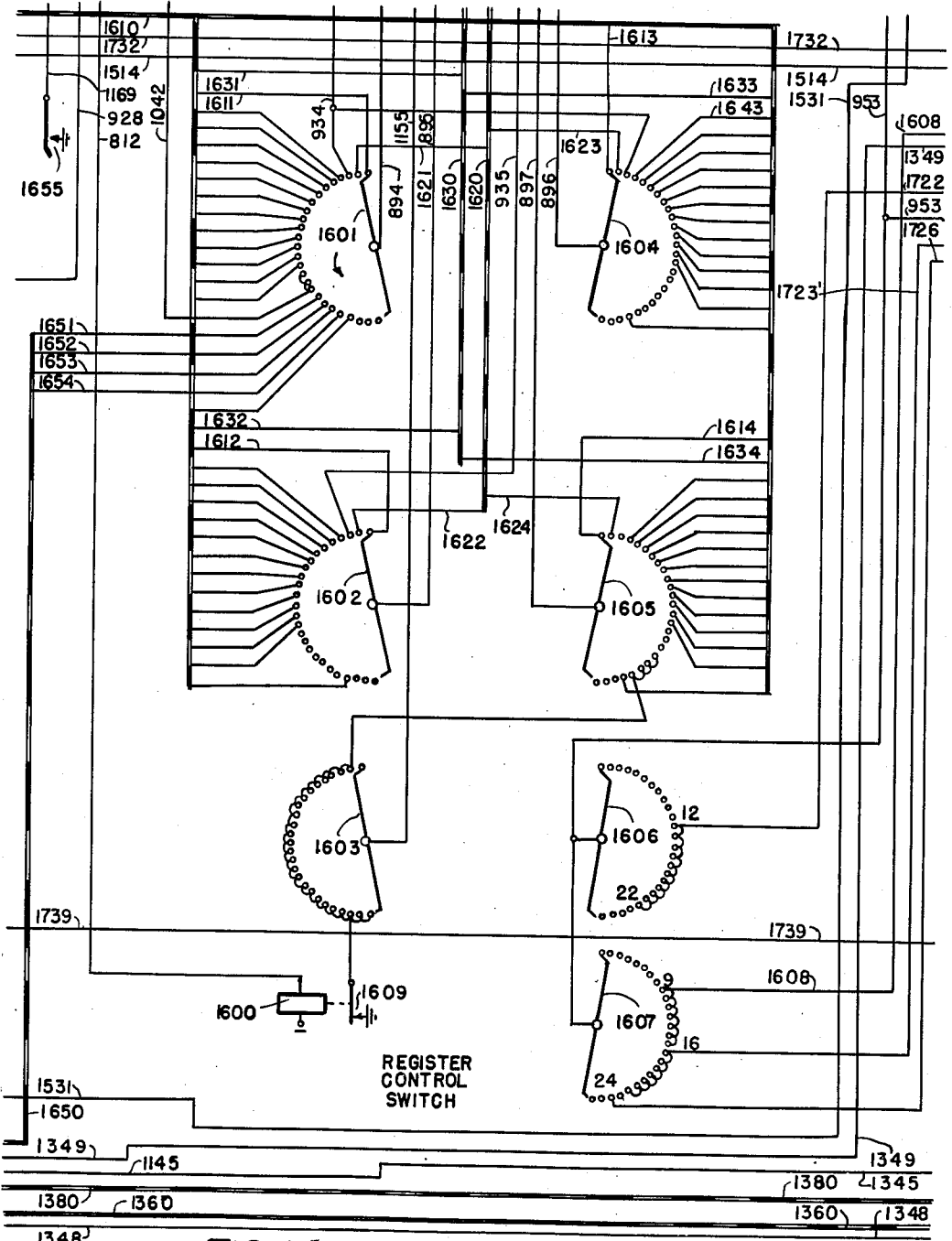

The register control switch of Fig. 16 is a rotary stepping switch which has seven levels of contacts, and twenty-six contacts for each level. The wipers 1601-1607 are normally positioned at the first set of contacts, but are rotated to the next set of contacts after the registration of each digit by the operation and releasing of stepping magnet 1600. Off-normal springs 1655 are normally open when the wipers are at the first set of contacts, but are closed when the wipers are at other contacts. Interrupter contacts 1609, operated by magnet 1600, control the circuit for returning the wipers to normal when the converter circuits are released.

After the position number has been registered automatically, seize lamp 739 is illuminated, and then the reservation clerk operates digit keys 721–730 for successively registering a transaction number, a date number, a flight number, a departure number, and a destination number.

Shortly after the converter circuit is seized, relays 1220 and 1240 of Fig. 12 operate to complete circuits for starting relay vibrator 1230. The pendulum of vibrator 1230 oscillates twenty cycles per second, and when pick-up relay 1110 is operated, controls impulsing relays 1130 and 1140. Upon operating, relay 1240 also completes a circuit for rotating the wipers of the circuit control switch of Fig. 17 from their normal positions at their twenty-sixth contacts to their first set of contacts.

Figure 17:
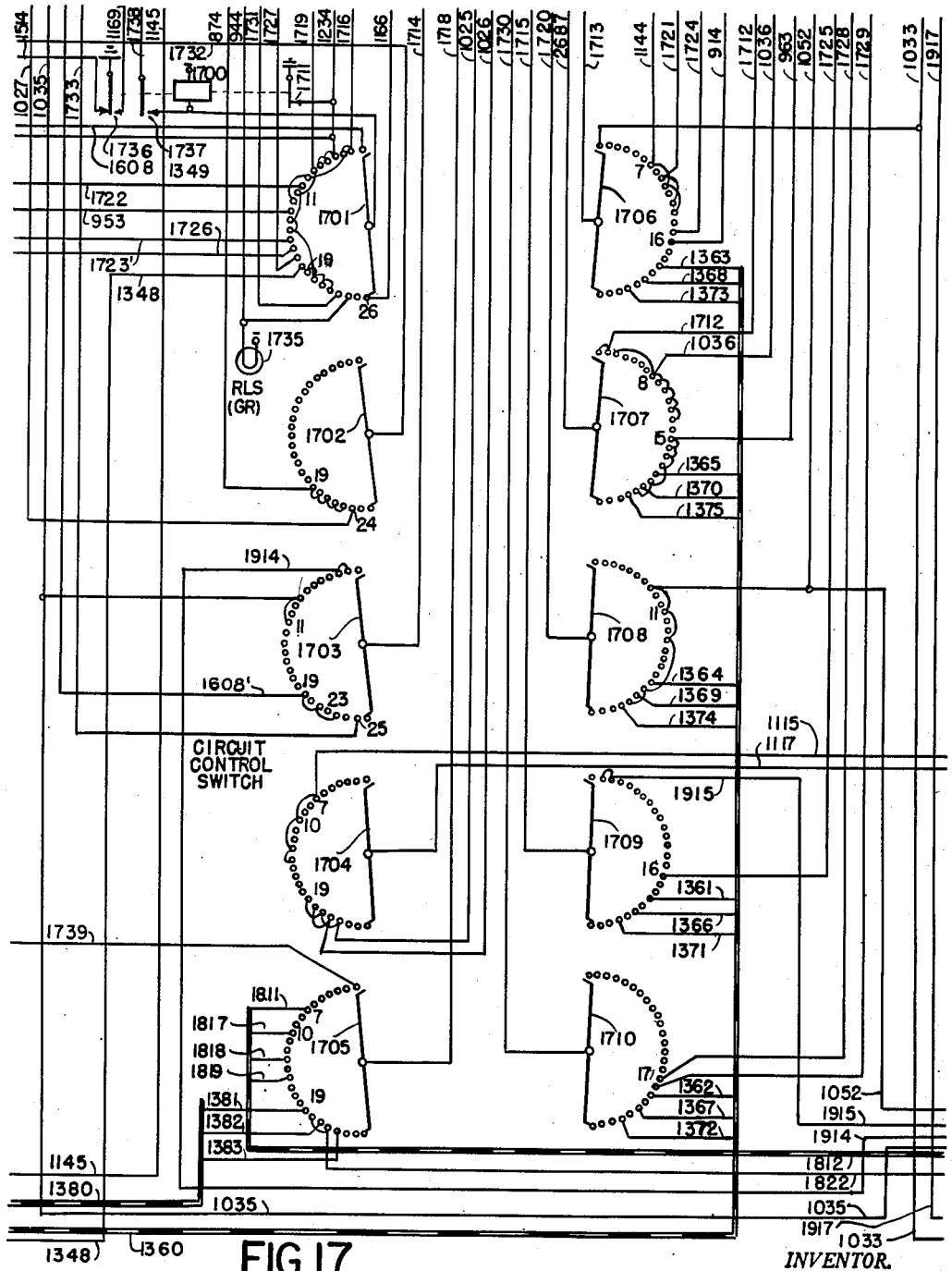

The circuit control switch of Fig. 17 determines the sequence of operation of relays and switches for establishing connections to a group of space indicators; and after the space indicators have been connected, it completes impulsing circuits for transmitting impulses to the selected indicators. The switch is a rotary stepping switch having ten wipers, 1701–1710, each accessible to twenty-six contacts, stepping magnet 1700, interrupter springs 1711 and 1731, and off-normal springs 1736.

Figure 19:
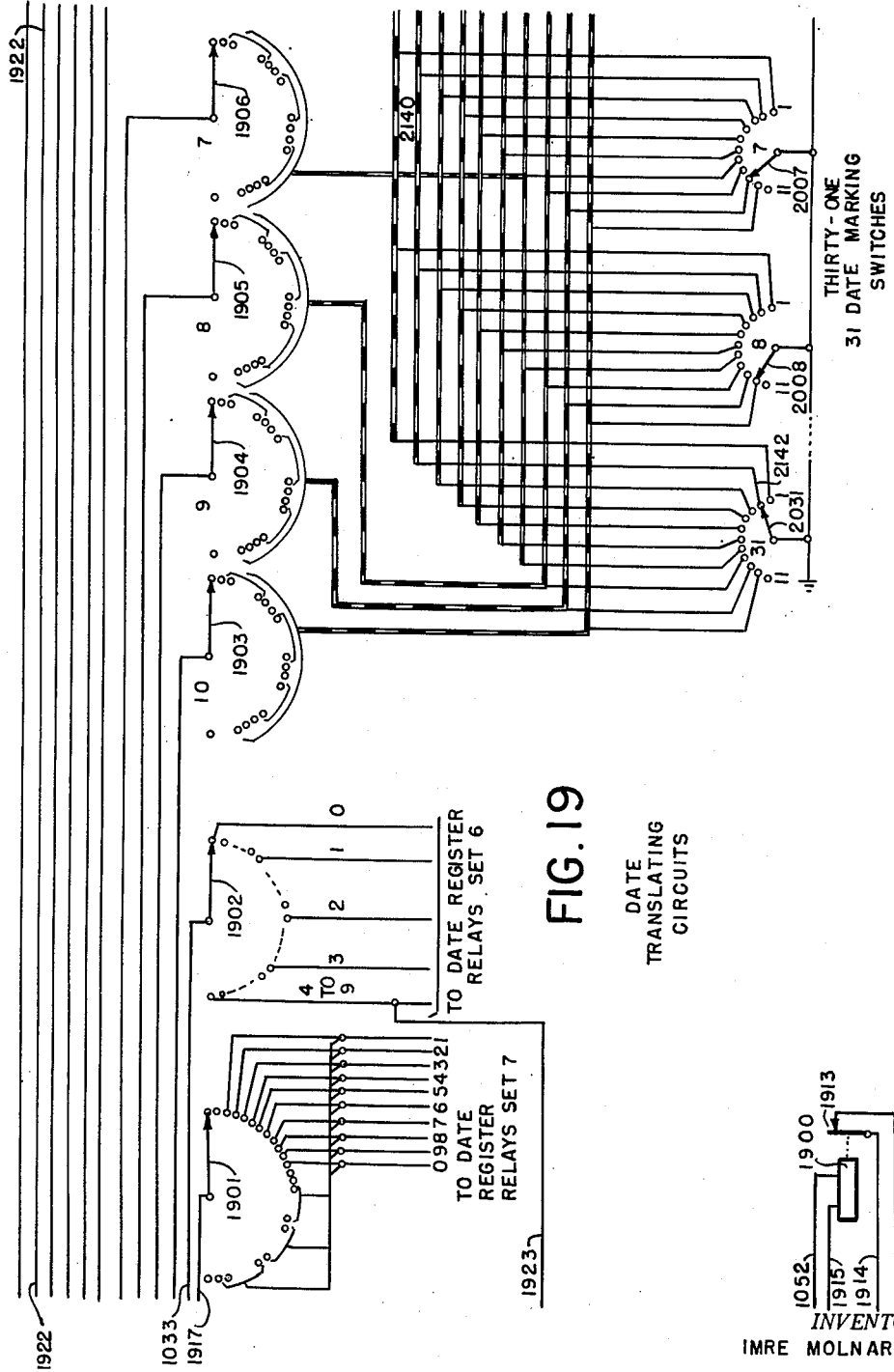
Figure 20:
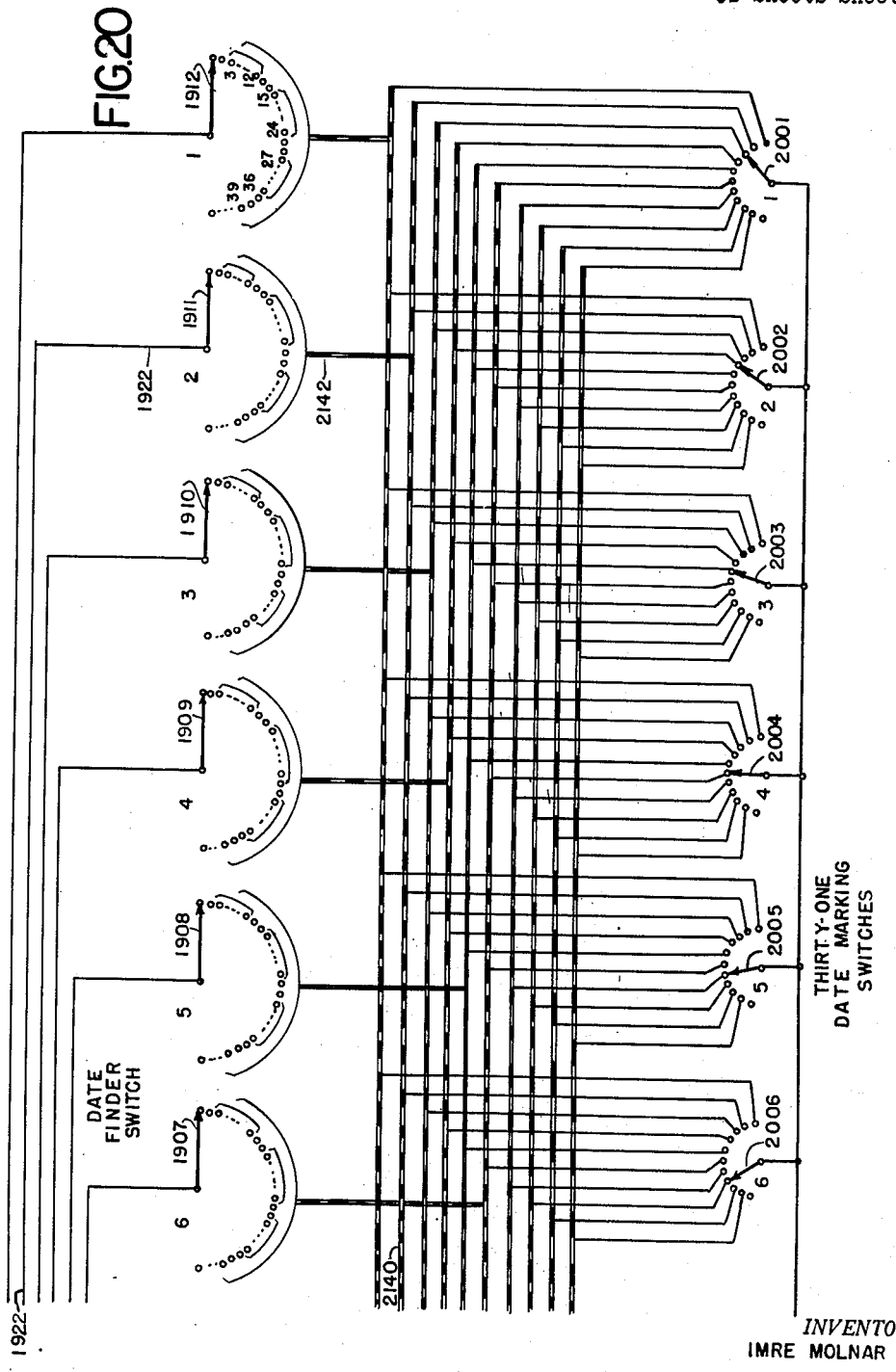

After the reservation clerk has registered the digit corresponding to the point of destination, a circuit is completed for advancing the wipers of the circuit control switch to their second set of contacts to prepare circuits for operating the date finder switch of Figs. 19 and 20. Relay 1050 of Fig. 10, and stepping magnet 1900 of Fig. 19 cooperate to step wipers 1901–1912 of the date finder switch to a position determined by the sixth set of register relays. Wiper 1902 encounters ground potential connected through the contacts of the sixth set of register relays to open the operating circuit of magnet 1900. In response to the wipers of the circuit control switch advancing to the third set of contacts, the circuits for operating magnet 1900 are reclosed to advance the wipers of the date finder switch until wiper 1901 encounters a marking circuit as determined by the seventh set of registered relays.

The contacts in the banks opposite the ten wipers 1903–1912 are connected to the contacts of thirty-one, 11-position, manually operated switches 2001–2031. A predetermined setting of the date marking switches and the position of the wipers of the date finder switch as determined by a previously registered date determines to which contact opposite wiper 1805 of Fig. 18 ground potential is connected, and thereby determines to which level the wipers of the date selector switch are raised subsequently.

Figure 18:
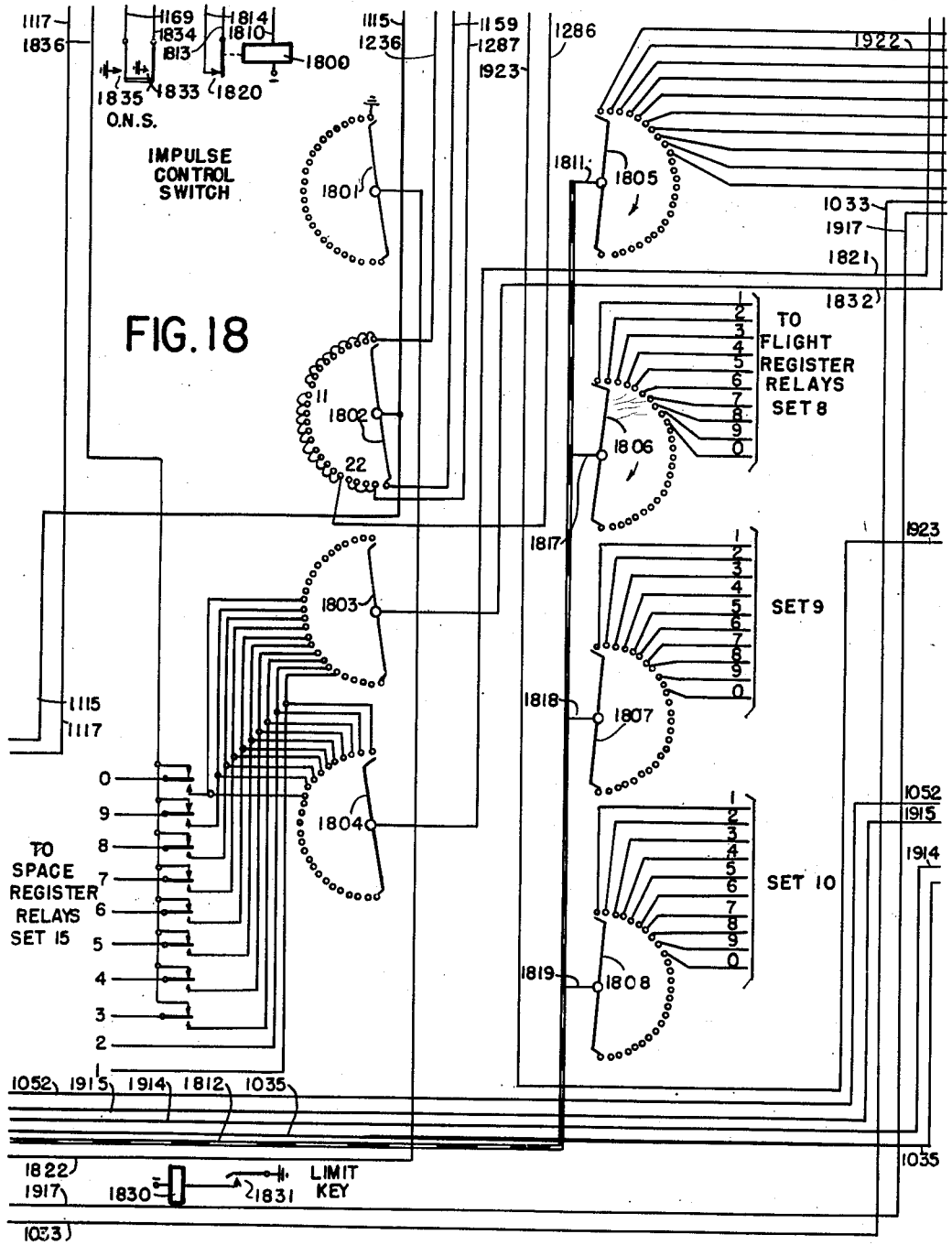
Figure 26:
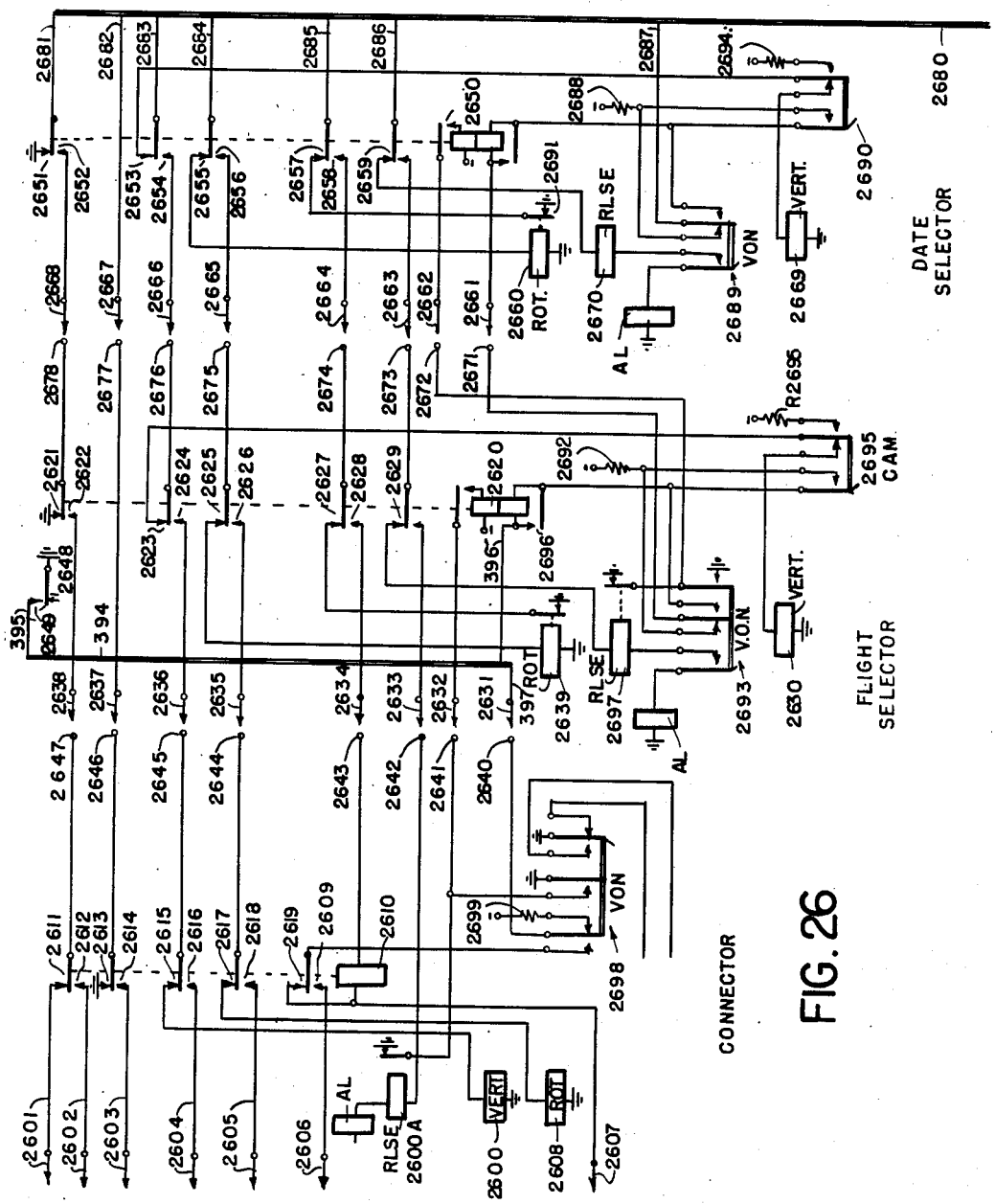
Fig. 26 shows a date selector which is permanently associated with a corresponding regular converter, a flight selector which is accessible to date selectors, and a connector which is accessible to flight selectors.

After the wipers of the date finder switch have been positioned, circuits are completed for operating simultaneously the impulsing control switch of Fig. 18 and the date selector of Fig. 26. The date selector switch has eight wipers 2661–2668, vertical magnet 2668, rotary magnet 2000, vertical off-normal springs 2689, and cam springs 2690. When the wipers are raised to a level which is determined by the Date Translating Circuits, a circuit is completed through wiper 1805 of impulsing control switch for operating cut-off relay 910 to stop the transmission of impulses.

The impulsing control switch comprises eight levels of contacts accessible to wipers 1801–1808, stepping magnet 1800, interrupter springs 1820, and off-normal springs 1833 and 1835. In addition to the marking circuit accessible to wiper 1805, marking circuits opposite wipers 1806 determine to which level the wipers of the flight selector of Fig. 26 are raised; marking circuits connected to contacts opposite wiper 1807 determine to which level the wipers of the connector of Fig. 26 are raised; the marking circuits connected to contacts accessible to wiper 1808 determine the number of steps the wipers of the connector are rotated; and the marking circuits connected to contacts opposite wipers 1803 and 1804 determine the number of reservations of cancellations to be recorded on the selected space indicators.

After an idle flight selector has been selected in response to the automatic rotation of the wipers of the date selector, the flight selector is operated in a similar manner to select an idle connector.

The connector switch is a two-motion switch comprising wipers 2604 to 2607, inclusive, vertical magnet 2600, rotary magnet 2602, vertical off-normal springs 2698, and release magnet 2600A. In response to the successive transmission of two series of impulses to both connector switch and the impulsing control switch, a desired group of space indicators such as shown in Fig. 27 are selected.

When the indicators have been selected, send lamp 779 is illuminated to notify the reservation clerk that the sending operation may be completed. Before the number of spaces to be reserved or cancelled, can be registered, the reservation clerk must press check key 732 repeatedly to illuminate check lamp 2758 of Fig. 27 and then to illuminate, successively, different ones of the lamps 751 to 759 of Fig. 7. If check lamp 2758, which is associated with a row of indicators, is illuminated in unison with the pressing of the check key, the reservation clerk is quite certain that the correct group of indicators has been selected. Furthermore, upon subsequently pressing the check key, the illumination of certain lamps in the group 750 to 751 verifies the correction of the previously registered digits.

Finally, after checking operations has been completed, the clerk depresses a digit key to register the number of reservations or cancellations. In response to this registration, the converter circuit seizes momentarily the marking circuits of Figs. 21 to 25 inclusive.

The marking circuits are controlled by the sets of register relays corresponding to the flight number, the point of departure, and the point of destination.

Figure 13:
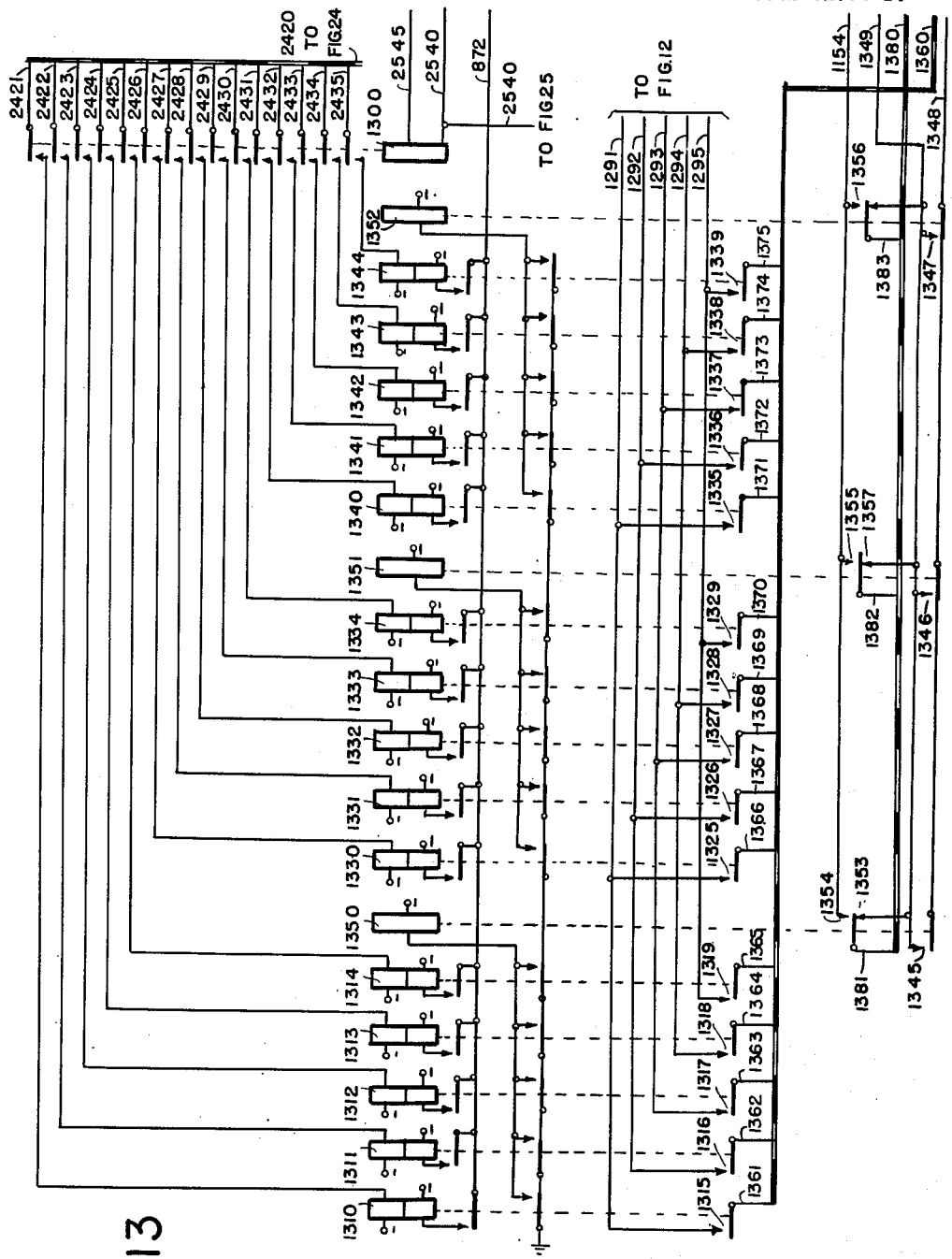
Figure 21:
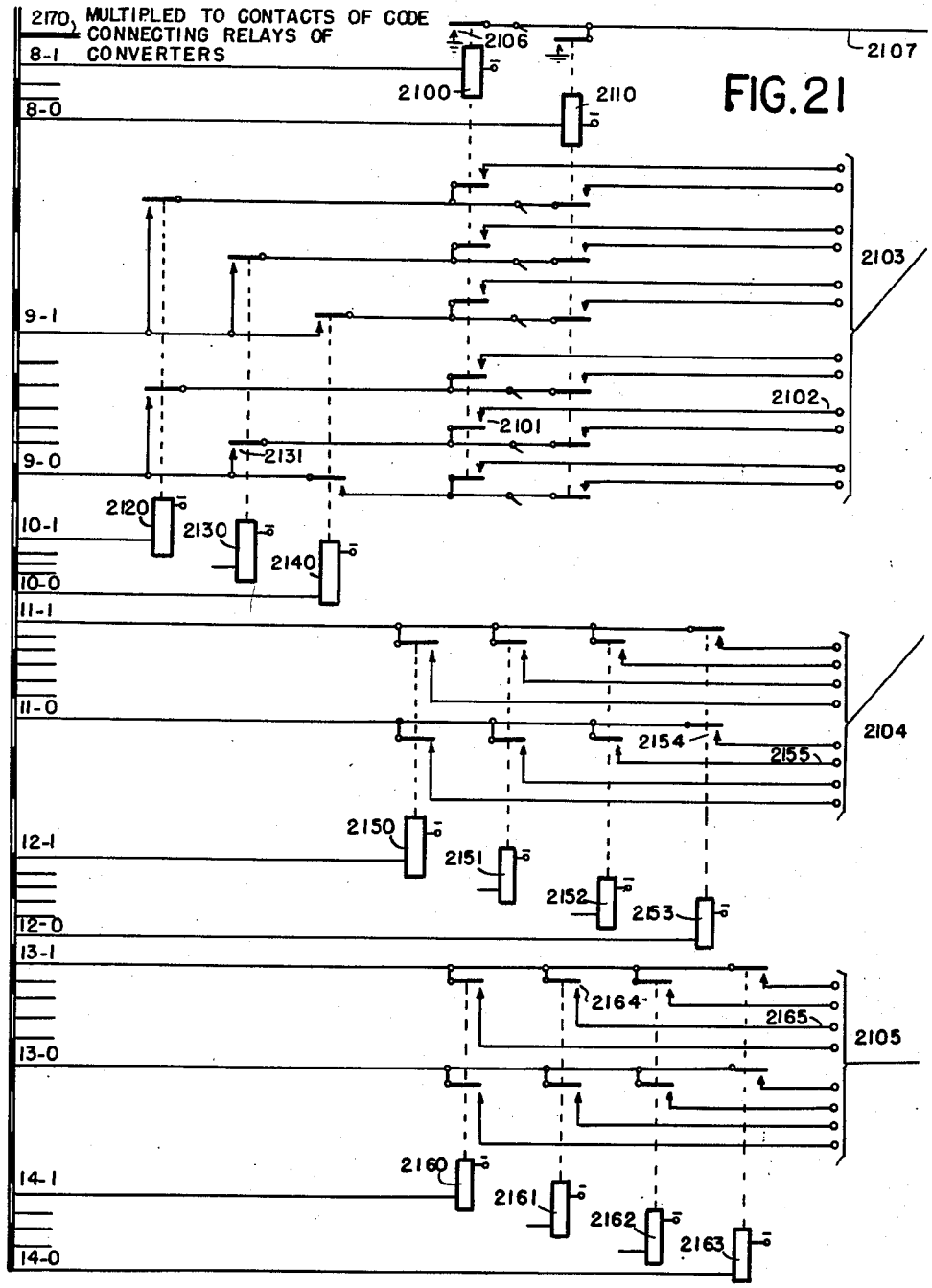
Figure 22:
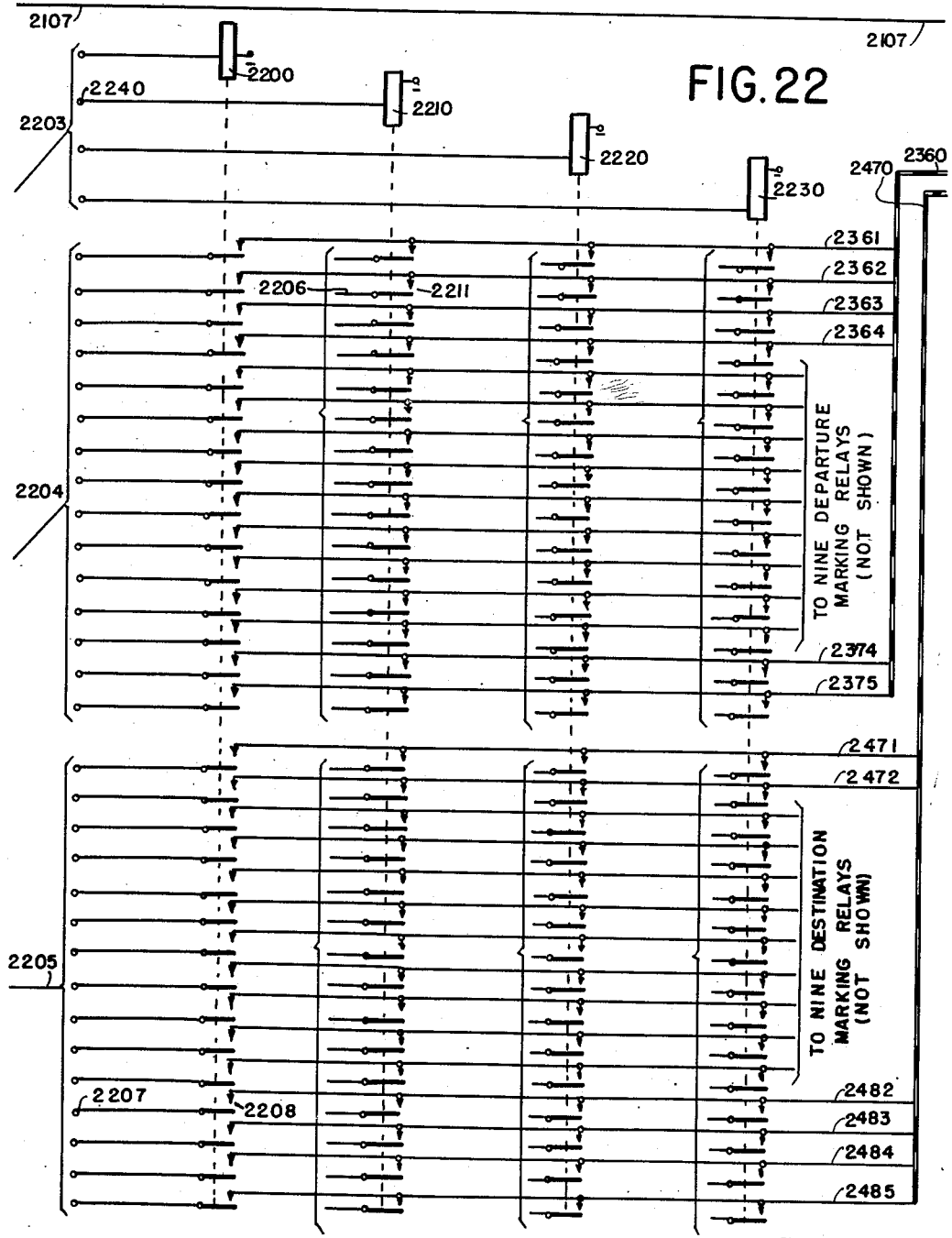
Figure 23:
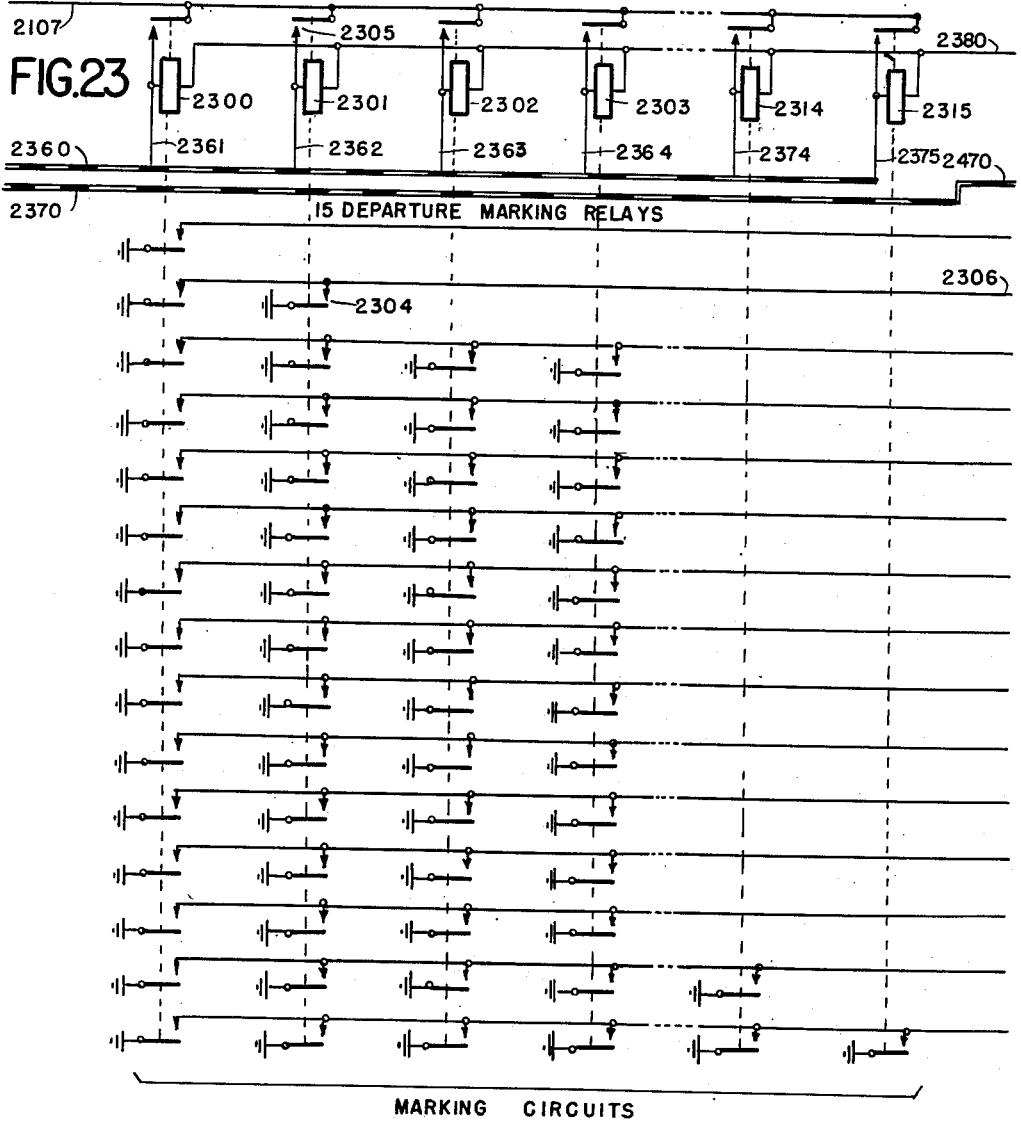
Figure 24:
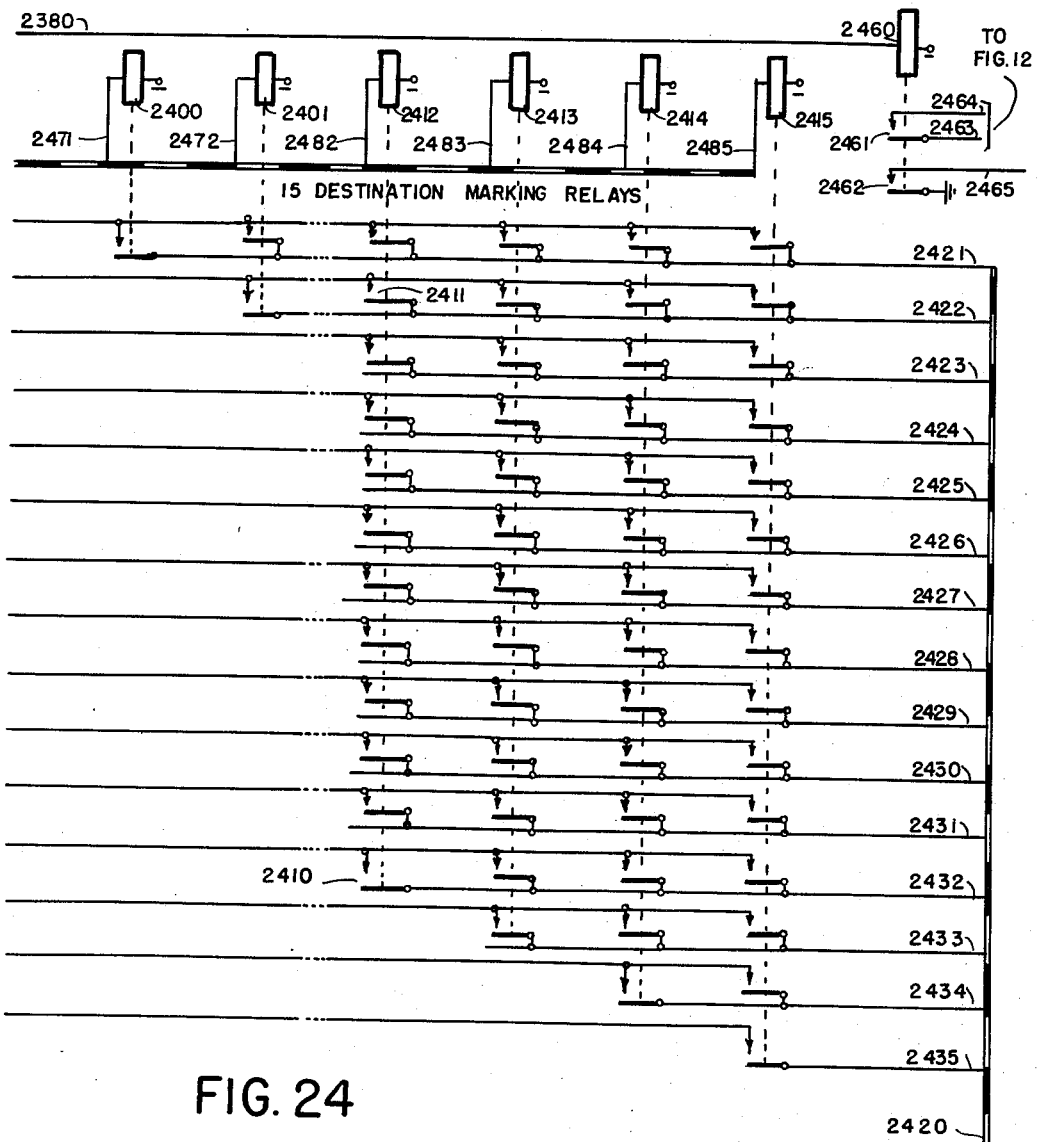

In Fig. 21, relays 2100 and 2110 represent ten relays that are controlled by the eighth set of register relays (which correspond to the first digit of the flight number); ten conductors, 9–1 to 9–0 are connected momentarily to the contacts of the ninth set of register relays; relays 2120, and 2140, representing ten relays, are controlled by the tenth set of register relays; conductors 11–1 to 11–0 are connected to the contacts of eleventh set of register relays; relays 2150 to 2153 represent ten relays controlled by the twelfth set; conductors 13–1 to 13–0 are controlled by the thirteenth set; and, finally, relays 2160 to 2163 represent ten relays that are controlled by the fourteenth set of register relays. A flight marking relay such as relay 2200 shown in Fig. 22 is supplied for each flight that appears on the display board. Each one of the conductors in the group of conductors 2103 at the top of Fig. 21 is connected to a flight marking relay, and is connected to ground potential when a corresponding flight number is registered. The operation of a flight marking relay connects certain ones of the conductors 2104 of Fig. 21 to predetermined ones of the fifteen departure marking relays of Fig. 23, and also connects certain ones of conductors 2105 of Fig. 21 to predetermined ones of the fifteen destination marking relays of Fig. 24. One of the conductors 2104 is then connected to ground potential in accordance with the previously registered number for the point of departure to operate a predetermined departure marking relay; and one of the conductors 2105 is connected to ground potential in accordance with the previously registered number for the point of destination to operate a particular one of the destination marking relays. An operated departure marking relay and an operated destination marking relay mark conductors for operating the indicator marking relays which corresponded to the stops that are included in the reservation. In Fig. 13, the indicator marking relays are shown in three groups, five relays 1310 to 1314, five relays 1330 to 1334, and five relays 1340 to 1344. The first group corresponds to the first five stops in a flight (not including the point of departure); the second group, to the sixth to tenth stops, and the final group to the eleventh to fifteenth stops, inclusive. Relays in only one or two groups are used for all except the longer flights.

Upon advancing, the wipers of the circuit control switch complete circuits for transmitting impulses for operating simultaneously a first group of indicators and the impulsing control switch. After the indicators of the first group of five have been operated, the wipers of the circuit control switch are advanced to complete a circuit for sending a single impulse to the rotary magnet of the connector. The wipers of the connector are advanced to a next set of contacts to prepare circuits for a second group of five indicators; and in response to the wipers of the circuit control switch advancing still further, the second group of five indicators may be operated. In a like manner, the third group of five indicators for any flight is selected and may be operated if the reservation includes stops beyond the tenth stop of the flight. Only those indicators in each group are operated that correspond to the operated ones of the indicator marking relays of Fig. 13.

After the display on the indicator has been changed to show the reservation, the wipers of the circuit control switch are advanced for completing a circuit to operate relay 860 of Fig. 8. Upon operating, relay 860 releases circuits for disconnecting the sender of Fig. 7 from the converter circuits, and also completes a circuit for releasing the connector and the selectors of Fig. 26.

Figure 15:
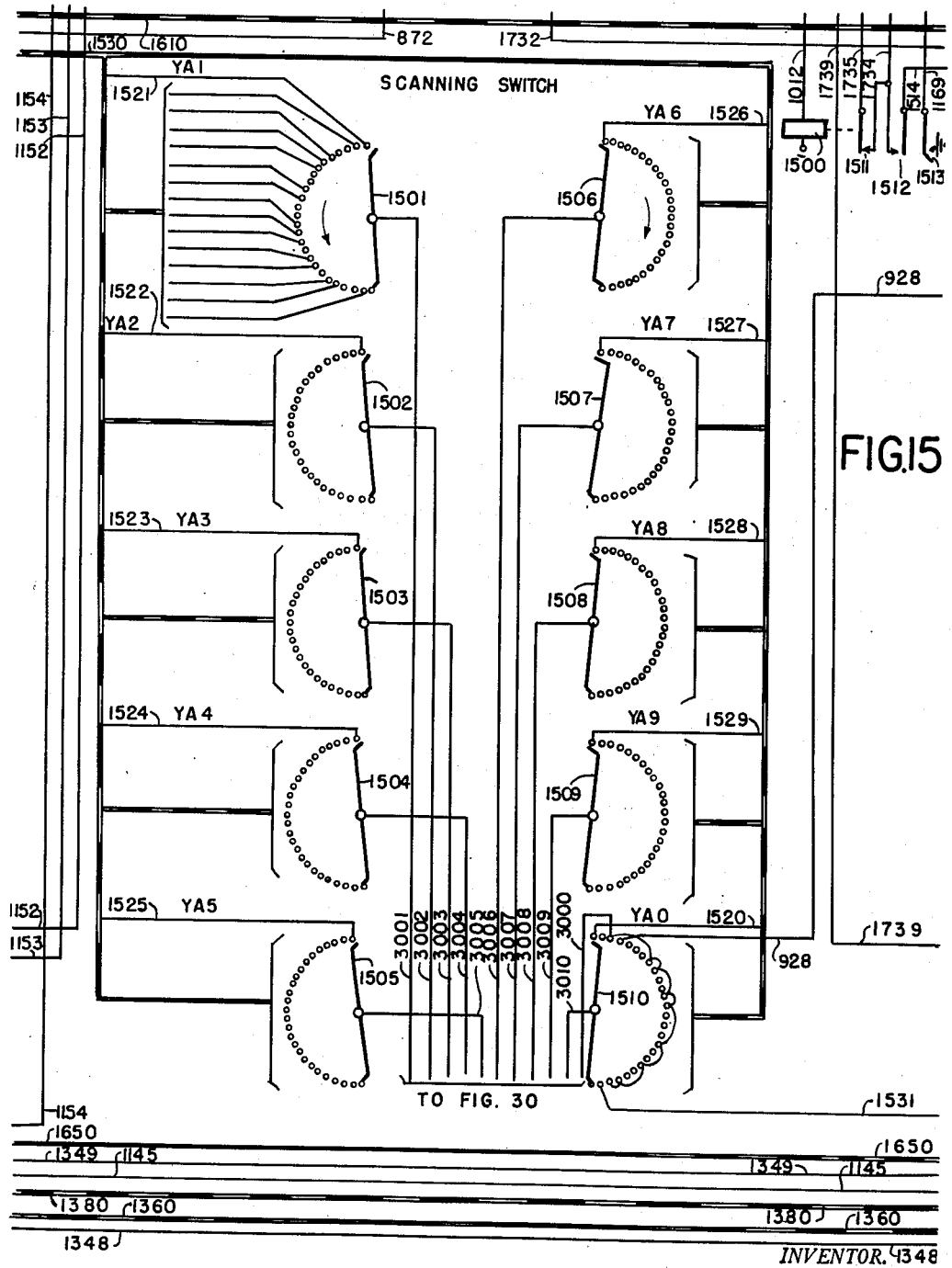

Finally, when the wipers of the circuit control switch are advanced to their twenty-fifth contacts, circuits are completed for rotating the wipers of the scanning switch of Fig. 15. The scanning switch comprises ten levels of contacts opposite wipers 1501–1510, stepping magnet 1500, interrupter springs 1511, and off-normal springs 1512 and 1513. Each level corresponds to a digit, and one of the ten conductors from each one of the fifteen sets of register relays is connected to a contact opposite a different wiper. As the wipers of the scanning switch are rotated, ground potential is encountered by one of the wipers at fifteen different sets of contacts for transmitting digits to the "Teletype" printing system of Figs. 30 and 31. Relays 3111 to 3120 of Fig. 30 translate the impulses of ground potential into the correct code for operating a standard "Teletype" printing system. The code is transmitted to a "Teletype" printing system which perforates tape for making a permanent record and also transmits the information to distant stations.

After the wipers of the scanning switch have been rotated beyond the contacts for transmitting information of the transaction, wiper 1510 of the switch completes a circuit for operating release relay 1170. In response to the operation of the release relay all circuits that were not previously restored are returned to normal.

Various alarm circuits are associated with the converter. If a clerk attempts to reserve spaces in excess of those available, one or more of the relays in the impulsing circuits operate to complete a circuit for operating trouble-alarm relay 840 of Fig. 8. An alarm sounds, and the converter circuit is maintained operated until it is manually released, by a supervisor. Another alarm circuit is responsive to the transmission of an excessive number of impulses. Ordinarily a series of impulses for controlling the switches includes no more than ten impulses; and if due to circuit trouble or to an error in registering digits, more than ten impulses are transmitted, a circuit is completed through wiper 1802 of the impulsing control switch of Fig. 18 to operate trouble-alarm relay 840. However, when impulses are being transmitted to the indicators for recording a cancellation as many as ninety-nine impulses may be transmitted before an alarm sounds. Other alarm circuits are described in the succeeding detailed description.

*Seizing a converter*

The operation for stepping the indicators of Fig. 27 to record reserved spaces will now be described in detail. Upon receiving a request for reserving space on a particular flight the operator at the sender position of Fig. 7, observes the indicators and associated busy lamp 2750. After the operator ascertains that a sufficient number of unreserved spaces are available to fill the reservation, and that busy lamp 2750 is dark to show that the circuits of the indicators for this flight are idle, she operates reserve-cancel key 720, illustrated at the top of Fig. 7, to the reserve position for closing the lower set of contacts. If any accessible converter is idle, a circuit for energizing stepping magnet 700 of the finder switch to step wipers 701 to 718 is completed from negative battery, winding of magnet 700, interrupter contacts 719, contacts 761, contacts 792, contacts 734 of switch 720, conductor 733, contacts 889, of an idle converter to ground. However, should all converters be busy, contacts similar to and in multiple with contacts 889 are open to delay the operation of the finder switch.

When one or more converters are idle, the finder switch steps in a self-interrupted manner; and should the converter that is connected to the third contacts of the finder banks be the first idle one encountered, the following circuit is completed for operating connect-control relay 760; ground potential contacts 735 of switch 720, resistor 738, relay 760, wiper 718 and the engaged third contact, conductor 807, busy key 808, conductor 809, contacts 1171, conductor 1104, contacts 852, and 861, relay 870, and negative battery. Upon operating, relay 760 at contacts 761 opens the circuit shunting the winding of connect relay 780 to connect it in series with the winding of the stepping magnet 700. Relay 790 operates, but the increased resistance in the circuit prevents the reoperation of the stepping magnet 700. At contacts 792 a point is opened in the circuit that shunts the winding of relay 740; at contacts 791 an operating circuit is closed for relay 740; at contacts 793 a locking circuit is closed for relay 760, and also resistor 738 is shunted to reduce the resistance between ground and the contact engaged by wiper 718, thereby, to prevent another finder switch from stopping on the circuits of the selected converter; at contacts 794 a circuit is prepared for operating marking control relay 780, and at contacts 795 to 798, inclusive, wipers 711 to 714, respectively are connected to circuits for automatically registering the position number as described subsequently. Relay 740 operates, and at contacts 741 to 750', inclusive, connects wipers 701 to 710, respectively, to digit checking lamps.

When the finder switch seizes the illustrated converter, the energizing circuit for holding relay 870 is completed from ground at contacts 793, the winding of relay 760, the previously traced circuit including the winding of relay 870, to negative battery. Relay 870 at contacts 871 closes an obvious circuit for operating holding relay 880. Relay 880 at contacts 881 applies ground potential to conductor 872. In response to the application of ground potential to conductor 872, a circuit is completed through contacts 847 for illuminating converter lamp 828 for designating the seized converter; and a circuit for operating relay 1060 is completed from conductor 872, through contacts 1199, conductor 873, winding of relay 1060 to negative battery. Relay 1060 at contacts 1061 opens a point in the circuit of trouble relay 1070, also, a circuit is completed from ground potential on conductor 872, contacts 834, contacts 855, conductor 839, lower winding of relay 990 to negative battery. At contacts 997, a locking circuit is completed from negative battery, upper winding of relay 990, contacts 997, conductor 998, contacts 876 to ground potential on conductor 872. Relay 990 at contacts 992 to 996 connects circuits of the converter to circuits of an associated date selector.

*Registering position numbers*

The first two digits to be registered on certain ones of the register relays are for designating the the operator's position. Each operator's position has terminals corresponding to terminals 762 to 765, inclusive, of Fig. 7 for determining the first digit, and other terminals corresponding to terminals 766 to 769 for determining the second digit. If the position number assigned in the present example is 57, terminals 763 and 765 are strapped to ground potential for automatically registering the digit 5 and terminal 766 is strapped to ground potential for subsequently registering the digit 7. When connect relay 790 operates as previously described, a circuit is completed from ground, terminal 763, break contacts 784, contacts 796, wiper 712 and the contact with which it is engaged, conductor 787, contacts 805, upper winding of relay 810, conductor 895, wiper 1602, conductor 1612, of cable 1610, lower winding of register relay 1410 to negative battery; and also a circuit is completed from ground, terminal 765, break contacts 782, contacts 798, wiper 714 and the bank contact with which it is engaged, conductor 789, contacts 803, upper winding of relay 820, conductor 897, wiper 1605, conductor 1614 of cable 1610, lower winding of register relay 1430 to negative battery. Register relays 1410 and 1430 operate, at contacts 1411 and 1431 respectively complete locking circuits from negative battery, their respective upper winding, conductor 872, contacts 881 to ground, and at contacts 1414 and 1433 applies ground potential through the follower circuit to mark a contact of the scanning switch illustrated in Fig. 15: ground, contacts 1403, 1414, 1425, and 1433, conductor 1525 of cable 1520, and to the first contact in the bank opposite wiper 1505. Moreover, in response to the completion of the circuit for register relays 1410 and 1430, relays 810 and 820 operate to complete the following circuit for energizing stepping magnet 1600: ground at contacts 811 and 821, conductor 812, winding of stepping magnet 1600 and negative battery. The application of ground potential to conductor 872, in response to the operation of relay 880 as previously described, completes the following circuit for energizing slow-operating relay 800: ground potential on conductor 872, contacts 834, contacts 855, winding of relay 800, and negative battery. Upon operating after a delay of sufficient time to permit the operation of relays 810 and 820 as above described, relay 800 at contacts 803 and 805 opens the previously traced circuits that include windings of relays 810, 820, 1410, and 1430; at contacts 802 opens a point in the operating circuit of relay 850; and at contacts 801 closes the following circuit for operating relays 780 and 830: negative battery, winding of relay 780, contacts 794, wiper 717, conductor 817, lower winding of relay 830, contacts 801, contacts 662, contacts 813 of the converter reset key, and ground. Marking-control relay 780 at armatures 782 to 785, inclusive, transfers the circuits for registering digits from terminals 762 to 765, inclusive, to terminals 766 to 769, and at contacts 781 prepares a circuit for operating relay 770. Relays 810 and 820 release to open at contacts 811 and 821 the energizing circuit of stepping magnet 1600. Upon deenergizing, the stepping magnet releases its associated armature to rotate wipers 1501 to 1607, inclusive of the register control switch from the first set of contacts to the second set, thereby, to prepare controlling circuits for a second set of register relays. Upon operating, relay 830 at contacts 831 closes a locking circuit for holding relay 870, at contacts 832 closes a circuit in shunt with contacts 801, at contacts 833 prepares an operating circuit for relay 850, and at contacts 834 opens the energizing circuit of relay 800. Relay 800 releases, at contacts 802 completes an energizing circuit for slow-operating relay 850, and at contacts 803 to 806 connects the second set of register relays to their controlling circuits. The circuit completed to register the digit 7 may be traced from ground at terminal 766, break contacts 777, make contacts 785, contacts 795, wiper 711, conductor 786, contacts 806, lower winding of relay 810, conductor 894, wiper 1601, a second contact in the level opposite 1601, conductor 1621 of cable 1620, contacts 856 and conductor 1631 of cable 1630. For the reason of brevity, the second set of register relays which are connected in a manner similar to the first set are not shown in detail. However, the tracing of the circuit may be completed by referring to the first set: continuing from conductor 1631 which corresponds to conductor 1611, lower winding of the relay in the second set corresponding to relay 1400, and negative battery. The operation of the relay marks a circuit for registering the digit 7 in a manner which is equivalent to that for the first set: ground, contacts corresponding to 1402, 1423, 1432, and a conductor that corresponds to conductor 1527 of cable 1530 and that is connected to the second contact opposite wiper 1507 of the scanning switch. In response to the completion of the circuit for operating the relay in the second set of register relays, relay 810 reoperates to energize the stepping magnet 1600.

Finally, in response to the releasing of relay 800, slow-operating relay 850 operates. At contacts 851 a circuit is completed for energizing the upper windings of vibrator 1230; at contacts 852 the initial circuit for energizing relay 870 is opened; at contacts 853 a circuit is completed for operating relay 770; at contacts 854 a holding ground is prepared for alarm-circuits; at contacts 855 a further point in the operating circuit of relay 800 is opened; and at contacts 856 to 859, inclusive, the controlling circuits for the register relays are disconnected from the register control switch, and therefore, the previously traced circuit for energizing the lower winding of relay 810 is opened. The circuit for partially operating relay 770 may be traced from negative battery, lower winding of relay 770, break contacts 772, contacts 781, wiper 716, conductor 818, contacts 843, contacts 891, conductor 824, contacts 902, conductor 825, contacts 853, to ground. In response to its partial operation, relay 770 at contacts 771 completes the following circuit for completing its operation: negative battery, upper winding of relay 770, contacts 771, contacts 794, wiper 717, conductor 817, lower winding of relay 830, contacts 832, contacts 862, and ground at contacts 813 of the reset converter key. Upon completing its operation, relay 770 at armature 772 transfers the ground on wiper 716 to seize lamp 739, at contacts 773 prepares a circuit for send lamp 779, at break contacts 774 to 777 disconnects the terminals for determining the second digit to be registered, and at make contacts 775 to 777 prepares circuits for conditioning the converter to register the subsequently recorded transaction as a reservation rather than a cancellation. A circuit for illuminating seize lamp 739 is completed from negative battery, lamp 739, make contacts 772, and over a previously traced circuit to ground.

*Conditioning the converter to register a reservation*

Upon releasing, relay 810 at contacts 811 opens the circuit of stepping magnet 1600 to step wipers 1601 to 1607, inclusive, to the third set of contacts. The third set of contacts are connected to cancel relay 920 which is operated only when the reserve-cancel key is in the cancel position as described subsequently also; the following circuit is completed at the third set of contacts to operate relays 810 and 820: negative battery, resistor 799, contacts 737 of the reserve-cancel key, make contacts 777, make contacts 785, contacts 795, wiper 711, conductor 786, contacts 806, lower winding of relay 810, conductor 894, wiper 1601 and its third contact, the third contact opposite wiper 1604, wiper 1604, conductor 896, lower winding of relay 820, contacts 804, conductor 788, wiper 713, contacts 797, make contacts 783, make contacts 775, and ground at contacts 736 of the reserve cancel key. Relays 810 and 820 reoperate to energize stepping magnet 1600 as previously described.

*Registering flight information*

Upon observing the illumination of seize lamp 739, the operator releases the cancel-reserve key 720 and proceeds to depress certain digit keys 721 to 730 in accordance with the digits to be registered. The circuit for relays 810 and 820 is opened at contacts 736 and 737 of the cancel reserve key. Upon releasing, relays 810 and 820 in turn release magnet 1600 to cause the wipers of the register control switch of Fig. 16 to step to the fourth set of contacts. If the first digit of the transaction number is the digit nine, key 729 is pressed to complete the following circuit: ground at contacts of key 729, make contacts 783, contacts 797, wiper 713, conductor 788, contacts 804, lower winding of relay 820, conductor 896, wiper 1604, conductor 1643, and to a relay which, in the third set of register relays, corresponds to relay 1420 of the first sets. Relay 820 reoperates to reenergize the stepping magnet 1600. The circuit for registering the digit 9 may be understood by again referring to the first set of register relays, in which the operation of the corresponding relay 1420 connects ground potential through contacts 1426, 1415, 1406, and 1436 to conductor 1529. The conductor, which for the third set of relays corresponds to conductor 1529, is connected through cable 1530 to the fifth contact opposite the wiper 1509 of the scanning switch. The third and fourth sets of contacts of the scanning switch are left vacant for marking a space between the successive number. In response to the release of digit key 729, relay 820 releases to step the wipers 1601 to 1607, inclusive, as previously described. Likewise, the second and third digits of the transaction number are registered on the fourth and fifth set of register relays.

In response to each releasing of a digit key, the wipers of register control switch Fig. 16 are advanced to a next set of contacts to connect the digit sending circuits to a next set of register relays.

Following the registration of the transaction number, two digits corresponding to the date of the desired reservation are registered on the sixth and seventh sets of register relays; three digits for selecting the flight, on the eighth, ninth, and tenth sets; two digits for the point of departure, on the eleventh and twelfth sets; and two digits for the destination, on the thirteenth and fourteenth sets. All sets of register relays have ten conductors connected to contacts of the scanning switch illustrated in Fig. 15; each set of conductors are connected to a set of contacts such that each level of the switch corresponds to a particular digit, and the conductors for each of the registered digits are subsequently encountered by the wipers of the scanning switch in the same sequence in which the corresponding digits were registered.

In addition to being connected to the scanning switch, the conductors of the register sets 6 to 10, inclusive, are connected to particular links of switches shown in Figs. 18 and 19. These connections determine the number of impulses transmitted to the selector and connector switches for selecting the desired group of indicators. The conductors of relay sets 8, 9, and 10, corresponding to the flight number, are also connected through make contacts of certain control relays which are shown at the bottom of Fig. 14, to the marking circuits of Fig. 21. Moreover, the conductors of relay sets 11 to 14, inclusive, are also connected through make contacts to the marking circuits of Fig. 21, the marking circuits being arranged such that the digits stored on sets of conductors 8 to 14, inclusive, subsequently determine which space indicators in a selected flight group are operated to display cancellation or reservation of spaces.

*Preparation of impulsing circuits*

In response to the operation of relay 870 when the converter circuit is first seized, a circuit is completed from ground, contacts 871, conductor 874, lower winding of relay 1150, conductor 1164, contacts 1245, conductor 1165, contacts 1173, conductor 1166, twenty-sixth contact opposite wiper 1701, wiper 1701, stepping magnet 1700 to negative battery. Relay 1150 operates to start the oscillation of weighted contact spring 1151. At oscillating spring 1151, a circuit is completed intermittently from negative battery, winding of slow-operating relay 1162, contacts 1151, to ground potential conductor 874. When relay 850 operates as previously described, a circuit is completed from ground, contacts 815 of a generate reset key, contacts 816 of a converter reset key, contacts 851, conductor 837, break contacts 1111, resistor 1127, upper winding of impulsing relays 1130 and 1140 to battery. Upon operating, relays 1130 and 1140 at contacts 1131, 1132, 1141, 1142, and 1143 open a point in each of five impulsing circuits. Also, a circuit is completed from ground potential on conductor 837, break contacts 1243, contacts 1226 and resistor 1226 connected in parallel with resistor 1228, upper windings of vibrator 1230 to negative battery. The current flow in the upper winding attracts weighted armature spring 1231 with sufficient force to ensure positive electrical contact at contacts 1232 and 1233. At contacts 1232 the following circuit is completed to operate relay 1220: ground potential on conductor 837, contacts 1241, lower winding of relay 1220, contacts 1222, contacts 1232 to negative battery. Relay 1220 then performs the following functions: at contacts 1227 closes an obvious locking circuit to its upper winding, at contacts 1224 opens the circuit in shunt with resistor 1228, at contacts 1221 and 1223 completes a circuit for energizing the lower winding of vibrator 1230, and at contacts 1225 closes the energizing circuit of slow-operating relay 1240. The circuit for energizing the lower windings of relay 1230, which are energized in opposite to the upper windings, may be traced from negative battery, armature 1231, contacts 1232, contacts 1221, lower windings of vibrator 1230, contacts 1223, break contacts 1243 to ground potential on conductor 837. In response to the winding being energized in opposition, weighted armature spring 1233 is released to allow it to oscillate, the circuit for the opposing lower windings of the vibrator being opened during each period of oscillation and thereby re-attracting the armature spring. After an interval relay 1240 operates and performs the following functions: at contacts 1241 opens the initial energizing circuit of relay 1220, at 1242 prepares circuits for impulsing relays 1130 and 1140 and for pickup relay 1140, at make contacts 1243 connects ground from contacts 1225 to the circuit for energizing the upper winding of vibrator 1230, at break contacts 1243 disconnects grounded conductor 837 from the last mentioned circuit, at contacts 1245 opens the previously traced circuit of trouble relay 1150, and at contacts 1244 completes a circuit for stepping wipers 1701 to 1710 of Fig. 17 from their normal position, at their respective twenty-sixth contacts, to their first contacts. Trouble relay 1150 deenergizes to remove the intermittent ground potential from the winding of relay 1162. The circuit completed from stepping wipers 1701 to 1710 may be traced from negative battery, stepping magnet 1700, wiper 1701 and its twenty-sixth contact, conductor 1166, contacts 1174, conductor 1165, contacts 1244, conductor 1229, conductor 1234, interrupter contacts 1711 to ground. Upon being energized, magnet 1700 interrupts its circuit at contacts 1711 to cause wipers 1701 to 1710 of the circuit control switch to rotate to their respective first contacts. At the first contacts, the following circuit is completed through the date selector to operate interrupter control relay 1030: negative battery, resistor 2688 in the Date Selector, Fig. 26, normally closed contacts of vertical off-normal springs 2689, conductor 2687 of cable 2680, wiper 1707 and the first contact of the level, conductor 1712, lower winding of relay 1030, conductor 1033, wiper 1706, conductor 1713, contacts 962, conductor 2693 of cable 2680, contacts 2653, contacts of cam springs 2690, vertical stepping magnet 2669, and ground. At contacts 1032 a circuit is prepared for operating interrupter relay 950.

After the digits corresponding to the date have been registered and, therefore, wiper 1607 of the register control switch has been rotated to position 9, a circuit is completed for energizing slow-operating relay 950. Relay 950 operates and releases to rotate wipers 1701 to 1710 to their respective second contacts. More particularly, the circuit for operating relay 950 may be traced from ground, interrupter springs 1711, conductor 1234, contacts 1032, conductor 1034, winding of relay 950, conductor 952, contacts 893, conductor 853, wiper 1607 and the ninth contact of the level, conductor 1688, the first contact opposite wiper 1701, wiper 1701, stepping magnet 1700 to negative battery. Upon operating, relay 950 at contacts 951 short-circuits its winding to ground potential for operating stepping magnet 1700 and for subsequently releasing itself. Upon releasing, relay 950 at contacts 951 opens the energizing circuit of stepping magnet 1700, which restores to step wiper 1701 to 1710, inclusive, to their respective second contacts.

*Positioning the wipers of the date finder switch*

While the wipers of circuit control switch, Fig. 17, are in their second position, the wipers of the date finder switch, Figs. 19 and 20, are positioned to correspond to the first digit of the previously registered date. If the digit "0," which is the assigned first digit of any date from 1 to 9 inclusive, has been registered, the wipers 1901 to 1912 remain in their normal position at their first contacts; and the following circuit is completed to maintain interrupter control relay 1030 operated after the previously traced circuit has been opened at wiper 1706: ground potential on the conductor corresponding to "0" of register relays, set 6, wiper 1902 and first contact opposite wiper 1902, conductor 1033, lower winding of relay 1030, conductor 1712, wiper 1707 and the engaged second contact, conductor 2687 of cable 2680, contacts of vertical off-normal springs 2689, resistor 2688, and negative battery. By remaining operated, relay 1030 at contacts 1031 prevents the operation of cut-off relay 1050, and at contacts 1032 maintains the circuit to slow to operate relay 950 so that after an interval relay 950 operates to step the wiper 1701 through 1710 to their third contacts as described subsequently. If the operator has registered either "1," "2," or "3" as the first digit, the corresponding conductor accessible to wiper 1902 is connected to ground potential by register relays, set 6. In this case the circuit for energizing interrupter control relay 1030 is now open at wiper 1902 in its first position. Relay 1030 at contacts 1032 opens a circuit to prevent the immediate reoperation of interrupter relay 950 and at contacts 1031 closes the following circuit for energizing interrupter relay 1050: negative battery, winding of relay 1050, contacts 1031, conductor 1035, interrupter contacts 1913, conductor 1914, wiper 1703 and associated second contact, conductor 1714, contacts 996, conductor 2685 of cable 2680, contacts 2657, interrupter springs 2691 and ground. Upon operating, relay 1050 at contacts 1051 closes the following circuit for operating stepping magnet 1900: negative battery, contacts 1051, conductor 1052, stepping magnet 1900, conductor 1915, second contact engaged by wiper 1709, conductor 1715, contacts 994, conductor 2681 of cable 2680, contacts 2651, and ground. Upon being energized, stepping magnet 1900 retracts its armature and at interrupter contacts 1913 reopens the circuit of relay 1050. Relay 1050 releases and at contacts 1051 opens a previously traced circuit to restore stepping magnet 1900. The restoration of the magnet rotates wipers 1901 to 1912 from the first to the second set of contacts, and recloses the interrupter springs 1913 for again operating relay 1050. Relay 1050 and stepping magnet 1900 continue to operate alternately to step the wipers until wiper 1902 encounters a contact marked by the date register relays. For example, if the conductor corresponding to digit 3 is marked, a circuit is completed from ground potential on this conductor, wiper 1902, conductor 1033, lower winding of interrupter control relay 1030, conductor 1712, wiper 1707, and the engaged second contact, conductor 2687 of cable 2680, contacts of off-normal springs 2689, resistor 2688 and negative battery. Upon operating, interrupter control relay 1030 at contacts 1031 opens the circuit of interrupter relay 1050 to stop wipers 1901 to 1912 and at contacts 1032 completes the following circuit for operating interrupter relay 950: negative battery, winding of stepping magnet 1700, wiper 1701 and the engaged second contact, conductor 1716, winding of relay 950, conductor 1034, contacts 1032, conductor 1234, interrupter springs 1711, and ground. Relay 950 operates after an interval and at contacts 951 completes a circuit previously described for energizing stepping magnet 1700 and for releasing itself. In response to the releasing of relay 950, magnet 1700 restores to rotate wipers 1701 to 1710 to the third set of contacts. As the wipers leave the second contacts, the previously traced operating circuit of relay 1030 is opened. Relay 1030 releases to open the circuit of relay 950 and to complete a circuit for interrupter relay 1050 in the same manner as previously described, this time, however, including the third contact of wiper 1703.

While the wipers of circuit control switch Fig. 17 are in their third position, the wipers of the date finder switch, Figs. 19 and 20, are rotated until wiper 1901 encounters ground potential on the contact which corresponds to the second digit of the previously registered date. The contacts opposite wiper 1901 are divided into four groups, the contacts of each group being connected to corresponding conductors 1 to 0, inclusive, of register relays, set 7. In the first group encountered by wiper 1901, conductors 1 to 9, inclusive, mark calendar dates 1 to 9, inclusive; in the second group, the ten conductors mark dates 10 to 19; in the third group, the conductors mark dates 20 to 29; and finally in the fourth group, conductors 0 and 1 are for registering dates 30 and 31. Should conductor 0 in the first group, or conductors 2 to 9 in the last group be erroneously marked, an alarm is sounded as described subsequently. Vacant contacts between the groups have positions corresponding to the contacts which are connected to the conductors of the date register relays, set 6, for stopping the wipers in a position corresponding to the first digit of the registered date.

In response to the wiper 1902 encountering ground potential for marking the digit 3 as previously described wiper 1901 is stopped between the third and fourth group of contacts. In response to the releasing of relay 1030, stepping magnet 1900 and interrupter relay 1050 operate alternately in the manner previously described until wiper 1901 encounters the marked contact, for example, the contact corresponding to the digit one in the fourth group. When the marked contact is encountered, a circuit is completed from ground potential on conductor 1 of register relays, set 7 wiper 1901, conductor 1917, upper winding of relay 1030, conductor 1036, wiper 1707 and the third engaged contact, conductor 2687 of cable 2680, contacts of vertical off-normal springs 2689, resistor 2688 to negative battery. Upon operating, relay 1030 at contacts 1032 completes the previously traced circuit for operating interrupter relay 950, and at contacts 1031 opens the circuit of interrupter relay 1050. Relay 950 and stepping magnet 1700 operate and release in the manner previously described to step wipers 1701 to 1710, inclusive, to the fourth set of contacts. Relay 1030 releases in response to its circuit being opened when wiper 1707 advances to the fourth position.

A circuit is completed at contacts 4, 5 and 6 opposite wiper 1701 to step the wipers of the circuit control switch to the seventh set of contacts. The circuit may be traced from ground, interrupter contacts 1711, wiper 1701, stepping magnet 1700 to negative battery. Interrupter springs 1711 operate to step the wipers in the well known manner.

*Vertical stepping of the date selector*

While the wipers of the circuit control switch are in the seventh position the vertical wipers of the date selector are raised to a level that is determined by the date translating circuits. At the seventh contact which is accessible to wiper 1704 a circuit is completed for pick-up relay 1110 as follows: negative battery on vibrating pendulum 1231 of vibrator 1230, contacts 1233, contacts 1242, conductor 1235, lower winding of relay 1110, contacts 1103, break contacts 1113, conductor 1114, contacts 842, conductor 1115, seventh bank contact and wiper 1704, conductor 1117 to ground potential on conductor 837. Upon operating, relay 1110 at make contacts 1111 completes a holding circuit from negative battery, upper winding of relay 1110, contacts 1101, make contacts 1111 to ground potential on conductor 837. Relay 1110 is maintained operated by the holding circuit to place impulsing relays 1130 and 1140 under control of the vibrator. At break contacts 1111 the circuit which normally maintains impulsing relays 1130 and 1140 operated is opened; at break contacts 1113 the initial circuit for operating relay 1110 is opened; at make contacts 1113 the lower windings of relays 1130 and 1140 are connected in a series circuit with the vibrator; and at contacts 1112 stepping magnet 1800 of the impulsing control switch is connected to an impulsing circuit under control of impulsing relay 1130. After pick-up relay 1110 operates and while contacts 1233 of vibrator 1230 are still closed, impulsing relays 1130 and 1140 are maintained operated momentarily over the following circuit completed at make contacts 1233: negative battery, contacts 1233, contacts 1242, conductor 1235, lower winding of relays 1130 and 1140, make contacts 1113, conductor 1114, contacts 842, conductor 1115, seventh bank contact and wiper 1704, conductor 1117 to ground potential on conductor 837. When vibrating pendulum 1231 at contacts 1233 opens the circuit to release the impulsing relays, a circuit for energizing the stepping magnet 1800 of the impulsing control switch is closed momentarily at contacts 1133; and a circuit for energizing the vertical stepping magnet 2669 of the date selector, Fig. 26, is closed at contacts 1141. The circuit for the stepping magnet 1800 may be traced from negative battery, winding of stepping magnet 1800, conductor 1810, contacts 1124, contacts 1133, contacts 1112 to ground potential on conductor 837. The circuit for stepping the wipers of the date selector extends from negative battery, impulsing contacts 1141, conductor 1144, wiper 1706 and the engaged seventh contact, conductor 1713, contacts 992, conductor 2683 of cable 2680, contacts 2653, contacts of cam springs 2690, winding of vertical magnet 2669 to ground. Upon being energized, vertical magnet 2669 raises wipers 2661 to 2668 to a position opposite the first level of bank contacts and actuates vertical off-normal springs 2689. The off-normal springs prepare a circuit from conductor 2687 to wiper 2661 which subsequently tests for an idle flight selector, and prepare a circuit for release magnet 2670. In response to the reoperation of relays 1130 and 1140 the last traced circuits are opened momentarily to deenergize their respective stepping magnets. The vertical stepping magnet 2669 restores and the stepping magnet 1800 releases its armature for rotating wipers 1801 to 1808. The impulsing relays continue to respond to the vibrator and to step the wipers of the two switches until wiper 1805 encounters a contact marked by ground potential to complete a circuit for operating cut-off relay 970.

*Date translation*

The particular contact to which ground potential is applied for determining the level to which the wipers of the date selector are raised, is determined by the position of wipers 1901 to 1912 of the date finder switch. And, also, by the positions of the wipers 2001 to 2031, inclusive, of the date marking switch assembly. The marking switch assembly consist of thirty-one switches, one switch for each day of the month. Each switch has ten marking contacts and an "off" position, each of the ten marking contacts corresponding to a level in the date selector switch, Fig. 26. For example, if wiper 2001 of the first switch which corresponds to the first day of a month had been manually set at its number 1 contact, and if the date number "01" had been registered on the date register relays, the wipers of the date selector switch would be raised to the first level of bank contacts for subsequently connecting an operator's sending position to a first group of space indicators. However, if a supervisor had determined that the transactions for the first day of a month should be displayed on a second group of indicators and had set wiper 2001 to its number 2 contact, the wipers of the date selector switch would be raised to the second level of bank contacts corresponding to a second group of space indicators. Each day ten wipers of the date marking switches are engaging contacts corresponding to ten different levels of the date selector switch, while the remaining twenty-one wipers are in their respective "off" positions.

In the present example it may be assumed that available reservations are being displayed for the thirtieth and thirty-first days of one month and for the first to the eighth days, inclusive, of the next month. The wiper 2001 of the first date marking switch is set arbitrarily at its third contact for assigning the display corresponding to the first day of the month to the group of indicators that are accessible through the third level of the date selector. Wipers 2002 to 2008, inclusive, corresponding to calendar dates 2 to 8 are set on contacts 4 to 10, respectively, to prepare circuits for stopping the wipers of the date selectors opposite levels 4 to 10, respectively; wipers of the ninth to the twenty-ninth switches (not shown) are set to their respective "off" positions; the wiper of the thirtieth switch (not shown) is set on its first contact corresponding to the first level; and, finally, wiper 2031 for the thirty-first calendar date is set on its second contact corresponding to the second level of the selector switch.

When the transactions for the thirtieth day are completed, the wiper of the corresponding date marking switch is manually rotated from its number 1 position to its "off" position, and the wiper corresponding to the ninth day, which is the new date for which the number of unreserved spaces are to be displayed, is set to its number 1 position. After the space indicators for the past date have been reset as described subsequently, the number of unreserved spaces for the new date are displayed on the group of indicators which are no longer required for the past date.

The banks of the date marking switches are connected to ten levels 1903 to 1912 of the date finder switch. In these ten levels the contacts that are connected correspond in position to the thirty-one contacts which in the level opposite wiper 1901 mark the calendar dates. Successive one of the connected bank contacts in the first level 1903 of the date finder bank are connected, respectively, to a first bank contact in each successive date marking switch 2001 to 2031; successive one of the connected contacts in the second level 1904 of the date finder bank are connected, respectively, to a second bank contact in each successive date marking switch; and in a similar manner the third to the tenth levels (1905–1912) of bank contacts are connected to the third to the tenth bank contacts, respectively, in each successive date marking switch.

*Termination of impulsing*

The wipers of the date finder switch terminate in the banks of the impulse control switch which is operated in unison with the date selector until the impulse control switch wiper 1805 encounters a ground extending through a wiper of the date finder switch and a wiper of one of the marking switches. It has been assumed that wipers 1901 to 1912 have been positioned according to the previously registered date 31, and that the wiper of the marking switch for the thirty-first day of a month has been set to number 2. In response to wiper 1805 of the impulsing control switch encountering its second contact, a circuit is completed from ground, wiper 2031, conductor 2142 of cable 2140, wiper 1911 and its thirty-first connected contact, conductor 1922, wiper 1805 and its second contact, conductor 1811 of cable 1812, seventh contact opposite wiper 1705, conductor 1718, lower winding of cut-off relay 970 to negative battery. Upon operating, cut-off relay 970 closes a circuit from ground potential on conductor 837, contacts 971, conductor 972, lower winding of relay 1120, and upper windings of impusing relays 1130 and 1140. Relays 1130 and 1140 are maintained operated to stop the transmission of impulses to stepping magnet 1800 and to vertical stepping magnet 2669. Relay 1120 operates and at contacts 1121 completes a circuit for operating relay 1100, at contacts 1122 closes a circuit for energizing stepping magnet 1700 of the circuit control switch, at contacts 1124 opens a further point in the previously traced impulsing circuit for stepping magnet 1800, at contacts 1126 opens a point in an alarm circuit, at contacts 1128 closes a locking circuit for relay 970, and at contacts 1123, and 1125 closes circuits for returning the wipers of the impulsing control switch to normal. The circuit for operating relay 1100 may be traced from negative battery, winding of relay 1100, contacts 1121 to ground potential on conductor 837. Relay 1100 at contacts 1101 and 1103 opens circuits for releasing pick-up relay 1110, and at contacts 1102 closes momentarily including a circuit the upper winding of operated relay 1120. Upon releasing, relay 1110 at contacts 1112 opens still another point in the impulsing circuit previously traced for stepping magnet 1800, at make contacts 1113 opens a point in the circuit that includes the windings of impulsing relays 1130 and 1140 and the contacts of vibrator 1230, at break contacts 1113 prepares an operating circuit for the lower winding of pick-up relay 1110, at break contacts 1111 closes a circuit for maintaining impulsing relays 1130 and 1140 operated independently of contacts of relay 970, and at make contacts 1111 opens the circuit including the upper winding of relay 1120. The circuit completed for energizing the stepping magnet 1700 of the circuit control switch may be traced from negative battery, stepping magnet 1700, wiper 1701 and its seventh contact, conductor 1719, contacts 1122 to ground. The circuit for energizing stepping magnet 1800, includes negative battery, winding of stepping magnet 1800, conductor 1810, contacts 1123, conductor 1813, interrupter contacts 1820, conductor 1814, contacts 883, conductor 1815, contacts 1183, conductor 1236, second contact opposite wiper 1802, wiper 1802, conductor 1115, wiper 1704 engaging its seventh contact, conductor 1117, and ground potential on conductor 837. Stepping magnet 1800 and interrupter springs 1820 co-operate in the usual manner to step wipers 1801 to 1808 from their respective second contacts to their twenty-sixth contacts. When wiper 1802 reaches its eleventh contact, the last traced operating circuit is shifted to include contacts of relay 1120 and 1180; and when the wiper reaches its twenty-second contact the operating circuit is again shifted to include contacts of relay 1280 in addition to the previously included contacts. More particularly, a part of the circuit may be traced from conductor 1315 through contacts 1183, contacts 1125, contacts 1184, conductor 1286 to contacts eleven to twenty-one, inclusive, accessible to wiper 1802; and the final circuit may be traced from contacts 1184, conductor 1189, contacts 1284, conductor 1287 to the twenty-second to twenty-fifth contacts, inclusive. As the wipers of the impulse control switch step off their second contacts, the previously traced circuit for operating relay 970 is opened, but the relay is maintained operated over the following circuit until the wiper of the switch are returned to normal: negative battery, upper winding of relay 970, conductor 1816, contacts 1128, and to conductor 1236, which is connected to ground potential through wiper 1802 as previously described. In response to wiper 1802 stopping on its twenty-sixth contact, relay 970 releases and at contacts 971 opens a previously traced operating circuit of relay 1120. Upon releasing, relay 1120 at contacts 1121 opens a circuit to release relay 1100, and at contacts 1122 opens a previously traced circuit to deenergize stepping magnet 1700 for advancing wipers 1701 to 1710 to their eighth respective contacts.

*Selection of an idle flight selector*

While the wipers of the circuit control switch are in their eighth position, the wipers of the date selector are rotated to establish connection with an idle flight selector. A circuit for operating interrupter relay 1050 may be traced from negative battery, winding of relay 1050, contacts 1031, conductor 1035, the eighth contact which is engaged by wiper 1703, conductor 1714, contacts 996, conductor 2685 of cable 2680, contacts 2627, rotary interrupter springs 2691, and ground. Upon operating, relay 1050 at contacts 1051 closes the following circuit for energizing rotary stepping magnet 2660 of the date selector switch; negative battery, contacts 1051, conductor 1052, the eighth contact opposite wiper 1708, conductor 1720, contacts 993, conductor 2684 of cable 2680, contacts 2655, winding of rotary magnet 2660, and ground potential. Upon operating rotary magnet 2660 rotates wipers 2661 to 2668 to the first set of bank contacts in the selected level and opens interrupter contacts 2691. In response to the opening of interrupter contacts 2691, interrupter relay 1050 releases to open the circuit of stepping magnet 2660, which releases for again closing the operating circuit of relay 1050. Relay 1050 and interrupter springs 2691 cooperate to rotate the wipers until wiper 2661 encounters a contact at negative potential for marking the circuits of an idle flight selector. When the circuit of an idle flight selector are encountered, the following circuit is completed for operating interrupter control relay 1030 and connect relay 2650: negative potential through resistor 2692 in the flight selector, normally closed contacts of vertical off-normal springs 2693, bank contact 2671, wiper 2661, lower winding of relay 2650, make contacts of vertical off-normal springs 2689, conductor 2687 of cable 2680, wiper 1707 and its eighth contact, conductor 1036, upper winding of relay 1030, conductor 1917, and ground potential on wiper 1991 of the date finder switch. Relay 1030 at contacts 1031 opens the previously traced circuit of interrupter relay 1050 and at contacts 1032 closes the following circuit for operating interrupter relay 950: negative battery, stepping magnet 1700, wiper 1701 and its eighth contact, conductor 1716, winding of relay 950, conductor 1034, contacts 1032, conductor 1234, interrupter springs 1711, and ground potential. Relay 2650 operates to connect controlling circuits to the flight selector, and to close its locking circuit from ground, contacts controlled by release magnet 2697 bank contacts 2672, make contact of relay 2650, upper winding of relay 2650 to negative battery, the make contacts connected across the lower winding are closed to reduce the resistance of the busy-test circuit. Relay 950 at contacts 951 connects the winding of stepping magnet 1700 directly to ground potential for stepping wipers 1701 to 1710, in a manner previously described, to the ninth set of contacts.

Should all of the flight selectors of the selected level be busy, cam springs 2690 will be actuated, as the wipers of the date selector step off their tenth set of contacts, to complete a circuit for operating relay 1030 and, also, to prepare an operating circuit for busy relay 890. The circuit completed for operating interrupter control relay 1030 when all accessible flight selectors are busy may be traced from negative battery, resistor 2688, cam springs 2690, contacts of vertical off-normal springs 2689, conductor 2687 of cable 2680, wiper 1707 and its eighth contact, conductor 1036, upper winding of relay 1030, conductor 1917, and ground potential on wiper 1901 of the date finder switch. In response to the operation of relay 1030, the circuit of interrupter relay 1050 is opened, and relay 950 and stepping magnet 1700 operate and release as previously described to step wipers 1701 to 1710 to the ninth set of contacts.

If all flight selectors of the selected date are busy, the wipers of the circuit control switch remain on their ninth contacts until the converter circuit is manually released, but if an idle selector has been selected the wipers of the circuit control switch are automatically advanced to their tenth contacts. When there is a busy condition, busy relay 890 is operated over the following circuit: negative battery, resistor 2694, contacts of cam springs 2690, contacts 2653, conductor 2683 of cable 2680, contacts 992, conductor 1713, wiper 1706 and its ninth contact, conductor 1721, upper winding of relay 890, and ground potential. At contacts 893 a circuit is opened to prevent further operation of stepping magnet 1700, and at contacts 891 and 892 the circuit of the seize lamp 739 is disconnected from a previously traced circuit and connected to conductor 826 which is connected to ground intermittently to cause the seized lamp to flash. Upon observing the flashing lamp, the operator presses the release key for restoring the converter circuits to normal in the manner subsequently described.

When an idle flight selector is found, cam springs 2690 remain unoperated to prevent the operation of the busy relay; and in response to wiper 1701 of the circuit control switch encountering its ninth contact, the following circuit is completed through contacts of the register control switch for operating stepping magnet 1700, provided the operator has previously registered the flight number for advancing the register control switch beyond its eleventh position: negative battery, stepping magnet 1700, wiper 1701 and its ninth contact, conductor 1722, wiper 1606 and its engaged contact, conductor 953, contacts 893, conductor 952, winding of relay 950, conductor 1034, contacts 1032, conductor 1234, interrupter contacts 1711, and ground. Relay 950 and stepping magnet 1700 operate and release in a manner previously described for advancing wipers 1701 to 1710 to their tenth position.

*Vertical stepping of the flight selector*

While the wipers of the circuit control switch are in their tenth position, the wipers of the selected flight selector are raised to a level corresponding to the first digit of the previously registered flight number. In general the same circuits are employed for controlling the transmission of impulses to vertical magnet 2630 as were employed for transmission of impulses to vertical magnet 2669 of the date selector. When wiper 1704 of the circuit control switch encounters its tenth contact the previously described circuit is completed through contacts of vibrator 1230 for operating pick-up relay 1110. Upon operating, relay 1110 places impulsing relays 1130 and 1140 under control of the vibrator, and at contacts 1112 connects contacts 1133 of an impulsing relay in a circuit for controlling stepping magnet 1800 of the impulsing control switch. Wipers 1801 to 1808 of the impulsing control switch and wipers 2631 to 2638 of the flight selector are stepping in unison in the same manner as described in detail for the date selector. The circuit for stepping the wipers of the flight selector may be traced from negative battery, impulsing contacts 1141, conductor 1144, wiper 1706 and its tenth contact, conductor 1713, contacts 992, conductor 2683 of cable 2680, contacts 2654, wiper 2666, bank contacts 2676, contacts 2623, contacts of cam springs 2695, winding of vertical magnet 2630 to ground potential. As wipers 2631 to 2638 are raised, vertical off-normal springs 2693 are actuated to prepare a release circuit and to extend the busy test circuit to wiper 2631 of the flight selector. Relay 1030 releases in response to its previously traced circuit being opened at the vertical off-normal springs. When wiper 1806 of the impulsing control switch encounters ground potential through contacts of the eighth set of register relays the following circuit is completed for operating cut-off relay 970: ground potential on wiper 1806, conductor 1817 of cable 1812, tenth contact opposite wiper 1705, wiper 1705, conductor 1718, lower winding of relay 970 to battery. Relay 970 closes a previously traced circuit for maintaining impulsing relays 1130 and 1140 operated and for operating relay 1120. In response to the operation of relay 1120, relay 1100 operates, the stepping magnet 1700 of the circuit control switch is energized, and the wipers of the impulsing control switch are returned to normal in the manner previously described. Pickup relay 1110 is released in response to the operation of relay 1100. In response to wiper 1802 stopping on its twenty-sixth contact, relay 970 releases and then relay 1120 releases as previously described. The wipers of the circuit control switch are advanced to their eleventh position and relay 1100 releases in response to the releasing of relay 1120.

*Selection of an idle connector*

While the wipers of the circuit control switch are in their eleventh position, the wipers of the flight selector are rotated until circuits of an idle connector are encountered. A circuit for operating interrupter relay 1050 may be traced from negative battery, winding of relay 1050, contacts 1031, conductor 1035, wiper 1703 and its eleventh contact, conductor 1714, contacts 996, conductor 2685 of cable 2680, contacts 2653, wiper 2664, bank contact 2674, contacts 2627, rotary interrupter springs 2696 to ground potential. Upon operating, relay 1050 at contacts 1051 closes the following circuit for energizing rotary stepping magnet 2639; negative battery, contacts 1051, conductor 1052, wiper 1708 and its eleventh contact, conductor 1720, contacts 993, conductor 2684 of cable 2680, contacts 2656, wiper 2665, bank contact 2675, contacts 2625, rotary magnet 2639, and ground. Interrupter contacts 2696 and contacts of interrupter relay 1050 operate alternately, in a manner previously described for the date selector, to rotate wipers 2631 to 2638 until circuits of an idle connector are encountered. When wiper 2631 encounters negative potential for marking an idle connector, the following circuit is completed for operating cut-off relay 1030 and connect relay 2630: negative battery, resistor 2699, contacts of vertical off-normal springs 2698, bank contact 2640, wiper 2631, conductor 397 of cable 394, contacts 392, Fig. 3, conductor 396 of cable 394, lower winding of relay 2620, contacts of vertical off-normal springs 2693, bank contact 2671, wiper 2661, contacts shunting the lower winding of relay 2650, contacts of vertical off-normal springs 2689, conductor 2687 of cable 2680, wiper 1707 and its eleventh contact conductor 1036, upper winding of relay 1030, conductor 1917, and ground potential on wiper 1901 of the date translating circuits. Relay 1030 at contacts 1031 opens the previously traced circuit of relay 1050 and at contacts 1032 closes a circuit similar to the one previously traced to operate interrupter relay 950. Relay 2620 operates to connect wipers of the flight selector to circuits for controlling the selected connector. A locking circuit for relay 2620 is completed from ground, contacts of the connector release magnet RLSE, bank contact 2641, wiper 2632, make contacts and upper winding of relay 2620 to negative battery. Make contacts are shunted across the lower winding of relay 2620 to remove the resistance of the lower winding from the test-bust circuit. In response to relay 950 operating, wipers 1701 to 1710 of the circuit control switch are advanced to their twelfth contacts in a manner previously described.

If a connector can not be seized, a circuit for busy relay 890 is prepared while the wipers of the circuit control switch are still in their eleventh position. Either one of two conditions may prevent seizure of a connector. If all connectors, accessible at the previously selected level of the flight selector, are busy, negative potential required for completing the circuits of relays 2620 and 1030 is disconnected from the respective bank contacts, such as contact 2640, but the operation of the respective vertical off-normal springs.

The operating circuits of relays 2620 and 1030 may also be controlled by the reset converter. The reset converter may be operated as subsequently described to reset automatically all space indicators corresponding to any selected one of the ten dates for which available reservations are being displayed. A level busy relay is provided for each one of the dates; and while the space indicators for a selected date are being reset, a corresponding level busy relay is operated. The operated level busy relay disables the busy test circuits of all alike selectors that have access to the indicators which are being reset. In the present example, the level busy relay 390 may operate to open the busy-test circuit at contacts 392.

If the test circuit is incomplete due to either a busy condition of all accessible connectors, or to the operation of a particular level busy relay, the wipers 2631 to 2638 of the selector continue to their eleventh position. As the wipers rotate from their tenth to their eleventh position, cam springs 2695 operate to prepare a circuit for busy relay 890 and to complete a circuit for operating relay 1030 may be traced from negative battery, resistor 2692, contacts of cam springs 2695, contacts of vertical off-normal springs 2693, bank contact 2671, wiper 2661, contacts shunting the lower winding of relay 2650, contacts of vertical off-normal springs 2689, conductor 2687 of cable 2680, wiper 1707 and its eleventh contact, conductor 1036, upper winding of relay 1030, conductor 1917, wiper 1901 and to ground potential in the date translating circuits. Upon operating, relay 1030 at contacts 1031 opens the circuit of interrupter relay 1050 to prevent the further transmission of impulses to the selector, and at contacts 1032 completes a circuit through wiper 1701 and its eleventh contact for operating relay 950. Relay 950 and stepping magnet 1700 operate and then release as previously described to advance wipers 1701 to 1710 to their twelfth contacts. In its twelfth position wiper 1706 completes the following circuit for operating busy relay 890: negative battery, resistor R2695, contacts of cam springs 2695, contacts 2623, bank contacts 2676, wiper 2666, contacts 2654, conductor 2683 of cable 2680, contacts 992, conductor 1713, wiper 1706, conductor 1721, upper winding of busy relay 890, and ground potential. The busy relay operates to cause seize lamp 739 to flash intermittently and to open a point in the circuit of stepping magnet 1700 as previously described. The operator relieves the converter circuit to restore the circuits to normal in a manner described subsequently.

When the wipers of the circuit control switch advance to their twelfth contacts in response to the selection of an idle connector, the following circuit is completed to advance the wipers further to their thirteenth contacts: negative battery, stepping magnet 1700, wiper 1701 and its twelfth contact, conductor 953, contacts 893, conductor 952, winding of relay 950, conductor 1034, contacts 1032, conductor 1234, interrupter contacts 1711, and ground potential. Relay 950 and magnet 1700 operate as previously described to rotate wipers 1701 to 1710 to their thirteenth contacts.

*Vertical stepping of the connector*

While the wipers of the circuit control switch are in their thirteenth position, wipers 2601 to 2607 of the selected connector are raised to a level corresponding to the second digit of the previously registered flight number. As wiper 1704 encounters its thirteenth contact, a previously traced circuit is completed to operate pickup relay 1110. Relays 1130 and 1140 are controlled by the vibrator to step the wipers of the impulsing control switch in unison with the wipers of the connector in a manner previously described for the selectors. The impulsing circuit is now extended through contacts 2624 of the connect relay in the flight selector, wiper 2636, bank contact 2645, contacts 2615, winding of vertical stepping magnet 2600 to ground potential. As wipers 2601 to 2607 are raised, off-normal springs 2698 operate to disconnect negative potential from the busy-test circuit and to complete an additional path to ground potential for the locking circuit of connect relay 2620. In response to disconnecting negative potential from the busy-test circuit relay 1030 releases.

When wiper 1897 of the impulse control switch encounters ground potential through the contacts of the register relays in the ninth set, the following circuit is completed for operating cut-off relay 970; ground potential on the contact which corresponds to the second digit of the registered flight number, wiper 1807, conductor 1818, wiper 1705, conductor 1718, upper winding of relay 970, and negative battery. Relay 970 closes a previously traced circuit for maintaining impusing relays 1130 and 1140 operated, and for operating relay 1120. Relay 1100 operates again; the stepping magnet 1700 of the circuit control switch is energized; the wipers of the impulsing control switch return to their normal position; relays 1110, 970, 1120, and 1100 release; and the wipers of the circuit control switch are advanced to their fourteenth set of contacts.

Rotary stepping of the connector

In response to the wipers of the circuit control advancing to their fourteenth contacts, the wipers of the connector are rotated to a position corresponding to the third digit of the previously registered flight number. The transmission of impulses is controlled as previously described. The circuit for operating the rotary stepping magnet 2608 may be traced from negative battery, contacts 1142 of impulsing relay 1140, conductor 1052, wiper 1708 and its fourteenth contact, conductor 1720, contacts 993, conductor 2684 of cable 2680, contacts 2656, wiper 2665, bank contact 2675, contacts 2626, wiper 2635, bank contact 2644, contacts 2617, rotary magnet 2608 to ground potential. When the wipers of the connector reach the bank contacts for establishing connection to the group of space indicators that correspond to the third digit of the flight number, the following circuit is completed for operating cut-off relay 970; ground potential through contacts of the register relays in the tenth set, wiper 1808 and its engaged contact, conductor 1819 of cable 1812, fourteenth contact and wiper 1705, conductor 1718, lower winding of relay 970, and negative battery. When relay 1120 releases, wipers 1701 to 1710 of the circuit control switch advance to their fifteenth contacts in a manner previously described.

If the selected group of space indicators are idle, interrupter control relay 960 operates in response to the following circuit being completed at the fifteenth contact opposite wiper 1707: negative battery, winding of relay 960, contacts 901, conductor 963, wiper 1707, conductor 2687 of cable 2680, contacts of vertical off-normal springs 2689, make contacts connected in shunt with the lower winding of relay 2650, wiper 2661, bank contact 2671, contacts of vertical off-normal springs 2693, contacts connected in shunt with the lower winding of relay 2620, conductor 396 through break contacts 392 of a level busy relay in the reset converter to conductor 397, wiper 2631, bank contact 2640, contacts of operated vertical off-normal springs 2693, contacts 2619, wiper 2607, bank contact 2757, busy lamp 2750, and ground potential. Upon operating, relay 960 at contacts 961 opens a circuit to prevent the operation of slow-operating busy relay 900, and at contacts 962 closes the following circuit for energizing both relay 950 and stepping magnet 1700: negative battery, winding of stepping magnet 1700, wiper 1701 and its fifteenth contact conductor 1723', sixteenth contact opposite wiper 1607, conductor 953, contacts 893, conductor 952, winding of relay 950, contacts 962, conductor 1229, conductor 1234, interrupter springs 1711, and ground potential. Wipers 1701 to 1710 are rotated to their sixteenth contacts.

If the selected group of space indicators are busy, the wipers of the circuit control switch remain at their fifteenth contacts, and the seize lamp at the operator's sending set flashes intermittently. Relay 960 is prevented from operating in series with the busy lamp because the relay of this converter is now shunted by the winding of a relay corresponding to relay 960 or 1020 in another converter circuit. The slow-operating busy relay 900 operates in response to the completion of the following circuit at the fifteenth contact opposite wiper 1706: ground potential, winding of vertical stepping magnet 2600, contacts 2615, bank contact 2645, wiper 2636, contacts 2624, bank contact 2676, wiper 2666, contacts 2654, conductor 2683, contacts 992, conductor 1713, wiper 1706 and its fifteenth contact, conductor 1724, contacts 961, winding of relay 900, and negative battery. Relay 900 at contacts 901 opens a point in the previously traced circuit of relay 960, and at contacts 903 connects the previously traced circuit of seize lamp 739 to conductor 826 to which ground potential is applied intermittently.

Checking the registered information

While the wipers of the circuit control switch are in their sixteenth position, the previously registered information is checked in response to the clerk's operating check key 732. However, before operating the check key, the operator should observe that send lamp 779 is illuminated. The send lamp is illuminated in response to the operation of relay 910 which operates when the following circuit is completed as the wipers of the circuit control switch are advanced to their sixteenth contacts: negative battery, upper winding of relay 910, conductor 914, sixteenth contact opposite wiper 1706, conductor 1713, contacts 992, conductor 2683 of cable 2680, contacts 2654, wiper 2666, bank contact 2676, contacts 2624, wiper 2636, bank contacts 2645, contacts 2615, winding of vertical magnet 2600, and ground potential. The illumination of the send lamp indicates that the digits for the point of departure and for the point of destination have been registered. If these digits had not been registered the previously traced circuit that includes the fifteenth contact opposite wiper 1701 would not be completed to step wipers of the circuit control switch beyond their fifteenth contacts. The check key is operated three times to ascertain that the correct group of space indicators have been selected and then operated four times to check information corresponding to the point of departure and the point of destination. During the first three times that the key is operated, the following circuit is completed to operate check relay 1040 for illuminating check lamp 2758 which is grouped with the selected space indicators of Fig. 27: negative battery, resistor 799, contacts of check key 732, contacts 785, contacts 795, wiper 711, conductor 786, contacts 806, lower winding of relay 810, conductor 894, wiper 1601 and its sixteenth contact, conductor 1042, winding of check relay 1040, and ground. Relay 1040 at contacts 1041 completes a circuit from negative battery, contacts 1041, conductor 1725, the sixteenth contact accessible to wiper 1709, conductor 1715, contacts 994, conductor 2681 of cable 2680, contacts 2652, wiper 2668, bank contact 2678, contacts 2622, wiper 2638, bank contact 2647, contacts 2611, wiper 2601, bank contact 2751, check lamp 2758 to ground potential. Each time that relay 810 restores in response to the releasing of the check key, the wipers 1601 to 1607 of the register control switch advance to their next contacts. In response to releasing the check key the third time the wipers advance to their nineteenth contacts. After the reservation clerk observes that the intervals during which the check lamp is illuminated coincides with the intervals during which the check key is operated, the clerk observes lamps, 751 to 759, inclusive, of Fig. 7 for indicating the previous registration of digits "1" to "9," inclusive, and lamp 778, for the digit "0."

In response to the check key being operated for the fourth time, negative potential is applied as previously described to wiper 1601 of the register control switch and is now extended through the engaged nineteenth contact, conductor 1651 of cable 1650 to the winding of relay 1461, the circuit for relay 1461 continuing to ground through contacts 1465. Upon operating, relay 1461 closes its ten contacts for connecting the ten lamps 778, and 751 to 759, inclusive, to the ten conductors which are connected to the contacts of the eleventh set of register relays. For example, if the first digit of the number for designating the point of departure is "1," a circuit is completed from ground potential through contacts of the register relay, conductor "1 of set 11," contacts 1466, conductor 1471 of cable 1470, wiper 701, contacts 741, indicating lamp 751 to battery potential. The illumination of lamp 751 informs the operator that the correct digit has been registered. In response to releasing the check key, relay 810 releases as previously described to rotate wipers 1601 to 1607 of the register control switch to their twentieth contacts. Relay 1461 releases to disconnect the lamps from the ten conductors of the eleventh set of register relays. In a similar manner, the next three operations of the check key apply negative potential successively to the twentieth, twenty-first, and twenty-second contacts accessible to wiper 1601. The twentieth contact is connected through conductor 1652 to the winding of relay 1462; the twenty-first contact is connected through conductor 1653 to relay 1463; and the twenty-second contact is connected through conductor 1654 to relay 1464. Relays 1462, 1463, and 1464 operate successively in response to the repeated reoperation of the check key. Upon operating, relay 1462 momentarily connects the lamps 778, and 751 to 759, inclusive, to corresponding conductors of the twelfth set of register relays for checking the second digit in the number previously registered for the point of departure; relay 1463 momentarily connects the lamps to the conductors of the thirteenth set of register relays; and relay 1464 connects the lamps to the conductors of the fourteenth set of relays. The thirteenth and fourteenth sets of relays correspond to the first and second digits, respectively, of the number designating the point of destination. In response to the releasing of the check key for the final time, the wipers of the register control switch are advanced to their twenty-third contacts.

*Registering the number of reservations*

After the checking operation is completed, the operator presses the digit key corresponding to the number of spaces to be reserved. As described subsequently, the operator may usually register but one or two spaces in one operation. Circuits are completed through the twenty-third contacts of the register control switch to register the digit on the fifteenth set of register relays in a manner previously described for registering digits on other groups of register relays. Through the operation and release of either relay 810 or 820 the wipers of the register control switch are advanced to their twenty-fourth set of contacts.

As the wipers of the register control switch are advanced to their twenty-fourth contacts, the following circuit is completed for advancing the wipers of the circuit control switch to their seventeenth contacts: negative battery, winding of stepping magnet 1700, wiper 1701 and its sixteenth contact, conductor 1726, twenty-fourth contact opposite wiper 1607, conductor 953, contacts 893, conductor 952, winding of relay 950, contacts 962, conductor 1229, conductor 1234, contacts 1711 of the interrupter springs, and ground potential.

*Seizing the marking circuits*

Providing the marking circuits of Figs. 21 to 25, inclusive, are not being held by another converter, the following circuit is completed for operating seize relay 1190 and for energizing relay 2530: ground potential at contacts 2613 of the connect relay in the connector, bank contact 2646, wiper 2637, bank contact 2677, wiper 2667, conductor 2682 of cable 2680, contacts 995, conductor 1730, wiper 1710 and its seventeenth contact, conductor 1728, upper winding of relay 1190, contacts 1195, conductor 2541 extending to Fig. 25, contacts 2534, contacts 2501, conductor 2542, contacts 1196C shown at lower right of Fig. 12, contacts 1196B, contacts 1196A, conductor 1247, contacts 1196, conductor 2543 extending to Fig. 25, upper winding of relay 2530, and negative potential. Upon operating, seize relay 1190 at contacts 1191 and 1192 prepares a circuit for energizing stepping magnet 1700 of the circuit control switch, at contacts 1193 prepares a circuit for operating marking connect relay 1300 and code connecting relays 1453, and 1454; at contacts 1194 closes its locking circuits; at contacts 1195 opens its original energizing circuit; at contacts 1196 opens a chain circuit to prevent the operation of relays which in other converters are similar to seize relay 1199; at contacts 1197 prepares a circuit for operating code connecting relays 1451 and 1452; and at contacts 1198 prepares a circuit for operating code connecting relays 1441, 1442, and 1443. The locking circuit extends from ground potential at contacts 2613 through the upper winding of seize relay 1190 as previously traced and continues through contacts 1194, conductor 2543 to Fig. 25, winding of slow-operating relay 2530 to negative battery.

If a seize relay in another converter, such as relay 1190A, is operated, the operation of relay 1190 in this converter is delayed until relay 1190A releases to restore the marking circuits of Figs. 21 to 25, inclusive. Upon releasing, relay 1190A at contacts 1196A completes the previously traced circuit for operating relay 1190. It may also be observed that if two seize relays operate simultaneously, that the relay having its locking circuit connected to a point which is nearer to negative potential on conductor 2543 is maintained operated and opens a point in the locking circuit of the other relay to cause it to release. For example, relay 1190A upon operating opens at contacts 1196A the locking circuits of relay 1190B and 1190C.

Shortly after seize relay 1190 operates, slow-operating relay 2530 operates. At contacts 2533, the following circuit is completed for operating code connecting relays 1441, 1442, and 1443: ground potential, contacts 2533, conductor 2544 extending to Fig. 12, contacts 1198, conductor 1145, winding of relays 1441, 1442, and 1443, to negative potential. At contacts 2531 the following circuit is completed for operating code connecting relays 1451 and 1452: ground potential on conductor 1728 (connected to the upper winding of relay 1190) contacts 1197, conductor 1153, of windings of relay 1451 and 1452, conductor 2540 to Fig. 25, contacts 2531, winding of relay 2530 to negative battery.

Each of the code connecting relays have ten contacts for connecting a respective set of conductors from register relays to the marking circuits. Relay 1441 connects the conductors of the eighth set of register relays to ten relays such as relays 2100 and 2110; relay 1442 connects the ten conductors of the ninth set of register relays to ten conductors "9-1" to "9-0," inclusive; and relay 1443 connects the ten conductors of the tenth set of register relays to ten relays as represented by relays 2120, 2130, and 2140. Upon operating, relay 1451 connects the ten conductors of the eleventh set of register relays to the ten conductors "11-1" to "11-0" in the marking circuits; and relay 1452 connects the ten conductors of the twelfth set of register relays to ten relays such as relays 2150, 2151, 2152, and 2153. One of the conductors "8-1" to "8-0" is now at ground potential as determined by the first digit of the previously registered flight number and operates a corresponding relay. For example, if the first digit of the flight number is "1" and circuit is completed from ground through the contacts of the eighth set of register relays, conductor "1-set 8," contacts 1444, conductor "8-1" of cable 2170, winding of relay 2100 to negative battery. If the third digit of the flight number is "2," a circuit is completed from ground potential through the contacts of the tenth set of relays, a make contact on relay 1443, a conductor in cable 2170, the winding of the relay corresponding to the digit "2" for example relay 2130, to negative battery. If the second digit of the flight number is "0," a circuit may be traced from ground potential, contacts of the ninth set of register relays, conductor "0-set 9," contacts 1445, conductor "9-0," contacts 2131, contacts 2101 to terminal 2102 in the terminal strip 2103. From terminal 2102 a circuit is completed to operate one of the flight marking relays of Fig. 22. The four flight marking relays shown in Fig. 22 are similar to the large number of flight relays that are required. One relay is required for each flight, and the winding of each relay is connected to an individual terminal in terminal strip 2203. Terminals in the strip 2103 are cross-connected to terminals in strip 2203 such that the three digit code number corresponding to the flight operates any predetermined one of the relays in Fig. 22. If terminal 2240 is connected to terminal 2102 the circuit is completed through the winding of relay 2210 to ground potential. Relay 2210 closes two groups of make contacts. The upper group of contacts connects the winding of the relays shown in Fig. 23 to circuits which are marked according to the digits designating the point of departure; and the lower group of contacts connects the winding of relays shown in Fig. 24 to circuits which are to be marked according to the digits designating the point of destination. Although each of the relays shown in Fig. 22 have fifteen contacts corresponding to the points of departure and fifteen contacts corresponding to the points of destination in the respective flights, relays corresponding to flights having less than fifteen stops following the initial point of departure may have fewer contacts.

In response to the previous registration of the first digit in the number corresponding to the point of departure, ground potential is connected to one of the 10 conductors "11-1" to "11-0," and in response to the previous registration of the second a circuit is completed for operating one of the 10 relays in the group which includes relays 2150 to 2153, inclusive. If the second digit of the previously registered number in the twelveth set of register relays for the point of departure is "3," a circuit may be traced from ground potential through a conductor of cable 1530, contacts of relay 1461, a conductor of cable 2170, winding of relay 2152 to negative potential. Therefore, if the first digit for the point of departure registered on the eleventh set of register relay is "0," a circuit completed in response to the operation of relay 2152 may now be traced from ground potential through contacts of the eleventh set of register relays, contacts 1455, conductor 11-0 of cable 2170, contacts 2154, terminal 2155 cross-connected to terminal 2206, contacts 2211, conductor 2362 of cable 2360, winding of departure marking relay 2301, conductor 2380, winding of relay 2460 to negative potential. Upon operating, relay 2301 connects ground potential to contacts of destination marking relays of Fig. 24 for marking particular stops in the selected flight as subsequently described, and at contacts 2305 completes its locking circuit through conductor 2407, contacts 2106 to ground potential. Relay 2460 at contacts 2462 completes a circuit from ground potential, contacts 2462, conductor 2465, winding of slow operating relay 2500 to negative potential. Upon operating, relay 2500 at contacts 2501 opens a further point in the chain circuit which is connected to the windings of the seize relay, similar to relay 1190, and at contacts 2502 completes an obvious circuit for illuminating busy lamp 2503. Also, in response to the operation at relay 2460, the following circuit is completed for energizing stepping magnet 1700 of the circuit control switch: negative potential, winding of stepping magnet 1700, wiper 1701 and a 17th contact, conductor 1727, contacts 1192, conductor 2463 extending to Fig. 25, contacts 2461, conductor 2464 extending to Fig. 12, contacts 1181, conductor 1229, conductor 1234, contacts 1711 of the interrupted springs, and ground potential. The wipers of the circuit control switch are stepped in a self-interrupted manner to their 18th contacts.

At the 18th contacts of the circuit control switch, circuits are completed to maintain seize relay 1190 operated, and for operating marking-connect relay 1300 and code-connecting relays 1454 and 1453. The circuit for maintaining relay 1190 operated, may be traced from negative battery, winding of relay 2530, conductor 2543 extending to Figure 12, contacts 1194, lower winding of relay 1190, conductor 1729, 18th contacts and wiper 1710, conductor 1730, contacts 995, conductor 2682 of cable 2680, wipers 2667, bank contact 2677, bank contact 2646, contacts 2613 to ground potential. The following circuit is completed for operating relays 1300, 1453, and 1454: negative battery, relay 2530, contacts 2531, conductor 2540 extending to Figure 13, winding of relay 1300, conductor 2545, winding of relay 1454, winding of relay 1453, conductor 1152, contacts 1193 to ground potential on conductor 1729. Relay 1300 at fifteen make contacts connects the fifteen conductors 2421 to 2435, inclusive, to respective indicator marking relays of Fig. 13. Relay 1453 operates to connect the ten conductors of the 13th set of register relays in cable 1530 to ten conductors, "12-1" to "13-0" in cable 2170 and relay 1454 connects the ten conductors of the 14th set of register relays in cable 1530 to ten relays which include relays 2160 to 2163 by way of cable 2170. If the second digit in the number for designating the point of destination is "2," a circuit is completed from ground potential through contacts of the 14th set of register relays, a make contact of relay 1454, a conductor in the cable 2170 to relay 2161 which corresponds to the second digit; and if the first digit is considered to be "1," a circuit is completed from ground potential, through contacts of the 13th set of register relays, the conductor marked "1 set 13," contacts 2164, terminal 2165 which is cross-connected to terminal 2207, contacts 2208, conductor 2482 of cable 2470, winding of relay 2412 and negative potential.

Upon operating, relay 2412 connects ground potential from certain contacts of relay 2301 to a group of conductors which have previously been connected through contacts of relay 1300 to corresponding indicator marking relays. In this example in which relays 2301 and 2412 are operated, consecutively numbered conductors including conductors 2422, to 2432, inclusive, are connected to ground potential operating indicator marking relays 1311 to 1314, inclusive, relays 1330 to 1334, inclusive, and relays 1340 and 1341. The fifteen conductors 2421 through 2435, are ample to set up reservations for flights having fifteen stops after the initial point of departure, and in any flight conductor 2421 may always correspond to the first stop after the point of departure. In this example, since conductor 2422 is the first and conductor 2432 is the last conductor to which ground potential is applied, the passenger, for whom the reservation is being registered, intends to board the plane at the second stop (which is the third point at which passengers may board the plane) and to leave the plane at the twelfth stop. The circuit for operating indicator marking relay 1311 which corresponds to the second stop may be traced from ground potential, through contacts 2304, conductor 2306, contacts 2411, conductor 2422 of cable 2420, contacts of relay 1300, upper winding of relay 1311 to negative battery. The circuits for operating indicator marking relays corresponding to other stops included in the reservation are completed in a similar manner. Each operated marking relay closes its locking circuit from negative battery, its lower winding, to ground potential on holding conductor 872; and prepares an impulsing circuit for operating a corresponding space indicator. If the number of stops in the flight are changed at any later date, the number of indicator marking relays that are operated in response to a registering of a particular code may be changed by connecting terminal 2155 to a different terminal in the set of terminals 2204 or by connecting terminal 2165 to a different terminal in the set of terminals 2205. That is, the marking circuits are so arranged that any required number of the indicator marking relays may be operated in response to the registering of an assigned code having numbers for designating a flight, a point of departure, and a point of destination.

Since the connector has access to only five indicators at a time, the fifteen indicator marking relays of Fig. 13 are divided into three groups of five relays each. If a circuit is completed for operating any one of the relays in the group that includes relays 1310 to 1314, inclusive, an obvious circuit is completed for operating relay 1350. Likewise, any of the relays in the group including relay 1330 to 1334, inclusive, may be operated to energize relay 1351, and any of the remaining indicator marking relays may be operated to close energizing winding of relay 1352. When relays 1350, 1351 and 1352 operate individually or simultaneously, the following circuit is completed for energizing stepping magnet 1700 of the circuit control switch: ground potential, interrupter springs 1711, conductor 1349, multipled contacts 1345, 1346, 1347, conductor 1348, wiper 1701 and its 18th contact, winding of stepping magnet 1700 and negative battery. Magnet 1700 operates in a self-interrupted manner to advance the wipers of the circuit control switch to their nineteenth set of contacts. As the wipers are advanced, a circuit is opened at the eighteenth contacts opposite wiper 1707 to release relay 960.

*The marking circuits restore*

After the indicator marking relays have operated and completed their locking circuits, the marking circuits of Figs. 21 to 25 are restored to normal and are available for connecting to the circuits of another converter. As the wipers of the circuit control switch (Fig. 17) are advanced to their nineteenth contacts, the circuit for energizing the lower winding of seize relay 1190 and the winding of relay 2530 is opened at the eighteenth contact opposite wiper 1710. Relay 1190 releases, and at contacts 1193 opens a point in the circuit of relays 1300, 1453, and 1454, at contacts 1197 opens a point in the circuit of relays 1451, and 1452, and at contacts 1198 opens the circuit of relays 1441 to 1443. In response to the release of code connecting relays 1441 to 1443, and 1451 to 1454, conductors of register relays are disconnected from the marking circiuts, and therefore previously traced circuits are opened to restore relays 2100, 2130, 2152, 2161, 2210, 2412. In response to a locking circuit being opened at contacts 2166 of relay 2100, relays 2310 and 2460 release. At contacts 2462 of relay 2460 a circuit is opened for releasing relay 2500, at contacts 2503 a circuit is opened for releasing relay 2510, and at contacts 2502 a circuit is opened to extinguish busy lamp 2503. In response to the releasing of slow-acting relays 2500 and 2530, the chain circuit is prepared at contacts 2501 and 2534 for operating a seize relay which in another converter corresponds to relay 1190.

*Transmission of impulses to space indicators*

While the wipers of the circuit control switch are in their nineteenth position, impulsing circuits are connected to the first five space indicators in the selected flight group. Contacts in the indicator circuits are controlled by impulsing relays 1130 and 1140 which operate intermittently in response to the operation of vibrator 1230; and the transmission of impulses to the indicator is terminated by the operation of cutoff relay 970, which operates in response to the encountering of ground potential by the impulsing control switch in a manner previously described. More particularly, in response to the wipers of the circuit control switch advancing to their nineteenth contacts, the following circuit is completed for operating connect relay 2610 ground potential, busy lamp 2750 of Fig. 27, bank contact 2757, wiper 2667, winding of relay 2610, contact 2643, wiper 2634, contacts 2628, bank contact 2674, wiper 2664, contacts 2658, conductor 2685 of cable 2680, contacts 996, conductor 1714, wiper 1703 and its nineteenth contact, conductor 1608', winding of relay 1020, and negative battery. Upon operating, relay 2610 at contacts 2612, 2614, 2616, 2618, and 2609 connects impulsing circuits to the five two digit space indicators shown in Fig. 27. Slow-operating relay 1020 at contacts 1021 completes the following circuit for operating pick-up relay 1110: negative battery, contacts 1233 of vibrating pendulum 1231, contacts 1242, conductor 1235, lower winding of pick-up relay 1110, contacts 1103, contacts 1113, conductor 1114, contacts 842, conductor 1115, contacts 1021, conductor 1024, contacts 927, conductor 1025, nineteenth contact and wiper 1704, conductor 1117, to ground potential on conductor 837. Relay 1110 at contacts 1111 completes the following circuit to bias the alarm-control relays, that are connected in the impulsing circuits, in order to prevent their operation except in case of error as described subsequently: ground potential on conductor 837, make contacts 1111, contacts 1101, winding of cut-off relay 1100, conductor 1237, upper windings of cut-off relays 1200, 1201, 1202, 1203, and negative potential. At contacts 1112, the previously traced circuit for transmitting impulses to stepping magnet 1800 of the impulsing control switch is completed; and at make contacts 1113 the previously traced circuit for intermittently energizing impulsing relays 1130 and 1140 is completed. The space indicators of Fig. 27 which correspond to the operated indicator marking relays in the group of relay 1310 to 1314 are stepped in accordance with the number of reservations to be registered. In the present example, impulses are transmitted to space indicators 2710, 2730, 2720, and 2740 corresponding to operated relays 1311, to 1314, respectively. The circuit for stepping indicator 2710 may be traced from negative battery, contacts 1132, of impulsing relay 1130, conductor 1134, lower winding of alarm-control relay 1202, conductor 1292 extending to Fig. 13, contacts 1316 of indicator marking relay 1311, conductor 1362 of cable 1360, wiper 1710 and its nineteenth contact, conductor 1730, contacts 995, conductor 2682 of cable 2680, wiper 2667, bank contact 2677, wiper 2637, bank contact 2646, contacts 2614, wiper 2603, bank contact 2753, upper winding of indicator magnet 2710, contacts 2706, lower winding of magnet 2710, to ground potential. Similar circuits may be traced from negative potential at impulsing contacts 1141, 1142 and 1143 through the lower windings of alarm-control relays 1201, 1200 and 1160, contacts 1317, 1318, and 1319, wipers of the circuit control switch, and through connector circuits to magnets 2730, 2720, and 2740 of respective space indicators. For example, if two spaces are being reserved two impulses will be transmitted to these connected indicators before wiper 1804 of the impulsing control switch encounters ground potential to complete the following circuit: ground potential, contacts of the fifteenth set of register relays, the second contact encountered by wiper 1804, conductor 1821, contacts 1188, conductor 1154, contacts 1354, conductor 1381 of cable 1380, nineteenth contact and wiper 1705, conductor 1718, lower winding of cut-off relay 970, and negative potential. Relay 970 at contacts 971 completes a circuit for operating relay 1120, and for maintaining relays 1130 and 1140 operated in the manner previously described. Relay 1120 at contacts 1122 completes a circuit for energizing stepping magnet 1700 of the circuit control switch, at contacts 1121 completes a circuit for operating relay 1100 and at contacts 1123 and 1125 completes a circuit for returning the wipers of the impulsing control switch to their normal position in the manner previously described. In response to the wipers returning to normal, relay 970 releases, and at contacts 971 opens a circuit to release relay 1120. Upon releasing, relay 1120 at contacts 1122 opens the circuit of stepping magnet 1700 to step the wipers of the circuit control switch to their twentieth contacts.

In response to the wipers of the circuit control switch being advanced to their twentieth contacts, circuits are completed for transmitting one impulse to the rotary magnet of the connector. The wipers of the connector are advanced to their next contacts for preparing impulsing circuits for the next group of five space indicators in the selected flight. More particularly, the previously traced circuit for relays 2610 and 1020 are opened at wiper 1703 of the circuit control switch and the circuit of busy lamp 2750, which was momentarily interrupted while wiper 1707 of the circuit control switch was engaging its nineteenth contact, is again completed at the twentieth contacts. In response to the release of connect relay 2610, the winding of rotary magnet 2608 is reconnected to an impulsing circuit. When slow acting relay 1020 releases, the following circuit is completed for intermittently operating impulsing relays 1130 and 1140: negative battery, vibrating pendulum of vibrator 1230, contacts 1242, conductor 1235, lower winding of relay 1110, contacts 1103, contacts 1113, conductor 1114, contacts 842, conductor 1115, contacts 1022, conductor 1023, contacts 1187, conductor 1026, twentieth contacts opposite wiper 1704, conductor 1117 to ground potential on conductor 837. In response to the operation of relay 1110 impulsing relays 1130 and 1140 operate to send a single impulse to both the rotary magnet of the connector and the stepping magnet of the impulsing control switch in the manner previously described. The wipers of the connector are advanced to the circuits of the next group of indicators, and at wiper 1801 of the impulse control switch the following circuit is completed for operating cut-off relay 970. In a manner previously described, negative battery, upper winding of relay 970, conductor 1718, wiper 1705 and twentieth contact, conductor 1822, wiper 1801 and the first contact encountered thereby, and ground potential. Relay 1120 operates, stepping magnet 1700 is energized, the wipers of the impulsing control switch are returned to normal, relay 970 releases, relay 1120 releases, and stepping magnet 1800 is deenergized for stepping the wipers of the circuit control switch to their twenty-first contacts.

The five newly selected indicators are operated in the same manner as previously described for the first group of five indicators. In the present example, it has been assumed that all of the relays in the group of indicator marking relays 1330–1334 are operated; and, therefore, impulsing circuits for all of the newly selected indicators are completed at contacts 1325–1329 inclusive. In response to the termination of impulsing, the wipers of the circuit control switch are advanced to their twenty-second positions.

At the twenty-second contacts of the circuit control switch, the same circuits that were completed at the twentieth contacts are again completed to step the wipers of the connector to a third group of space indicators in the flight. The wipers of the circuit control switch are then advanced to their twenty-third contacts.

While the wipers of the circuit control switch are in their twenty-third position, impulsing circuits are completed in the same manner described for the first group of selected space indicators. It has been assumed that only relays 1340 and 1341 in the group of indicator marking relays 1340–1344 have been operated; and, therefore, impulsing circuits will be completed through contacts 1335, and 1336 to only the two corresponding indicators in this group. The circuit which is completed for energizing magnet 1700 after the indicators have been operated now includes contacts of relay 1080 and may be traced as follows: negative battery, winding of relay 1700, wiper 1701 and its twenty-third contact, conductor 1731, contacts 1081, conductor 1719, contacts 1122, and ground potential. In response to relay 1120 releasing after the wipers of the impulsing control switch have been returned to normal, the wipers of the circuit control switch are advanced to their twenty-fourth contacts.

In another instance, if the reservation being made did not include any of the first five stops of the flight, none of the relays in the first group of indicator marking relays 1310–1314 would be operated. It is then obvious that none of the multipled contacts for completing an energizing circuit for relay 1350 are closed, and relay 1350 remains unoperated. When relay 1350 is unoperated as the wipers of the circuit control switch are advanced to their nineteenth contacts, the following circuit is completed immediately to operate cut-off relay 970 before slow operating relay 1020 operates to complete the circuit of pickup relay 1110: negative battery, upper winding of cut-off relay 970, conductor 1718, wiper 1705 and its nineteenth contact, conductor 1381 of cable 1380, contacts 1353, conductor 1349, interrupter spring 1711, and ground potential. In response to the operation of relay 970, relay 1120 operates to energize stepping magnet 1700, which then opens the circuit of relay 970 at interrupter contacts 1711. Relays 970 and 1120 restore, and stepping magnet 1800 restores to advance the wipers of the circuit control switch to their twentieth contacts.

In still another instance, if the reservation does not include any stops beyond the fifth stop, the reservation is registered on the first group of five indicators and the wipers of the circuit control switch are advanced without delay beyond their twenty-first contacts. More particularly, a circuit for operating cut-off relay 970 is completed at contacts 1357 of relay 1351 and at the twenty-first contacts opposite wiper 1705. Obviously, if relay 1352 is unoperated due to the unoperated condition of relays 1340–1344, a circuit is completed for automatically advancing the wipers of the circuit control switch off their twenty-third contacts. Since many flights may not include more than five stops, the circuit of indicators for that flight will occupy but one set of bank contacts in the connector, and will be controlled by only the first group of indicator marking relays 1310–1314.

In order for an operator to be permitted to reserve more than two spaces at one time, it is necessary for a supervisor to operate a limit key 1831 to close an obvious circuit for operating relay 1830. Upon operating, relay 1830 disconnects conductors "3" to "0," inclusive, of the fifteenth set of register relays from an alarm circuit and connects them to contacts of the impulsing control switch. The reservation clerk is then not limited to making only two reservations at one time, but may make as many as ten reservations in one operation.

*Cancelling previously reserved spaces*

If the transaction is for cancelling previously reserved spaces, the reserve cancel key 720 is initially operated to the cancel position rather than to the reserve position as previously described. In response to the operation of the key to the cancel position, circuits are prepared for subtracting from the number of previously registered reservations, that is, a larger number is to be displayed on selected indicators to show the increased number of spaces yet to be reserved. More particularly, with the key in its cancel position, circuits are completed as previously described for seizing the converter and for advancing the register control switch to its third contacts. At the third contacts the following circuit is completed for operating cancel relay 920: negative battery, resistor 799, contacts 737C, contacts 775, contacts 784, contacts 796, wiper 712, conductor 787, contacts 805, upper winding of relay 810, conductor 895, wiper 1602 and its third contact, conductor 935, winding of relay 920, conductor 934, wiper 1604 and its third contact, conductor 896, lower winding of relay 820, contacts 804, conductor 788, wiper 713, contacts 797, 783 and 775, contacts 736C, and ground potential. Relay 920 at contacts 922 connects conductor 826, to which ground potential is connected intermittently, to the uncompleted circuit of send lamp 779, at contacts 924 opens a circuit to prevent the operation of relay 1080 which ordinarily operates as subsequently described in response to an attempt to reserve space in excess to those available, at contacts 925 prepares a circuit for operating relay 1180. In response to relay 910 operating, when the wipers of the circuit control switch are advanced to their sixteenth contacts as previously described, a circuit from conductor 826 is completed at contacts 912 to illuminate intermittently send lamp 779. The flashing of the send lamp informs the reservation clerk that circuits are prepared for registering a cancellation rather than a reservation.

When the wipers of the circuit control switch are advanced to their nineteenth set of contacts after the correct group of indicators have been selected, the following circuit which has been prepared by the operation of the cancel relay is completed to operate relay 1180: negative battery, winding of relay 1180, conductor 1167, contacts 926, conductor 1025, 19th contacts opposite wiper 1704, conductor 1117 and ground potential on conductor 837. Relay 1180 at contacts 1188 opens a point in the previously traced circuit including wiper 1804 of the impulsing control switch, and cut-off relay 970 and at contacts 1187 opens a point in a previously traced circuit which was completed for transmitting an impulse to the rotary magnet of the connector, and at contacts 1186 completes a circuit for operating pick-up relay 1110. Other contacts of relay 1180 are included in a counting circuit which permits the wipers of the impulsing control switch to make three, one-half revolutions before a circuit is completed for operating cut-off relay 970.

A circuit for operating pick-up relay 1110 may be traced from negative battery, contacts 1233 of the vibrator, contacts 1242, conductor 1235, lower winding of relay 1110, contacts 1103, contacts 1113, conductor 1114, contacts 842, conductor 1115, contacts 1021, conductor 1024, contacts 1186, conductor 1025, nineteenth contact and wiper 1704, conductor 1117 to ground potential on conductor 837. However, wiper 1804 has been disconnected from the circuit for operating cut-off relay 970 and wiper 1803 of the impulsing control switch is connected only at the conclusion of the third, one-half revolution.

The number of cancellations to be reserved is effected by transmitting to the indicators 100 impulses less the number of spaces to be cancelled. The number of impulses are counted by the impulsing control switch and counting relays 1250, 1260, 1270 and 1280. During the first, one-half revolution of the wipers 1801 to 1808, the off-normal springs of the switch are operated, and at contacts 1833 the following circuits are completed: ground potential, contacts 1833, conductor 1834, contacts 1182, conductor 1168, contacts 1254, contacts 1267, lower winding of relay 1250; and also from conductor 1168, contacts 1254, contacts 1265, break contacts 1271, upper winding of relay 1250, and negative potential. Relay 1250 is differently wound and does not operate at this time; however, another circuit is completed from conductor 1168, contacts 1254, contacts 1265, break contacts 1271, break contacts 1263, winding of relay 1270 to negative potential. Relay 1270 operates, and at make-before-break contacts 1271 disconnects the upper winding of relay 1250 from the circuit controlled by the off-normal springs and connects it to conductor 1268, which is connected through contacts 1181 to ground potential on conductor 837; and at contacts 1272 prepares a circuit for operating relay 1260. At the end of the first one-half revolution the off-normal springs are restored to remove ground potential from conductor 1268, and, therefore, to deenergize the lower opposing winding of relay 1250. Upon operating, relay 1250, at contacts 1251 short-circuits the lower winding of relay 1280, at contacts 1252 prepares an additional circuit for the upper winding of relay 1250, and at contacts 1253 closes an additional point in the circuit of relay 1260. During the second one-half revolution when the off-normal springs are again closed, a circuit for operating relay 1260 is completed from conductor 1168, contacts 1253, contacts 1272, lower winding of relay 1260 to negative potential. At contacts 1261 and 1262 a locking circuit is completed from negative potential, upper winding of relay 1260, contacts 1262, contacts 1251, contacts 1261, contacts 1231 to ground potential on conductor 1268; at contacts 1263, relay 1270 is disconnected from conductor 1268, and is reconnected to the circuit including the off-normal springs; and at contacts 1264 a circuit is prepared for again placing the upper winding of relay 1250 under control of the off-normal springs. At the end of the second one-half revolution contacts 1833 are again opened for deenergizing the winding of relay 1270. Upon releasing, relay 1270 at break contacts 1271 completes an alternate circuit for the upper winding of relay 1250 through contacts 1264 and 1252 to conductor 1268, and at contacts 1272 reconnects the lower winding to the off-normal springs. During the third one-half revolution, a circuit is completed from conductor 1168, contacts 1253, break contacts 1272, contacts 1266, and lower winding of relay 1250 to negative battery. Since the current flow through the lower winding opposes that of the upper winding, relay 1250 releases, and at make contacts 1251 removes a short-circuit from across the winding of relay 1280, and at break contacts 1251 completes a circuit for applying ground potential from conductor 1168 to the winding of relay 1280, and at contacts 1252 and 1253 opens circuits for deenergizing both windings of relay 1250. At the end of the third one-half revolution of the wipers ground potential on conductor 1168 for short circuiting the lower winding of relay 1280 is removed, and the lower winding is energized over the following circuit which includes the upper winding of relay 1260: ground potential on conductor 1268, break contacts 1231, contacts 1261, lower winding of relay 1280, contacts 1262, upper winding of relay 1260, and negative battery. Relay 1280 operates, at contacts 1281 completes an obvious locking circuit for its upper winding, at contacts 1285 prepares a circuit for operating cut-off relay 970, and at contacts 1282 prepares a circuit for subsequently maintaining relay 970 operated until the wipers of the circuit control switch have been returned to normal.

The conductors of the fifteenth set of register relays which are connected to the contacts accessible to wiper 1803 are connected in reverse order from the manner in which they are connected to contacts accessible to wiper 1804. When the wipers of the impulsing control switch have been returned to normal at the end of the third one-half revolution, seventy-eight impulses have been transmitted to the connected space indicators as well as to the winding of stepping magnet 1800. If two spaces are to be cancelled, a total of ninety-eight impulses are required to advance the two drums of the digit indicators through "00" and to a number that is two less than that previously displayed, therefore, twenty additional impulses are transmitted until wiper 1803 encounters its twentieth contact to complete the following circuit for operating cut-off relay 970: contacts of the fifteenth set of register relays, the conductor corresponding to digit "2," the twentieth contact encountered by wiper 1803, conductor 1832, contacts 1285, conductor 1154, contacts 1354, conductor 1331 of cable 1339, wiper 1705 and its nineteenth contact, conductor 1718, upper winding of relay 970, and negative potential. Relay 970 operates to maintain impulsing relays 1130 and 1140 operated and to operate relay 1120. In response to relay 1120 operating, the wipers of the impulsing control switch are returned to normal in the manner previously described. However, the circuit for energizing stepping magnet 1800 is altered slightly to include make contacts of relays 1180 and 1290. While wiper 1802 of the impulsing control siwtch is engaging its twentieth and twenty-first contacts, the operating circuit of stepping magnet 1800 is completed from ground potential on conductor 1115, wiper 1802, conductor 1286, contacts 1185, conductor 1236, contacts 1282, conductor 1315, contacts 883, conductor 1314, interrupter contacts 1820, conductor 1813, contacts 1123, conductor 1810, and winding of stepping magnet 1800 to negative potenial. Also, a previously traced circuit is completed through contacts 1185 for maintaining relay 970 operated. While wiper 1802 is engaging its twenty-second to twenty-fifth contacts, a circuit is completed from ground potential on wiper 1802, conductor 1287, contacts 1283, conductor 1246, contacts 1125, conductor 1236, contacts 1282, and from contacts 1282 as previously traced to stepping magnet 1800. These last traced circuits are provided so that in event of error or faulty operation, wiper 1803 should not encounter ground potential to return of the wipers of the impulsing control switch to normal and an alarm is sounded as subsequently described. In response to relay 1120 releasing after the wipers of the impulsing control switch have returned to normal, the wipers of the circuit control switch are advanced to their twentieth contacts in the manner previously described. The previously traced circuits for operating relay 1180, connect relay 2610, and relay 1020 are opened. Relay 2610 reconnects the impulsing circuits to rotary magnet 2608; relay 1180 restores, and at contacts 1187 prepares previously traced circuit for operating pick-up relay 1110. In response to slow acting relay 1020 releasing, the circuit for pick-up relay 1110 is completed to start the previously described sequence of operations for advancing the wipers of the connector to the next set of contacts.

When the wipers of the circuit control switch are at their twenty-first and twenty-third contacts, circuits are completed for operating other indicators corresponding to the stops of the flight for which spaces are being cancelled. If the transaction does not include stops beyond the fifth stop of the flight, the wipers of the circuit control switch are advanced automatically off their twenty-first and twenty-third contacts as previously described.

*Attempted reservation in excess of available spaces*

A reservation clerk may erroneously attempt to reserve more spaces at a particular stop in a selected flight than are available. In response to the error, an alarm sounds for notifying a supervisor; and the converter circuit, which is employed for establishing connections to the space indicators, is maintained operated until it is released by the supervisor. After the converter has been released, the supervisor cancels the erroneously registered reservation to reset the indicators to the number previously displayed.

More particularly, when an attempt is made to register an excessive number of reservations on one of the two-digit space indicators, the number wheels of the indicator are rotated further after "00" has been displayed. As the number wheels are rotated between "00" and "99," the associated off-normal springs are operated to decrease the resistance of an impulsing circuit. For example, if off-normal springs 2709 associated with the magnet 2720 is operated, the lower winding of the stepping magnet is disconnected from the impulsing circuit at contacts 2708, and the upper winding is connected directly to ground potential through contacts 2707. In response to the decreased resistance in a previously traced impulsing circuit, alarm-control relay 1200 operates, and at contacts 1204 completes the following circuit for operating alarm-control relay 1080: ground potential, contacts 854, conductor 827, contacts 924, conductor 929, contacts 1204, conductor 936, winding of relay 1080 and negative battery. Relay 1080 at contacts 1081 opens the circuit connected across the upper winding of trouble relay 1070. After all of the indicators corresponding to the stops in the proposed reservation have been erroneously operated, and when the wipers of the circuit control switch are in their twenty-third position, the following circuit is completed in response to the operation of relay 1120: negative potential, winding of stepping magnet 1700, wiper 1701 and its twenty-third contact, conductor 1731, upper winding of trouble relay 1070, conductor 1719, contacts 1122, and ground potential. Relay 1070 operates, but the resistance of 1070 prevents the operation of stepping magnet 1700. Relay 1070 at contacts 1071 completes its locking circuit from negative battery, lower winding of relay 1070, contacts 1071 to ground potential on conductor 837; and at contacts 1072 completes the following circuit for operating trouble-alarm relay 840: negative potential, upper winding of relay 840, conductor 1073, contacts 1072, conductor 1074, contacts 887, contacts 816 of the converter reset key, and ground potential. Relay 840 at contacts 822 completes an obvious locking circuit to maintain the relay operated independently of contacts 1072 at contacts 841 completes a circuit from negative battery, upper winding of relay 830, contacts 841, contacts 813, to ground potential; at contacts 842 opens a point in the previously traced circuit of pick-up relay 1110; at contacts 844 connects the circuit of seize lamp 739 to intermittent ground potential on conductor 826; at contacts 846 connects the circuit of send lamp 779 to the same source of intermittent ground potential; at contacts 848 connects converter lamp 828 to the source of intermittent ground potential; at contacts 849 completes a circuit for sounding an alarm; and at contacts 876 opens a circuit for releasing relay 990. Upon restoring, relay 990 disconnects impulsing circuits from the selector and connector circuits. In order to restore the converter after the alarm sounds, the supervisor operates the locking general reset key to open contacts 814, 815, and to close contacts 1156; and then depresses the non-locking reset key to open contacts 813, 816, and to close contacts 1157. In response to the operation of the reset keys, an obvious circuit is completed to operate release relay 1170; ground potential is removed from conductor 837; and relay 830 restores. The converter circuits restore in a manner subsequently described. Relay 1080 restores in response to the subsequent restoration of relay 850. The supervisor reselects the space indicators and resets them to indicate the number previously displayed.

*Position release*

After a transaction has been correctly registered locally, the sending position is automatically disconnected from the converter, and the selectors and the connector are automatically restored. However, the registered information remains stored on the register relays until a scanning switch completes its operation for transmitting the information to the circuits of a Teletype printing system.

After the transaction has been displayed on the local space indicators, the wipers of the circuit control switch are advanced to their twenty-fourth contacts as previously described. At wiper 1703, a previously traced circuit is opened to release connect relay 2610 and relay 1020. Providing the converter had been conditioned for registering a cancellation, a circuit is opened at wiper 1704 to release relay 1180, which at contacts 1181 opens circuit for releasing relays 1260 and 1280. Upon releasing, relay 1020 at contacts 1023 completes the following circuit for operating relay 860: negative potential, lower winding of relay 860, contacts 868, conductor 875, contacts 1023, conductor 1027, twenty-fourth contact opposite wiper 1702, conductor 1732, contacts 866, contacts 882, and ground potential. Upon operating, relay 860 at intially closed contacts 864 completes its locking circuit, at contacts 865 and 867 closes a circuit for operating relay 940, at contacts 863 completes a circuit for maintaining relay 880 operated, at contacts 869 opens a point in a circuit of a trouble relay, at contacts 865 connects the lower winding of trouble relay 840 to a timing circuit, at contacts 861 opens a point in a circuit to prevent the selection of this converter by another sender immediately after the sender of Figure 7 is released, and at contacts 862 opens a circuit for releasing relays 780, 770, and 830. The locking circuit for relay 860 may be traced from negative potential, upper winding of relay 860, contacts 864, contacts 882 to ground potential. The circuit for operating relay 940 may be traced from negative potential, upper and lower windings of the relay, conductor 943, contacts 865, conductor 1732, wiper 1702 and its twenty-fourth contact, conductor 1027, contacts 1023, conductor 875, contacts 867, conductor 2686 of cable 2680, make contacts 2659, wiper 2663, bank contact 2673, make contacts 2629, wiper 2633, bank contact 2642, release magnet 2600A, release-alarm relay AL to ground potential. The circuit completed at contacts 863 for maintaining relay 880 operated extends from ground potential, contacts 882, contacts 863, conductor 1129, contacts 1172, conductor 874, winding of relay 880 to negative potential. Upon restoring, relay 833 at contacts 831 opens a circuit to release relays 870 and 760, and at contacts 833 opens the operating circuit of relay 850. Relay 870 at contacts 871 opens the initially closed circuit for energizing relay 880; and relay 760 at contacts 761 short-circuits the winding of relay 790. A circuit is opened at contacts 791 of relay 790 to release relay 740. Upon releasing, relay 850 at contacts 855 completes the previously traced circuits for energizing the winding of relay 800 and the lower winding of relay 990. The sender at the operator's position is now disconnected from the converter and is ready to be used in registering another transaction.

*The connectors and selectors restore*

Upon operating, relay 940 at contacts 942 completes the following circuit for energizing stepping magnet 1700 and for illuminating release lamp 1735: ground potential, contacts 942, conductor 944, 24th contact opposite wiper 1701, stepping magnet 1700, and negative potential; and also from conductor 944 through lamp 1735 to negative potential. In response to the closing of contacts 941 for short-circuiting the lower winding of relay 940, the current in a previously traced circuit is increased sufficiently to operate release magnet 2600A of the connector. The operation of the release magnet opens break contacts to open one of the multipled circuits which maintains relay 2620 operated, and restores the wipers of the connector in the well-known manner. When the wipers are restored to normal, the vertical off-normal springs 2698 are actuated to open the remaining holding circuit of connect relay 2620. Upon releasing relay 2620 at armature 2629 transfers the release circuit to release magnet 2697. The wipers of the flight selector are restored; and the holding circuit of connect relay 2650 is opened at contacts of vertical off-normal springs 2693, and at contacts of the release magnet. Relay 2650 restores, and at armature 2659 transfers the release control circuit from release magnet 2697 to release magnet 2670. The wipers of the date selector are restored, and the release circuit is opened at contacts of vertical off-normal springs 2689. Relay 940 restores, and at contacts 942 opens a circuit of stepping magnet 1700 to step the wipers of the circuit control switch to their twenty-fifth contacts.

*Operation of the scanning switch*

While the wipers of the circuit control switch are at their twenty-fifth contacts, the wipers of the scanning switch are rotated one-half revolution for transmitting the information that is retained on the register relays to circuits of a Teletype printing system. Relays 980, 1000, and 1010 cooperate with the interrupter springs of the scanning switch to step automatically wipers 1501 to 1510.

More particularly, a circuit is completed from negative potential, winding of relay 980, conductor 1435, contacts 1175, conductor 1735', interrupter springs 1511, conductor 1734, contacts 878, conductor 1733, twenty-fifth contact opposite wiper 1703, conductor 1714, contacts 996, conductor 2685 of cable 2680, contacts 2657, contacts 2691 to ground potential. Relay 980 at contacts 981 completes a circuit from ground potential, winding of relay 1000, conductor 982, contacts 981 to negative potential. At contacts 1001 of relay 1000 an obvious circuit is completed for operating relay 1010; and relay 1010 at contacts 1011 completes the following circuit for energizing stepping magnet 1500; ground potential, contacts 1011, conductor 1012, winding of stepping magnet 1500, and negative potential. The interrupter springs 1511 are opened to release relay 980 which causes the release of relay 1000. Relay 1010 releases in response to the opening of contacts 1001 of relay 1000, and at contacts 1011 opens the energizing circuit of stepping magnet 1500. Upon deenergizing magnet 1500 steps wipers 1501 to 1510, inclusive, from their normal positions, their twenty-sixth contacts, to their first contacts, and also closes off-normal springs 1513 to prepare a holding circuit for release relay 1170. The wipers of the scanning switch are rotated automatically in this manner until wiper 1510 encounters a circuit for operating release relay 1170 as described subsequently.

*Teletype control circuits*

The wipers 1501-1510 of the scanning switch are connected through conductors 3001-3010, respectively, to digit relays 3111-3120 of Fig. 30. Each of these digit relays has contacts for connecting negative potential to a different combination of the conductors which are connected to segments of the distributor that is shown in Fig. 31. When relay 990 of the converter operates shortly after the converter is seized, the following circuit is completed to operate relay 3060 of Fig. 30: negative potential, winding of relay 3060, conductor 3072 extending to Fig. 9, make contacts of relay 990 and ground potential. Relay 3060 at contacts 3061 prepares a circuit for operating relay 3080, which operates to send spacing impulses after information pertaining to a transaction has been transmitted to the Teletype circuits. Relay 860, upon operating to release the sender position, completes the following circuit for operating relay 3020: negative potential, winding of relay 3020, conductor 3073 extending to Fig. 8, contacts 864, contacts 882, and ground potential. Relay 3020 at contacts 3021 prepares a circuit for operating relay 3040, and at contacts 3022 prepares a circuit for operating relay 3050 which operates subsequently to complete circuit for transmitting spacing impulses between numbers.

Figure 9:
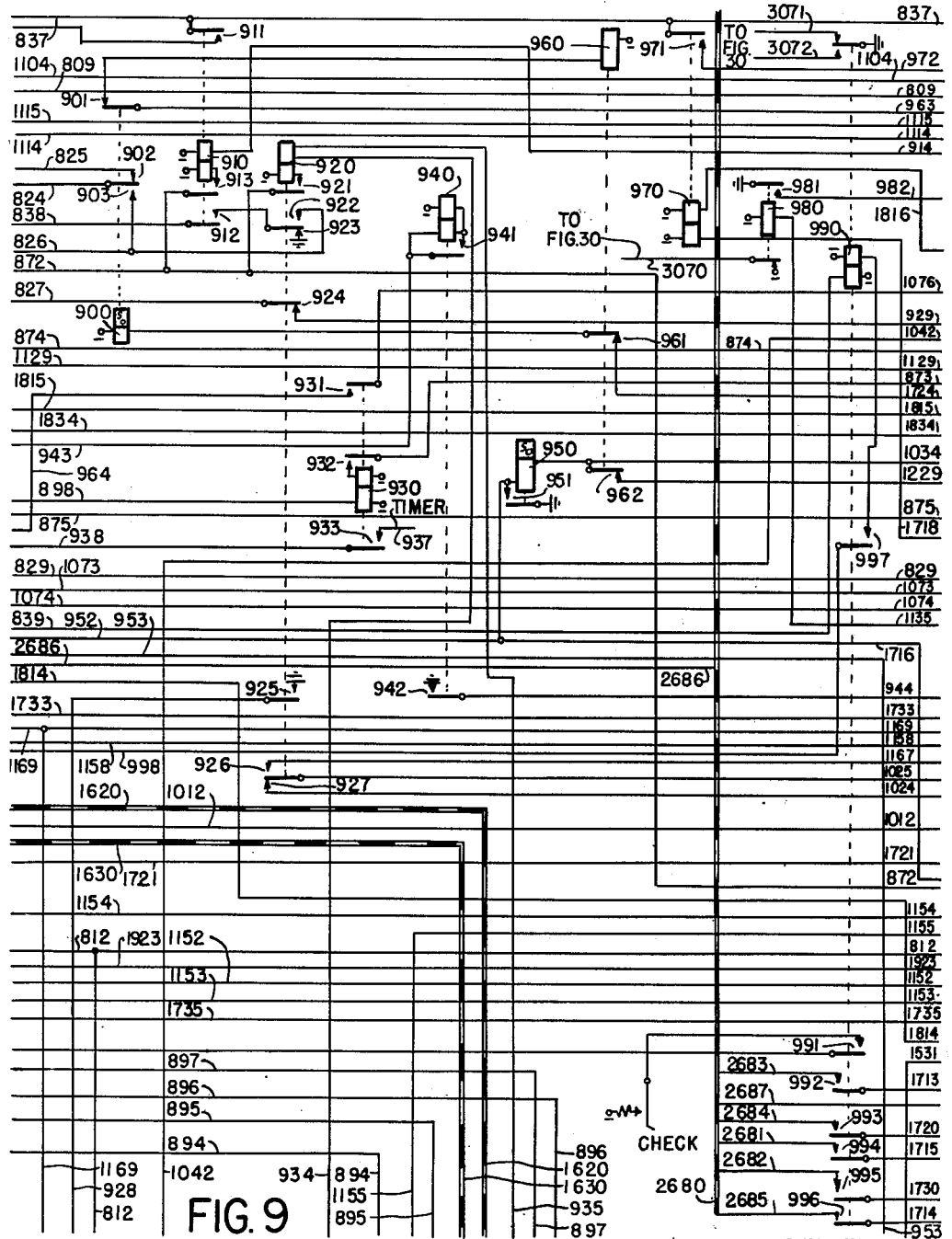
Figure 10:
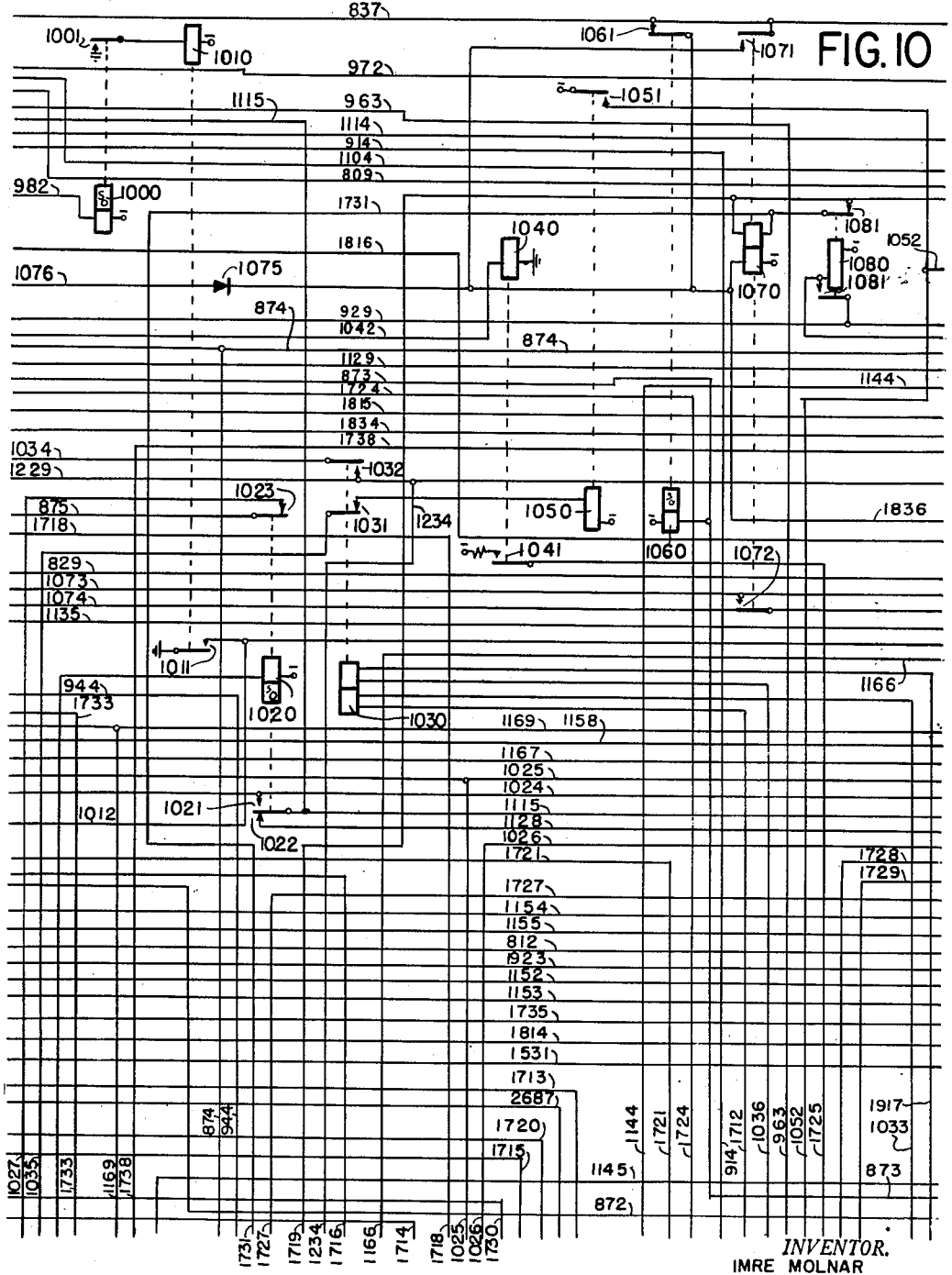
Figure 11:
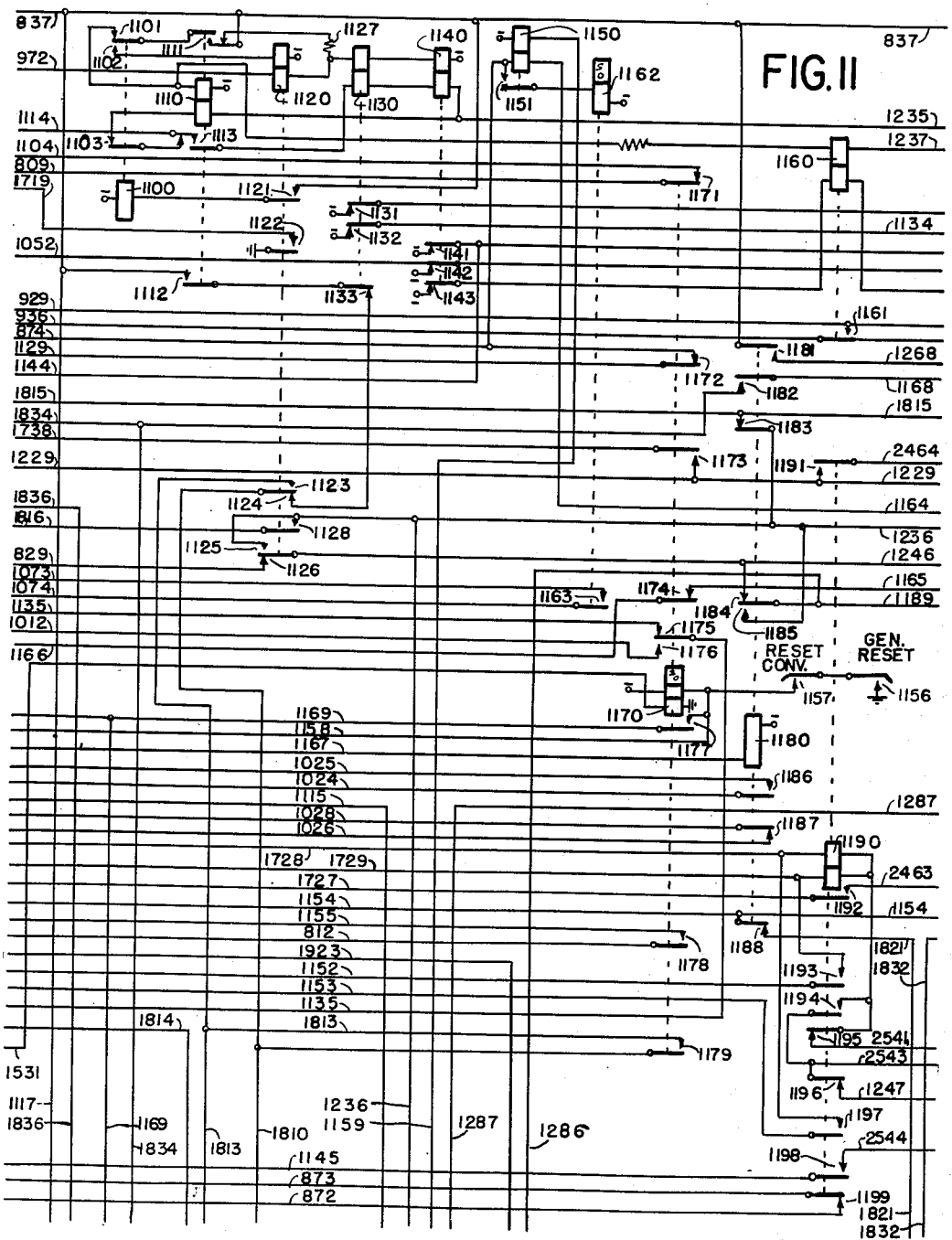

The first digit of the previously registered position number has been assumed to be "5." When relay 980 releases as previously described, while the wipers of the scanning switch are at their first set of contacts, the following circuit is completed for operating relay 3115: ground on conductor 1525, first contact opposite wiper 1505, conductor 3005, winding of relay 3115, conductor 3070 extending to Fig. 9, break contacts of relay 980, and negative potential. Upon operating, relay 3115 applies negative potential to conductor 3105 which is connected to segment 5 of the distributor; and completes a circuit from negative potential, upper winding of relay 3030, contacts 3042 to ground potential; and also from negative potential, upper winding of relay 3040, contacts 3021 to ground potential. Relay 3030 operates momentarily, and at contacts 3031 completes a circuit from negative potential, contacts 3031, conductor 3106, winding of clutch magnet 3110 to ground potential. The energization of magnet 3110 permits the distributor brushes of the transmitter to complete one revolution for transmitting the negative potential on segment 5 to receiver 3120. At the local Teletype receiver 3120, a tape is perforated in the well-known manner for permanently recording the digit 5, and other receivers may be connected in multiple with receiver 3120 for receiving the flight information at distant offices. Relay 3040 at contacts 3042 opens the circuit of relay 3030, and at contacts 3041 removes a short circuit from across its lower winding in order that it will release quickly in response to the release of relay 3115. Relay 980 reoperates before the wipers of the scanning switch encounter their second set of contacts, and opens a circuit to release relay 3115. Upon releasing relay 3115 removes negative potential from conductor 3105, and opens the circuit of relay 3040.

In response to the wipers encountering the second set of contacts, the second digit of the position number is transmitted to the Teletype circuits. Subsequently, when the wipers of the scanning switch encounter their third set of contacts, the following circuit is completed for operating relay 3050: negative potential, lower winding of relay 3050, contacts of relay 3022, conductor 3000, wiper 1510, conductor 3010, winding of relay 3120, conductor 3070 extending to Fig. 9, break contacts of relay 980, and negative potential. Relay 3120 is margined so as not to operate in series with the lower winding of relay 3050; but relay 3050 operates, and at contacts 3052 completes a circuit for momentarily operating relay 3030, and at contacts 3051 applies negative potential over conductor 3103 to segment 3 of the distributor. The distributor brushes make one revolution for recording a space; and before the wipers of the scanning switch advance, relays 3050 and 3040 release in response to the reoperation of relay 980.

Providing the registered transaction is for a cancellation, the following circuit is completed for operating relay 3120 when the wipers of the scanning switch encounter their fourth contact: ground potential, contacts 925 of cancel relay 920, Fig. 9, conductor 928, wiper 1510, conductor 3010, winding of relay 3120, conductor 3070 extending to Fig. 9, break contacts of relay 980, and negative potential. Relay 3120 applies ground potential to conductors 3120, 3103, and 3105 which are connected to segments 2, 3, and 5, respectively of the distributor, and completes the previously described circuit for operating clutch magnet 3110. Receiver 3120 records the digit "0" before the transaction number to indicate that the transaction is for cancelling space. Other digits of the transaction are transmitted to the Teletype printing circuits as the wipers of the scanning switch continue to encounter ground potential. The transaction number is transmitted while the wipers are at the fifth, sixth and seventh positions; the date number, at the tenth and eleventh positions; the flight number, at the fourteenth, fifteenth and sixteenth positions; the number for the point of departure, at the eighteenth and nineteenth positions; and the number for the point of destination, at the twenty-first and twenty-second positions. At the intermediate space contacts, a previously traced circuit is completed for operating relay 3050, and, consequently, for transmitting spacing impulses. As wiper 1510 encounters the twenty-fifth contact the following circuit is completed for operating release relay 1170: ground potential, upper winding of relay 1170 of Fig. 11, conductor 1531, wiper 1510, conductor 3010, winding of relay 3120, and negative potential on conductor 3070. Relay 1170 operates to restore the converter.

When ground potential is removed from conductor 874, and when relay 990 of the converter restores as subsequently described, a series of impulses are transmitted to the Teletype printing system, and then the control circuits of the Teletype are restored. When ground potential is removed from conductor 874, the previously traced energizing circuit of relay 3020 is opened. Upon releasing, relay 3020 at contacts 3021 opens a point in the operating circuit of relay 3040. When relay 990 releases, it removes ground potential from conductor 3072 to open the energizing circuit of relay 3060; however, capacitor 3062, which is connected in series with resistor 3063 and the winding of relay 3060, discharges to maintain relay 3060 operated for several seconds, thereafter. Upon releasing, relay 990 at break contacts connects ground potential to conductor 3071 to complete a circuit through contacts 3061 and the winding of relay 3080 to negative potential. Release 3080 at contacts 3081 completes obvious circuits for operating relays 3050 and 3030. Relay 3030 remains operated for an interval to energize clutch magnet 3110 and, therefore, to permit the distributor brushes to complete several revolutions. Relay 3050 applies negative potential to segment 3, as previously described, to send a spacing impulse for each revolution of the distributor brushes. After an interval relay 3060 releases, and at contacts 3061 opens a circuit to release relay 3080. Upon releasing, slow-acting relay 3080 at contacts 3081 opens circuits for releasing relays 3050 and 3030. Finally, contacts 3031 of relay 3030, a previously traced circuit is opened to de-energize clutch magnet 3110.

*Converter automatically released*

After the information that is stored on the register relays has been transmitted to circuits of the Teletype printing system, the converter restores in response to the operation of relay 1170. At contacts 1177 the following locking circuit is completed to maintain release relay 1170 operated until the wipers of the scanning switch and the control switches have been returned to their normal positions: negative battery, lower winding of relay 1170, contacts 1177, conductor 1169, and to ground potential through multipled off-normal springs 1835 of the impulsing control switch, 1736 of the circuit control switch, 1655 of the register control switch, and 1513 of the scanning switch. At contacts 1175 a circuit is opened to restore impulsing-control relay 980; relay 1000 restores in response to the restoration of relay 980; and relay 1010 restores in response to the restoration of relay 1000. At contacts 1174 a point is opened in the circuit for initially energizing stepping magnet 1700. At contacts 1171 a point is opened in a circuit to prevent immediate seizure of the converter by another sender. At contacts 1179 a circuit prepared for homing the wipers of the impulsing control switch; and at contacts 1172 the circuit for maintaining relay 880 is opened. Relay 880 restores.

In response to the restoration of relay 880, ground potential at contacts 881 is removed from holding conductor 872; and at contacts 882 a circuit is opened for releasing relay 860. At contacts 861 of relay 860 a point is closed in the circuit which is subsequently completed for marking the converter idle. Ordinarily, the wipers of the impulsing control switch have already been returned to their normal position. However, if the wipers are off-normal, the following circuit is completed at contacts 884 of relay 880 to return the wipers to normal: negative battery, winding of stepping magnet 1800, conductor 1810, contacts 1179, conductor 1813, interrupter contacts 1820, conductor 1814, contacts 884, conductor 1834, contacts 1833 of off-normal springs, and ground potential. At contacts 886, a timing circuit is disconnected from trouble-alarm control relay 930. A point in the operating circuit of trouble-alarm relay 840 is opened at contacts 887; and at contacts 889 a point in the finder-start circuit is closed in parallel with similar contacts of other converters.

Register relays and control relays restore in response to the removal of ground potential from conductor 872. In response to restoration of the previously operated indicator marking relays, any of the relays 1350, 1351, and 1352 that were operated restore. Also, in response to the removal of ground potential from conductor 872, relays 800 and 990 release; a circuit of converter lamp 828 is opened; cancel relay 920, if previously operated, restores; and relay 910 restores. At contacts 911 of relay 910, ground potential is removed from holding conductor 837. Impulsing relays 1130 and 1140 restore. Relay 1220 restores; at contacts 1221 a circuit is opened to stop the operation of vibrator 1230; at contacts 1225 the circuit including the upper winding of vibrator 1230 is opened to release pendulum 1231; and also at contacts 1225 the operating circuit of relay 1240 is opened. Also, when release relay 1170 operates, the following circuit is completed for returning wipers of the register control switch to normal: negative battery, winding of magnet 1600, conductor 812, contacts 1178, conductor 1155, wiper 1603 and its engaged contact, interrupter springs 1609, and ground potential. The wipers are rotated in a self-interrupted manner until wiper 1603 encounters an open circuit its twenty-sixth contact. At contacts 1173, the following circuit is completed for stepping the wipers of the circuit control switch to their normal positions: negative battery, winding of stepping magnet 1700, off-normal contacts 1737, conductor 1738, contacts 1173, conductor 1229, conductor 1234, interrupter contacts 1711, and ground potential. When the wipers are stepped to their twenty-sixth contacts, off-normal springs 1737 are actuated to open the interrupter circuit; and also following self-interrupting circuit is completed at break contacts of off-normal springs 1736 to return the wipers of the scanning switch to their twenty-sixth positions: negative battery, stepping magnet 1500, conductor 1012, contacts 1176, conductor 1735, interrupter springs 1511, off-normal springs 1512, conductor 1514, break contacts of off-normal springs 1736, and ground potential. The circuit for initially energizing releases relay 1170 is opened at wiper 1510. When the rotary control switches have returned to normal, the previously traced locking circuit of release relay 1170 is opened at the off-normal springs. In response to the releasing of slow-acting relay 1170, negative potential is extended from the winding of relay 370 through contacts 1171 to a bank contact in the finder. The converter circuits are now completely restored, and may be seized by another sender.

Manual release

If the reservation clerk desires to release the converter circuits before the transaction has been completely registered, the clerk depresses the release key 731. Ground potential is applied through contacts of key 731, wiper 717, and conductor, and conductor 817 to short-circuit the lower winding of relay 830. Upon releasing, relay 830 at contacts 831 opens a circuit for releasing relay 760, which causes the release of relays 730 and 740; and at contacts 833 opens a circuit for releasing relay 850. Upon restoring, relay 850 at contacts 852 opens the energizing circuit of relay 870, which at contacts 871 opens a circuit to release relay 880. Relay 880 at contacts 881 removes ground potential from holding conductor 872, and at contacts 888 completes the following circuit to operate release-relay 1170: negative potential, lower winding of relay 1170, conductor 1158, contacts 888, conductor 1169, contacts of off-normal springs 1655 of the register control switch, and ground potential. In response to the removal of ground potential from conductor 872, certain relays including relay 910 restore. Relay 910 at contacts 911 removes ground potential from holding conductor 837. In response to the operation of relay 1170 and to the removal of ground potential from holding conductors 837, and 872, the converter circuit is restored in manner previously described. At contacts 885 of relay 880 a circuit may be completed from negative battery, windings of relay 940, contacts 885 to release conductor 2686 for restoring any operated ones of the selectors and connectors that may have been seized by the converter. And finally, in response to the restoration of release key 731, relays 780 and 770 restore to disconnect the sending position from the converter.

Alarm circuits

Various alarm circuits are provided for indicating faulty mechanical or electric operation, and also for indicating that certain errors have been made by a reservation clerk.

Relay 870, which operates when the converter is seized, completes the following circuit for energizing relay 1150: ground potential, contacts 871, conductor 874, lower winding of relay 1150, conductor 1164, contacts 1245, conductor 1165, contacts 1174, conductor 1166, twenty-sixth contact opposite wiper 1701, winding of stepping magnet 1700, and negative battery. Weighted armature spring 1151 of relay 1150 oscillates to complete intermittently the operating circuit of slow-operating relay 1162. Normally, relay 1240 operates to open at contacts 1245 the energizing circuit of relay 1150 before relay 1162 operates. However, if the circuit to vibrator 1230 should not be completed, or if the armature of the vibrator should not be attracted sufficiently to cause the operation of relays 1220 and 1240, relay 1150 remains energized; and in response to the amplitude of the oscillation of the armature spring 1151 constantly decreasing the winding of relay 1162 is energized for a longer interval during each period of oscillation. Upon operating, relay 1162 at contacts 1163 completes the following circuit for operating trouble-alarm relay 840: negative potential, upper winding of relay 840, conductor 1073, contacts 1163, conductor 1074, contacts 887, contacts 816 and ground potential. Relay 840 operates and sounds an alarm as previously described until the converter circuits are manually released.

Should a reservation clerk erroneously attempt to register a digit greater than "3" for the first digit of the date, busy relay 890 operates to flash intermittently seize lamp 739 at the sender position. More specifically, when the wipers of the circuit control switch are at their first contacts, and after the incorrect first digit of the date has been stored on the sixth set of register relays, the following circuit is completed: ground potential on conductor "4 to 9," Fig. 19, of the sixth set of register relays, conductor 1923, lower winding of busy relay 890, conductor 1739, the first contact opposite wiper 1705, conductor 1718, upper winding of relay 970, and negative battery. Busy relay 890 operates, at contacts 893 opens a circuit to prevent the operation of stepping magnet 1700 of the circuit control switch, and at contacts 892 connects seize lamp 739 to conductor 826 which is connected to ground potential intermittently.

If the wipers of the impulsing control switch are not rotated in their usual manner when wiper 1704 of the circuit control switch encounters certain contacts, which are connected to the operating circuit of pick-up relay 1110, the following circuit is completed for operating relay 1150: negative potential, upper winding of relay 1150, conductor 1159, the twenty-sixth contact opposite wiper 1802, conductor 1115, contact engaged by wiper 1704, conductor 1117, and ground potential on conductor 837. Relay 1150 operates, and after an interval relays 1162 and 840 operate to sound an alarm.

Unless a cancellation is being registered on the space indicators, a wiper of the impulsing control switch should encounter ground potential before the eleventh position is reached, and thereby complete a circuit to operate cut-off relay 970. Normally, relay 970 operates for operating relay 1120 and for maintaining impulsing relays 1130 and 1140 operated. Should the wipers of the impulsing control switch be rotated beyond their tenth contacts before relay 1120 operates, the following circuit is completed for operating trouble-alarm relay 840: negative battery, lower winding of relay 840, contacts 836, conductor 829, contacts 1126, contacts 1184, conductor 1286, contact engaged by wiper 1802, and conductor 1115, which is connected to ground potential through wiper 1704 of the circuit control switch.

Trouble-alarm relay 840 remains operated until released as previously described. If impulses are being transmitted to the space indicators for registering a cancellation, relay 1180 is operated and the last traced circuit is opened at contacts 1184. However, during the fourth one-half revolution, relay 1280 is operated and at contacts 1283 prepares a circuit for operating the trouble-alarm relay. Should more than ninety-nine impulses be transmitted the following circuit is completed when wiper 1802 encounters its twenty-second contact during the fourth one-half revolution: negative potential, lower winding of relay 840, contacts 836, conductor 829, contacts 1126, conductor 1246, contacts 1283, conductor 1287, contact engaged by wiper 1802, and ground potential on conductor 1115.

A circuit including contacts 1199 of seize relay 1190 has been traced previously for operating relay 1060, which at contacts 1061 opens a circuit to prevent the operation of relay 1070. If a marking circuit is properly seized and released so that relay 1190 is operated only a short period of time, slow-acting relay 1160 remains operated, but if the releasing of relay 1190 is delayed, relay 1060 releases and at contacts 1061 closes a circuit for operating relay 1070. Trouble-alarm relay 840 operates in response to the operation of relay 1070 in the manner previously described.

Should the marking circuits of Figs. 21 to 25 be operated for an excessive length of time, slow-operating relay 2520 is operated in response to the intermittent closing of contacts 2511 of relay 2510. Upon operating, relay 2520 at contacts 2521 completes its locking circuit, at contacts 2522 completes a circuit for illuminating a trouble lamp, and at contacts 2523 completes a circuit for sounding an alarm. Relay 2520 remains operated until the locking circuit is opened manually.

Ordinarily, limit relay 1830 is released and the reservation clerk is limited to making only two reservations or cancellations at one time. If an attempt is made to reserve more than two spaces while relay 1830 is released, a circuit for operating relay 1070 is completed from ground potential, contacts of the fifteenth set of register relays through break contacts of relay 1830, conductor 1836, lower winding of relay 1070, to negative battery. Relay 1070 operates and at contacts 1072 completes a circuit for operating trouble-alarm relay 840.

Timing circuits are also provided for sounding an alarm if the converter is busy too long. Ground potential from conductor 879 is intermittently connected to contacts 886 of relay 880. When ground potential is applied momentarily through contacts 886 after relay 880 has operated, a circuit is completed from contacts 886, conductor 898, lower winding of relay 930 to negative potential. Relay 930 is operated, and at contacts 932 closes its locking circuit to conductor 873 which extends through break contacts 1199 of seize relay 1190, and through make contacts of relay 880 to ground potential. When seize relay 1190 is operated, relay 930 releases, but operates again when a succeeding impulse of ground potential is applied to conductor 879. Upon first operating, relay 930 at contacts 931 connects conductor 899 of a timer to the lower winding of relay 1070. Since ground potential is connected to conductor 899 a predetermined interval after relay 930 operates, relay 1070 operates to sound an alarm providing seize relay 1190 does not operate promptly to open the circuit of relay 930 at contacts 1199. Also, in response to relay 930 reoperating, after seize relay 1190 operates and releases in the usual manner, conductor 899 of the timer is reconnected to the lower winding of relay 1070 until relay 860 operates for restoring the previously selected connector, the selectors, and the sender at the clerk's position. Should the operation of relay 860 be delayed, the circuit which may be traced as follows is completed for operating relay 1070 ground potential on conductor 899, contacts 869, conductor 964, contacts 931, conductor 1076, rectifier 1075, lower winding of relay 1070, and negative battery. The circuit of trouble-alarm relay 840 is completed in the event of trouble at operated contacts 1072. In response to the operation of relay 860, within the normal interval, conductor 899 is disconnected from the alarm circuits at contacts 869, and at contacts 835 a circuit is prepared from negative battery, lower winding of relay 840, contacts 835, conductor 938, contacts 933, to conductor 937 of a timer. If relay 860 releases promptly when the converter circuits are being restored to normal, relays 860 and 930 restore and open points in the last traced circuit before ground potential is applied to conductor 937. However, if the restoration of the converter is delayed, trouble-alarm relay 840 is operated, and is maintained operated until manually released as previously described.

*Conditioning the reset converter for "Date reset"*

The operation of the reset converter, Figs. 1 to 6, inclusive, and the reset connector, Fig. 29, to reset the space indicators such as illustrated in Fig. 27 will now be described in detail.

In order to reset all space indicators that correspond to a particular date, the supervisor in charge operates the locking Date Reset key, which is shown at the top of Fig. 2; and then operates dial 236 to position the wipers of the reset selector switch of Fig. 1 opposite the level of bank contacts corresponding to the particular date. Normally, no other manual operation is required to reset all space indicators of that date.

In response to the operation of the Date Reset key, ground is connected through contacts 233 and contacts 262 to holding conductor 289, and also at contacts 233 the following circuit is closed to operate impulsing relay 310: ground, contacts 233, dial 236, conductor 237, contacts 308, winding of relay 310, and negative battery. At contacts 312 the operating circuit of date reset relay 270 is completed from negative battery, contacts 232, lower winding of relay 270, contacts 273, conductor 238, contacts 312 to ground; and at contacts 313 an obvious circuit is completed for illuminating the reset seize lamp 332. Relay 270 at contacts 271 prepares an impulsing circuit for the vertical stepping magnet of the reset selector; at contacts 272 closes its locking circuit from ground, contacts 232, lower winding of relay 270, contacts 272, upper winding of relay 270 to negative battery; and at contacts 275 prepares a circuit for relay 350 from conductor 277, contacts 275, conductor 278, lower winding of relay 350 to negative battery.

Conductor 277 is connected to a conventional timing device for applying ground at predetermined intervals. In the event of trouble that delays the resetting operation, trouble relays 350 and 340 operate to give a trouble alarm. Upon operating relay 350 closes its locking circuit from negative battery, contacts 313, upper winding of relay 350, contacts 351 to ground, and at contacts 352 connects conductor 353 to the lower winding of relay 340. After a further interval, ground is applied to conductor 353 to operate relay 340. At contacts 343 a locking circuit is completed from negative battery, upper winding of relay 340, contacts 343, contacts 345 of a manually operated switch, and to ground; at contacts 342 lamp 346 is connected to conductor 347 which is connected to ground intermittently to cause the lamp to flash; and at contacts 344 ground is connected to conductor 354 for sounding an alarm. The alarm continues until switch 345 is opened manually to release relay 340.

*Vertical stepping of the reset selector*

Upon observing the illumination of reset seize lamp 332, the operator dials the digit corersponding to the level to which the wipers are to be raised in the reset selector banks. In response to the operation of the dial, the previously traced circuit of relay 310 is interrupted intermittently to transmit impulses. At contacts 313, the locking circuit of relay 350 is opened during each impulse to release trouble relay 350 in event that it has previously operated. At contacts 311, an impulsing circuit to step the wipers of the reset selector and to operate slow-releasing transfer-control relay 160 is completed from negative battery, contacts 311, conductor 315, contacts 271, contacts 265, contacts 251, conductor 267, winding of relay 160, contacts 157, winding of vertical stepping magnet 190 to ground.

The operation of vertical magnet 190 raises the rotary wipers 191 to 198 inclusive to the level corresponding to the number of digits dialed on the first step, actuates vertical springs V. O. N. to prepare a release circuit at contacts 290, and also positions vertical wiper 330 on the corresponding vertical bank contact to test for a busy condition. Relay 160, which operated on the first impulse, at contacts 161 completes a circuit from ground, contacts 161, contacts 185, conductor 188, winding of slow-acting transfer-control relay 200 to negative battery; at contacts 162 opens a point in the circuit that is subsequently prepared for operating transfer relay 150; and at contacts 164 opens a point in the operating circuit of relay 250. Upon operating relay 200 at contacts 201 prepares the operating circuit of relay 150 and the operating circuit of relays 300 and 320, and at contacts 204 opens a point in the operating circuit of slow-releasing impulsing-control relay 170.

*Flight busy test*

The engagement of any flight selector, that is, in a group corresponding to the same date as that of the selected level of the reset selector, delays the operation of the reset converter until all flight selectors of that group become idle. If the first level of the reset selector has been selected, and if the flight selector, Fig. 26, corresponding to the first level, is engaged, then as relay 160 releases shortly after impulsing ceases, the following circuit is completed to operate busy guard relay 250: negative battery, lower winding of relay 250, conductor 257, contacts 164, conductor 166, contacts 287, conductor 258, contacts 306, vertical wiper 330, vertical bank contact 331, conductor 395 of cable 394, contacts 2649, and ground. Upon operating relay 250, at contacts 251 opens a point in the impulsing circuit, at contacts 253 closes a locking circuit for relay 200, at contacts 254 opens the operating circuit of relays 300 and 320, and at contacts 255 opens a point in the operating circuit of impulsing-control relay 170.

The locking circuit for relay 200 may be traced as follows: negative battery, upper winding of relay 200, contacts 221, contacts 253, conductor 259, contacts 302, conductor 309, contacts 201, conductor 167, contacts 162, and ground. When all flight selectors corresponding to the selected date become idle, busy-guard relay 250 releases to prepare the impulsing circuits, to release transfer-control relay 200, and also to operate relays 300 and 320 over circuits traced subsequently.

After the busy-guard relay 250 releases, or if it is not operated, the reset converter operates automatically until all space reservation indicators for the selected date are reset to display the number of seats initially available on all flights for that date. Upon releasing, transfer-control relay 160 at contacts 161 opens the operating circuit of slow-acting transfer-control relay 200 at contacts 162 closes a circuit to energize the windings of transfer relay 150, and also at contacts 162 closes the operating circuit of relays 300 and 320. The circuit for energizing the windings of relay 150 in opposition may be traced from ground, contacts 162, conductor 167, conductor 168, contacts 201, contacts 156, and from contacts 156, through the lower winding of relay 150 to negative battery and, also, from contacts 156 through the upper winding of relay 150, contacts 152, resistor 158, to negative battery. Relay 150 does not operate until transfer control relay 200 releases. Relays 300 and 320 are energized over the following circuit: ground, contacts 162, conductor 167, contacts 201, contacts 254, conductor 266, contacts 305, conductor 314, contacts 276, conductor 316, relay 320, relay 300, and negative battery.

The windings of relays 300 and 320 are chosen such that relay 320 operates before relay 300. Relay 320 at contacts 321 closes the following circuit to operate level busy relay 390: ground, contacts 321, upper winding of relay 390, vertical contact 331, wiper 330, contacts 306, conductor 258, contacts 287, conductor 166, contacts 164, conductor 257, lower winding of relay 250, and negative battery. The current flow as limited by the resistance of the top winding of relay 390 is not sufficient to operate relay 250. Relay 390 at contacts 391 connects its lower winding in series with the upper winding and negative battery, and at contacts 392 which are connected to conductors 396 and 397 opens a point in the circuit of wiper 2631—the wiper of the flight selector shown in Fig. 26. Other contacts such as contacts 393 open similar points in other flight selectors corresponding to the selected level to prevent the regular selectors from seizing connectors that have access to the particular date previously selected by the reset selector. Upon operating relay 300 at make before break contacts 301 and 308 transfers the winding of the impulsing relay from the circuit controlled by dial 236 to a circuit controlled by impulsing control relay 170, at make before break contacts 304 and 305 transfers the operating circuit of relays 300 and 320 from the ground at contacts 162 to the holding ground on conductor 289, and at contacts 306 opens a point in the operating circuit of busy-guard relay 250, and at contacts 307 prepares the operating circuit of impulsing-control relay 170. Impulsing relay 310 is now maintained operated by the following circuit: negative battery, winding of relay 310, contacts 301, conductor 322, contacts 172, contacts 127, conductor 323, contacts 233, and ground.

*Rotary stepping of the reset selector*

Upon releasing, slow-acting, transfer-control relay 200, at contacts 201 opens the previously traced circuit for energizing the windings of transfer relay 150, and at contacts 204 closes the following circuit to operate impulsing-control relay 170: negative battery, relay 170, contacts 186, contacts 113, conductor 174, contacts 204, contacts 255, conductor 279, contacts 484, conductor 485, contacts 307, and ground. When the initial energizing circuit for relay 150 is opened at contacts 201, the induced current in the closed circuit including negative battery, lower winding of relay 150, upper winding of relay 150, contacts 152, resistor 158, changes the magnetic field sufficiently to cause the armature to close contacts 154. At contacts 154 the following circuit is completed for connecting the two windings in series to aid each other in fully operating the transfer relay: negative battery, lower winding of relay 150, upper winding, initially closed contacts 154, and ground on holding conductor 289. Upon completing its operation, relay 150, at contacts 152 and 153 transfers negative battery and resistor 158 from its initial energizing circuit to the upper winding of transfer relay 140, at contacts 155 and 156 transfers an incomplete energizing circuit from relay 150 to relay 140, and at contacts 157 and 151 transfers the impulsing circuit from vertical stepping magnet to rotary stepping magnet 199.

Circuits have now been prepared for rotating wipers 191 to 198, inclusive, to engage the reset connector accessible at the first contacts of the selected level. Upon operating, relay 170 at contacts 172 opens the previously traced circuit to release impulsing relay 310. The circuit for energizing rotary magnet 199 to step the wipers may be traced from negative battery, contacts 311, conductor 315, contacts 271, contacts 265, contacts 251, conductor 267, relay 160, contacts 151, contacts 148, rotary magnet 199 to ground. Relays 160 and 200 operate as previously described. Upon operating relay 200 at contacts 204 opens the operating circuit of slow-releasing relay 170. Relay 170 releases to close at contacts 172 the previously traced operating circuit of impulsing relay 310. Relay 160 upon releasing in response to the operation of relay 310 closes the following circuit for energizing the two windings of transfer relay 140 which are connected in the manner previously described for relay 150: ground, contacts 162, conductor 167, contacts 201, conductor 168, contacts 155, contacts 146, through the lower winding of relay 140 to negative battery, and through the upper winding, contacts 142, contacts 153, resistor 158 to negative battery. Relay 200 releases, at contacts 201 opens the initial energizing circuit of relay 140, and at contacts 204 closes again the operating circuit of relay 170. When the initial energizing circuit of transfer relay 140 is opened, contacts 144 are closed to complete the following circuit: negative battery, lower winding of relay 140, upper winding, contacts 144, contacts 184 and ground on holding conductor 280. Upon completing its operation relay 140 at contacts 148 and 141 transfers the impulsing circuit from the rotary stepping magnet of the reset selector to the vertical magnet of the selected reset connector, at contacts 142 and 143 transfers negative battery and resistor 158 from upper winding of relay 140 to transfer relay 130, and at contacts 145 and 146 transfers the incomplete energizing circuit from the lower winding of relay 140 to the lower winding of relay 130.

Reset connector operates

Circuits are now prepared for operating the selected reset connnector, for example, Reset Connector of Fig. 29, that is accessible at the first bank contacts of the selected level. Relay 170 operates, and relay 310 releases again to close the following circuit: negative battery, contacts 311, conductor 315, contacts 271, contacts 265, contacts 251, conductor 267, relay 160, contacts 151, contacts 141, contacts 131, contacts 101, rotary wiper 191, the first bank contact of the selected level, conductor 2901, contacts 2911, vertical stepping magnet 2930, rotary off-normal springs 2920, and ground. The single impulse transmitted to the vertical magnet positions rotary wipers 2931 to 2937, inclusive, opposite their respective bank contacts of the first level. When relay 160 releases again, the windings of transfer relay 130 are energized over the circuit including contacts 135 and 133, and in response to the subsequent release of relay 200 operates fully over the circuit including contacts 134 in the manner previously described for relays 140 and 150.

Relay 130 at contacts 131 and 132 transfers the impulsing circuit from the vertical magnet 2930 to the rotary magnet 2938, at contacts 133 and 135 opens points in its initial energizing circuit, and at contacts 137 prepares the following locking circuit which at the conclusion of the next impulse places the releasing of relay 200 under the control of busy-guard relay 250: negative battery, upper winding of relay 200, contacts 221, contacts 252, conductor 242, contacts 137, conductor 243, contacts 303, conductor 309, contacts 201, conductor 167, contacts 162, and ground. Relays 170, 310, 160, and 200 operate again in the cycle previously described to send a single impulse over the circuit from negative battery to contacts 141, as previously traced, and now extended through contacts 132, 121, 103, wiper 192 and its respective bank contact conductor 2902, contacts 2913, to rotary magnet 2938, and ground. The operation of the rotary magnet steps wipers 2931 to 2937, inclusive, to the first set of contacts on the first level to establish controlling connections with a maximum of five space indicators as illustrated in Fig. 27. After the indicators have been selected and after relay 160 releases, but before relay 200 releases, the following operating circuit is completed for busy-guard relay 240: ground through the busy lamp associated with the selected indicators, for example, lamp 2750 of Fig. 27, conductor 2946 of cable 2940 and the respective bank contacts, wiper 2936, relay 2910, conductor 2907 and its terminating bank contact, wiper 197, contacts 128, contacts 163, conductor 206, contacts 203, winding of relay 240, conductor 207, contacts 110, and negative battery.

Connecting impulsing circuits to a group of indicators

Providing the selected group of indicators is not already engaged by a regular connector, relay 240 and 2910 operate. Connect relay 2910 at contacts 2911 disconnects the vertical stepping magnet 2930 from its impulsing circuits, at contacts 2913 disconnects the rotary stepping magnet 2938, at contacts 2915 and 2917 opens a point in the circuits controlled by normal posts springs N. P. S., at contacts 2919 opens a point in the circuit to the release magnet 2939, and at each of the contacts 2912, 2914, 2916, 2918, and 2909 connects an impulsing circuit to a different one of the space reservation indicators of Fig. 27. Relay 240 at contacts 241 closes a circuit from ground, contacts 241, conductor 166, contacts 164, conductor 257, lower winding of relay 250 to negative battery. Relay 250 at contacts 251 opens the impulsing circuit, at contacts 254 opens a point in the initial energizing circuit of relays 300 and 320, at contacts 252 opens the locking circuit of relay 200 to cause its release, at contacts 255 opens an additional point in the circuit of relay 170, and at contacts 256 closes the circuit for both the upper winding of relay 250 and the winding of cut-in relay 100.

If the indicators are engaged by a regular connector, negative battery through a low resistance circuit of the regular converter is applied to the circuit of busy lamp 2750. This low resistance circuit through negative battery shunted across the winding of camp-on-busy relay 240 and thus prevents its operation. The reset converter "camps" on the busy group of indicators until the indicators are no longer engaged by a regular connector, and then in response to the removal of the low resistance circuit, relay 240 operates, as previously described, to cause the operation of relay 250.

The circuit for the upper winding of relay 250 may be traced from negative battery, upper winding, contacts 256, conductor 279, contacts 484, conductor 485, contacts 307 to ground; and the circuit to operate cut-in relay 100 may be traced from negative battery, relay 100, conductor 116, and also through contacts 256 to ground. Relay 100 at contacts 102, 104, 106, 107, and 109 prepares an impulsing circuit for each of the five selected space indicators, at contacts 112, completes a circuit traced subsequently for operating pick-up relay 540, at contacts 110 opens the energizing circuit of relay 240, and at contacts 111 maintains a circuit from negative battery, winding of relay 2910, conductor 2946, busy lamp 2750 to ground. Negative battery from conductor 2946 to bank contacts of regular connectors renders the indicators busy. Relay 240 releases.

Impulse generating circuits

Circuits for polarizing cut-off relays 360, 370, 380, 400, and 410, and also for starting vibrator 530, which generates controlling impulses, are completed when the reset converter is seized as previously described by the operation of the Date Reset key. A circuit for polarizing the cut-off relays may be traced from ground, contacts 233, contacts 262, conductor 289, resistor 362, polarizing windings of relays 360, 370, and 380, conductor 382, relays 400 and 410 to negative battery. A circuit is also completed to operate impulsing relays 550 and 560 as follows: ground on holding conductor 289, contacts 545, resistor 547, lower winding of relay 550, lower winding of relay 560, and negative battery. Relay 550 at contacts 553 opens a point in an incomplete operating circuit of stepping magnet M650; and relay 550 at contacts 551 and 552, and relay 560 at contacts 561, 562, and 563 open points in impulsing circuits that are later extended to the five selected space indicator circuits by the previously described operation of cut-in relay 100. Finally, in response to the ground on conductor 289, a circuit for energizing the upper windings of vibrator 530 is completed through contacts 513, contacts 526 and resistor 527 connected in parallel with resistor 528, upper windings to negative battery. The vibrator pendulum is attracted to close a circuit from negative battery, contacts 531, contacts 523, lower winding of relay 520, contacts 511 to ground on holding conductor 289. Relay 520 at contacts 521 closes its locking circuit from negative battery through the upper winding to holding conductor 289, at contacts 523 opens its initial operating circuit, at contacts 522 and 525 completes a circuit for energizing the lower winding of the vibrator, at contacts 526 disconnects starting resistor 527 from in parallel with resistor 528 to reduce the current flow in the upper windings of the vibrator, and at contacts 524 completes the circuit for energizing slow-operating relay 510. Upon operating, relay 510 at contact 511 opens a further point in the initial operating circuit of relay 520, at contacts 514 prepares a circuit for operating pick-up relay 540, and at make contacts 512 connects ground through contacts 524 to the circuit for energizing the upper windings of the vibrator while disconnecting the holding conductor from this circuit at break contacts 513.

The pendulum of the vibrator applies negative battery alternately to contacts 531 and contacts 532. When the pendulum engages contact 531 the lower windings of the vibrator are energized over the following circuit: negative battery, contacts 531, contacts 522, lower windings, contacts 525, 512, and 524 to ground. The magnetizing force of the lower winding is in opposition to that of the upper winding to permit the pendulum to swing away from the coils.

Stepping the indicators to "99"

Shortly after cut-in relay 100 operates as previously described, slow-acting relay 200 releases in response to the previously described operation of relay 250. The circuit that is now completed for operating pick-up relay 540 may be traced from negative battery connected to the vibrating pendulum, contacts 532, contacts 514, contacts 544, upper winding of relay 540, conductor 546, contacts 473, contacts 482, conductor 486, contacts 147, contacts 112, conductor 117, contacts 205, to ground on holding conductor 289. Relay 540 at contacts 541 closes its locking circuit from battery, its lower winding, contacts 541 and to conductor 546 which is connected to ground by the previously traced circuit; at contacts 542 prepares an impulsing circuit for stepping magnet M650; at contacts 545 opens the initial energizing circuits of impulsing relays 550 and 560, and at contacts 543 closes a circuit to place the impulsing relays under the control of the vibrator; and finally at contacts 544 opens the circuit for initially energizing relay 540. The circuit for controlling the impulsing relays may be traced from ground on the pendulum of the vibrator, contacts 532, 514, and 543, upper windings of relays 550 and 560, contacts 482, conductor 486, contacts 147, contacts 112, conductor 117, contacts 205 to ground on holding conductor 289. Upon receiving impulses from the vibrator, relays 550 and 560 send impulses over five individual circuits to space reservation indicators of Fig. 27. For example, an impulsing circuit may be traced from negative battery, impulsing contacts 561, conductor 564, conductor 454, contacts 452, operating winding of cut-off relay 370, conductor 372, contacts 106, wiper 194, conductor 2904, contacts 2918, wiper 2934, conductor 2944 of cable 2940, upper winding of indicator 2700, contacts 2701, lower winding of the indicator to ground. Likewise similar circuits may be traced from contacts 562, 551, 563, and 552, to step space indicators 2740, 2720, 2710 and 2730, respectively. Impulses are sent over each individual impulsing circuit until both drums of the respective indicators display "9." For example, when the drums of indicator 2700 display "99," the cam spring 2703 is actuated to close contacts 2702 and to open contacts 2701. At contacts 2702 the upper winding is connected directly to ground; and at contacts 2701 the lower winding is disconnected from the circuit. The decreased resistance in this impulsing circuit causes the operation of polarized cut-off relay 370 which at contacts 371 closes an operating circuit to its associated control relay 450. Relay 450 at contacts 451 closes its locking circuit; at contacts 452 opens the previously traced impulsing circuit, and at contacts 453 closes a point in the chain circuit which is connected to the winding of relay 470. The operating circuit of relay 450 may be traced from negative battery, winding of relay 450, conductor 373, contacts 371, contacts 501 to ground on holding conductor 289. Also include conductor 374. Likewise when indicators 2710, 2720, 2730 and 2740 display "99," cut-off relays 360, 400, 410, and 380, respectively, operate to close operating circuits at contacts 361, 401, 411, and 381. If less than five indicators are connected to any set of contacts in the connector bank, the spare contacts are connected to ground potential for operating corresponding cut-off relays as soon as any of the five impulsing circuits are connected to the spare contacts. Relays 460, 430, 420, and 440 operate to cut-off the impulsing circuits, and at contacts 463, 433, 423, and 443, respectively, close the operating circuit of slow-releasing relay 470. Each of the cut-off relays 370, 360, 400, 410, and 380 releases after its associated control relay has operated. Upon operating slow-releasing relay 470 at contacts 471 closes its locking circuit, and at contacts 472 closes a circuit from holding conductor 289, contacts 472, conductor 474, winding of slow-releasing relay 500 to negative battery. Relay 500 at contacts 501 opens the locking circuits of relays 420, 430, 440, 450, and 460, all of which release to connect again the five impulsing circuits to the same group of five indicators; and at contacts 505 closes the following circuit to place stepping magnet M650 under the control of impulsing relay 550: negative battery, winding of stepping magnet M650, conductor 642, contacts 505, contacts 553, contacts 542, and holding conductor 289. Also, relay 500 at contacts 503 and 504 prepares marking circuits through banks of switch S650.

Indicators set to display spaces available

The five indicators and the rotary switch S650 step together until the selected indicators display the correct number of seats initially available in the particular flight. The numbers to be displayed on each set of indicators when they are finally reset are determined by a respective marking circuit that is connected from a corresponding bank contact, for example, contact 2947 of the reset connector of Fig. 29, to a contact of switch S650. One contact in one of the levels 656 and another contact in one of the levels 652 to 655 is available for each number that can be displayed. The marking circuit for a set of indicators which is the first or intermediate set to be selected in a flight group, includes a contact in one of the levels 656 to 659; while the marking circuit for a set of indicators which is the last, or only, set to be selected in a flight group, includes a contact in one of the levels 652 to 655. When a marking circuit is completed through a contact in one of the levels 652 to 655, relay 220 for releasing the reset converter is operated as subsequently described, but is effective to release the reset converter only if the Flight Reset key rather than the Date Reset key has been operated. When the first impulse is transmitted in response to the operation of relay 500, the display on each of the engaged indicators is changed from "99" to "98"; and as the wipers of rotary switch S650 are stepped from the first or normal position to the second position, contacts of off-normal springs 650 complete the following circuit for operating relay 600: negative battery, relay 600, conductor 602, contacts 574, off-normal springs 650, contacts 593, and ground. At contacts 601 of relay 600, a circuit is prepared for operating relay 570. During each one-half revolution of the wipers of switch S650, a different one of the wipers 666 to 669, inclusive, and also when operative a different one of the wipers 662 to 665, inclusive, the marking circuit of the engaged indicators; during the first twenty-four impulses, while the display is changed from "99" to "75," ground potential is connected through contacts 593, contacts 571, conductor 577 to wiper 669, and also through the winding of relay 220, conductor 223, contacts 504, contacts 576, to wiper 662. If the marking circuit of the engaged indicators is not encountered by wiper 669, and wiper 662 then on the twenty-fifth impulse when the wipers are again positioned on the first contacts of the banks, off-normal springs 650 are opened momentarily to disconnect the shunt circuit from across the winding of relay 570. Relay 570 operates in series with relay 600 over the following circuit: negative battery, winding of relay 600, conductor 602, winding of relay 570, conductor 579, contacts 601, conductor 603, contacts 593, and ground. Relay 570 at contacts 571 and 572 transfers ground from wiper 669 to wiper 668, at contacts 576 and 575 transfers ground from wiper 662 to wiper 663, and at contacts 573 and 574 transfers the control circuit including the off-normal springs from relay 600 to relay 620. When the next impulse is transmitted, off-normal springs complete the circuit from ground potential through contacts 573, conductor 604, contacts 614, winding of relay 620 to negative battery. Relay 620 at contacts 621 prepares the operating circuit for relay 610. If the marking circuit is still incomplete at the second one-half revolution when the indicators display "50," relay 610 operates in a manner previously described for relay 570, at contacts 611 and 612 transfers ground from wiper 668 to wiper 667, at contacts 616 and 615 transfers ground potential from wiper 663 to wiper 664, and at contacts 613 and 614 transfers the controlling circuit, from relay 620 to relay 640. At the beginning of the third one-half revolution of the wipers, relay 640 operates, and at contacts 641 prepares a circuit for operating relay 630. If it is assumed that "22" is to be displayed on the indicators, the marking circuit is still incomplete at the end of the third one-half revolution, and at the beginning of the fourth one-half revolution relay 630 at contacts 633 opens a point in its shunt circuit at contacts 631 and 632 transfers ground potential from wiper 667 to wiper 666, and at contacts 635 and 634 transfers ground potential from wiper 664 to wiper 665. Providing the marking circuit of the selected indicators is connected to the third contact of level 656, the completed circuit may be traced from ground, contacts 503, contacts 572, conductor 578, contacts 612, contacts 632, wiper 666, third contact of bank 656, conductor 2948, bank contact 2947, wiper 2937, conductor 2908, wiper 198 of the reset selector, contacts 114, contacts 187, contacts 165, conductor 169, winding of relay 210 to negative battery. Cut-off relay 210 at contacts 211 closes the following circuit to operate relay 480 and to maintain impulsing relays 550 and 560 operated: negative battery, lower winding of relay 560, lower winding of relay 550, conductor 554, lower winding of relay 480, conductor 487, contacts 211, conductor 212, contacts 112, conductor 117, contacts 205, and ground potential on conductor 289.

If the entire flight is displayed on the selected set of indicators, the cross-connecting conductor 2948 would be connected to the third contact in level 655, and the marking circuit would be completed from ground, winding of relay 220, conductor 223, contacts 504, contacts 575, conductor 565, contacts 615, contacts 634, wiper 665, third contact of bank 655, conductor 2948, bank contact 2947, wiper 2937, conductor 2908, wiper 198, contacts 114, contacts 187, contacts 165, conductor 169, winding of relay 210 to negative battery. Although relay 220 would operate in series with relay 210, it performs no function at this time.

*Automatic selection of indicators*

Each of the engaged indicators now display the number of seats initially available between two stops of the flight. Relays for controlling impulsing circuits are restored to normal, and the wipers of the reset connector are rotated to the next set of bank contacts to prepare impulsing circuits for the next set of space indicators that are to be reset. Relay 480 at contacts 483 opens the locking circuit of slow-releasing relay 470, at contacts 484 opens the circuits of relay 250 and the circuit of cut-in relay 100, at contacts 481 closes its locking circuit through conductor 488 to ground on wiper 661, and at contacts 482 opens the energizing circuit of relay 540. Relay 250, 100 and 540 release. Relay 100 at contacts 112 opens the initial operating circuit of relay 480 and at contacts 111 opens a circuit to release relay 2910. Relays 2910 and 100 prepare the previously traced impulsing circuit for the rotary stepping magnet of the reset connector. Relay 540 at contacts 543 and 544 transfers the circuit including the oscillating pendulum from the impulsing relays 550 and 560 to the open circuit of the pick-up relay 540, at contacts 545 closes a previously traced circuit for maintaining relays 550 and 560 operated, and at contacts 542 opens a point in the previously traced impulsing circuit of switch S650. Upon releasing relay 470 at contacts 472 opens the energizing circuit of slow-releasing relay 500. After an interval relay 500 releases and at contacts 593 opens the energizing circuit of relays 570, 600, 610, 620, 630, and 640, at contacts 501 prepares the circuits of relays 420, 430, 440, 450, and 460, at contacts 504 opens the energizing circuit of relay 220, and at contacts 506 closes the following circuit to return the wipers of switch S650 to the normally engaged first contacts of the levels: ground, contacts of level 651, wiper 661, interrupter contacts J650, conductor 489, contacts 506, conductor 642, stepping magnet M650, and negative battery. The switch steps through the operation of its interrupter springs until wiper 661 encounters the open circuit at the first contact of switch level 651. Also, at the first position, the locking circuit of relay 480 is opened. Upon releasing, relay 480 at contacts 484 closing the circuit for again operating impulse-control relay 170 to start the previously described sequence of operation to send a single impulse to rotary magnet 2938; that is, relay 310 releases; relay 160 operates; the rotary wipers of the reset connector are stepped to the second set of contacts in the first lever, relay 200 operates, relay 170 releases, relay 310 operates, relay 160 releases, relays 240 and 2910 operate over the busy lamp circuit of the second set of indicators, relays 250 and 100 operate, relay 200 releases, and pick-up relay 540 operates to complete circuits for sending impulses to the second set of space indicators in the manner previously described for the first set.

*Vertical stepping of the reset connector*

The operation continues automatically as previously described until all space indicators which are accessible at the first level of the engaged reset connector are reset to display the number of seats initially available. As wipers 2931 to 2937 leave the tenth set of contacts, cam springs CAM of the reset connector are closed to prepare the following circuit for relay 120: ground, contacts 2923, contacts 2922, contacts 2917, conductor 2904, bank contact 194, contacts 105, contacts 123, contacts 171, winding of relay 120, and negative battery. When relay 170 releases immediately after the wipers reach the eleventh position, the circuit is completed at contacts 171 to operate relay 120. Relay 120 at contacts 124 connects its energizing circuit to ground on conductor 289, at contacts 123 opens its initial energizing circuit, at contacts 127 opens an additional point in the circuit of impulsing relay 310, at contacts 129 prepares for relay 170 a circuit including interrupter springs 2926 of vertical magnet 2930, at contacts 128 opens a point in the operating circuit of relay 240, at contacts 125 completes a circuit for operating release magnet 2939, and at contacts 122 transfers the closed impulsing circuit from rotary magnet 2938 to vertical magnet 2930. The circuit for operating the release magnet may be traced from negative battery, winding of release magnet 2939, contacts 2919, conductor 2905, wiper 195, contacts 181, contacts 125, contacts 105, wiper 194, conductor 2904, contacts 2917, contacts 2922, contacts 2923 to ground. The circuit closed at contacts 122 vertical magnet 2930 is as follows: negative battery, contacts 311, conductor 315, contacts 271, contacts 265, contacts 251, conductor 267, relay 160, contacts 151, contacts 141, contacts 132, contacts 122, contacts 101, wiper 191, conductor 2901, contacts 2911, vertical magnet 2930, resistor 2925, and ground. When the release magnet operates, the wipers 2931 to 2937 return in the well known manner to the normal rotary position while the partial energization of the vertical stepping magnet positions the vertical pawl against the vertical ratchet to maintain the wipers at the same level upon clearing the switch banks. Also, when the wipers begin their retracting action, cam springs CAM are actuated to open at contacts 2923 the energizing circuit of the release magnet. As the wipers return from rotary position 1 to normal, rotary off-normal springs R. O. N. are actuated to close at contacts 2920 a circuit to short resistor 2925, thus to increase the current flow in the winding of vertical stepping magnet 2930.

The wipers are stepped vertically to the second level; and vertical interrupter springs 2926 operate to close the following circuit for operating relay 170: ground, contacts 2626, conductor 2908, wiper 198, contacts 129, contacts 186, relay 170, and negative battery. Relay 170 at contacts 171 opens the circuit of relay 120 which, upon releasing, at contacts 122 opens the energizing circuit of vertical magnet 2930 and at contacts 121 closes the previously traced circuit to energize rotary magnet 2938. The wipers are stepped to the first contacts of the second level. When the vertical magnet is deenergized, the circuit of slow-releasing relay 170 is opened at vertical interrupter spring contacts 2926; and upon releasing relay 170 at contacts 172 recloses the energizing circuit of impulsing relay 310. The rotary stepping magnet 2938 is deenergized. The sequence of operations for resetting the space indicators that are accessible at the second level of contacts continues in the same manner as previously described for resetting the indicators corresponding to the first level. Also, the indicators corresponding to the remaining eight levels are reset in a similar manner.

*Automatic selection of reset connectors*

After all the indicators that are accessible through the reset connector Figure 29 have been reset, the wipers 191 to 198 of the reset selector Figure 1 are rotated to the next set of contacts to connect with another reset connector. When the wipers 2931 to 2937 of the previously selected reset connector step off the tenth set of contacts at the tenth level, normal post springs N. P. S. are actuated to open contacts 2922 and to close contacts 2921 for transferring the ground applied through cam springs CAM from the operating circuit of relay 120 to the operating circuit of relay 180. The operation of the cam springs closes a circuit from ground, contacts 2923, contacts 2921, contacts 2915, conductor 2906, wiper 196, contacts 108, contacts 173, lower winding of relay 180, to negative battery. Relay 180 at contacts 183, closes the following locking circuit to maintain relay 180 operated until the wipers of the reset connector have returned to normal: negative battery, contacts 183, wiper 193, conductor 2903, contacts 2924 of vertical off-normal springs V. O. N., and ground. During its operation, relay 180 at contacts 184 releases transfer relays 130 and 140, at contacts 185 opens the energizing circuit of slow-acting relay 200, at contacts 186 opens a point in the circuit of slow-releasing relay 170, at contacts 187 opens a point in the operating circuit of relay 210, and at contacts 182 prepares a circuit for operating the release magnet of the reset connector.

Relay 140 reconnects the impulsing circuit which is controlled by relay 310 to the rotary magnet of the reset selector, and at contacts 147 opens a point in the operating circuit of relay 480. Relay 170 releases, relay 310 operates, and relay 160 releases in the manner previously described. When relay 160 releases the circuit for operating release magnet 2939 is closed from negative battery, winding of release magnet 2939, contacts 2919, conductor 2905, wiper 195, contact 182, conductor 176, contacts 202, conductor 167, contacts 162 to ground. When wipers 2931 to 2937 return to their normal position, vertical off-normal springs V. O. N. are actuated to open at contacts 2924 the energizing circuit of relay 180. Upon releasing relay 180 at contacts 182 opens the energizing circuit of release magnet 2939, and at contacts 186 recloses the operating circuit of relay 170. The operation of relay 170 starts the previously described sequence of operation for energizing rotary magnet 199, and thereby steps wipers 191 to 198 to the second set of contacts of the previously selected level. The reset converter continues on its operation and controls the newly selected reset connector and its associated space indicators in exactly the same manner as previously described for controlling the reset connector Figure 29 and its associated space indicators. After the space indicators that are reconnected to the second reset connector are reset to show the initially available seating space, other reset connectors, similar to Reset Connector, Figure 29, that are of the same date and that are connected to the same level in the bank of the reset selector are selected automatically in sequence; and thereby all space indicators for one date are automatically reset.

Restoration of reset converter

After all indicators for a date have been reset, audible and visual signals are given until the Date Reset key is restored manually to return all converted circuits to normal. As wipers 191 to 198 move off the tenth set of contacts when the resetting operation has been completed, cam springs CAM of the selector are actuated to connect in series relays 180 and 260 in the following circuit to operate release relay 260, only: negative battery, upper winding of relay 180, conductor 175, contacts 208 of cam springs CAM, upper winding of relay 260, contacts 290 of vertical off-normal springs V. O. N., and ground. Relay 260 at contacts 261 closes its locking circuit and also closes a circuit for illuminating lamp 346, at contacts 262 removes ground from holding conductor 289, at contacts 264 places ground on conductor 268 to operate an audible signalling device, at contacts 265 opens a point in the impulsing circuit, and at contacts 269 closes the following circuit to operate release magnet 177: ground, contacts 269, conductor 178, contacts 189, winding of release magnet 177, and negative battery. In response to the operation of the release magnet, wipers 2901 to 2908 return to normal, and cam springs CAM and vertical off-normal springs V. O. N. are actuated to open contacts 208 and 290, respectively. The removal of ground from conductor 289 stops the operation of vibrator 530, removes the bias from relays 360, 370, 280, 400, and 410, and releases relays 150, 300, 320, 510, 550, and 560. Relay 300 at contacts 307 opens the energizing circuit of relay 170, relay 320 at contacts 321 opens a circuit to release relay 390, and relay 520 at contacts 524 opens the energizing circuit of relay 510. Upon observing the audible and visual signals for indicating the completion of the resetting operation, the operator restores the Date Reset key which at contacts 232 opens a circuit to release relay 270, and at contacts 233 opens the locking circuit of relay 260 and also at contacts 233 opens a circuit to extinguish lamp 346. Relay 260 at contacts 269 opens the circuit of release magnet 177, and at contacts 264 opens the circuit of an audible signal device. This completes the restoration of the reset converter.

Conditioning the converter for "Flight Reset"

To reset the indicators that correspond to only one flight of a particular date, the Flight Reset key is operated and then four digits are dialed. The first digit, which corresponds to the date, determines the level to which the wipers of the reset selector are stepped; the second digit, which is the first digit of the flight number, controls the rotary stepping of the reset selector; and the remaining two digits control the vertical and rotary stepping of the selected connector.

The operation of the Flight Reset key closes a circuit from ground at contacts 235 to holding conductor 289, and at contacts 234 prepares an operating circuit for relay 280. In response to the application of ground potential to conductor 289 the circuits are completed as previously described to energize the biasing windings of relays 360, 370, 380, 400 and 410; to operate relays 520, 510, 550 and 560; to start vibrator 530; and to operate impulsing relay 310. Relay 310 at contacts 313 completes a circuit to illuminate lamp 332, also at contacts 313 prepares alarm circuits as previously described, and at contacts 312 completes the following circuit to operate flight reset relay 280: negative battery, contacts 312, conductor 238, contacts 283, lower winding of relay 280, contacts 234, and ground. Relay 280 at contacts 281 prepares the impulsing circuit, at contacts 282 completes its locking circuit, at contacts 283 opens its initial energizing circuit, at contacts 284 prepares a release circuit, including the upper winding of release relay 260 and the upper winding of relay 230 at contacts 285 opens a point in a subsequently described operating circuit of release relay 260, at contacts 286 connects the lower winding of trouble, relay 350 to conductor 277, at contacts 288 prepares a circuit for operating relay 300, and at contacts 287 opens a point in the circuit to vertical wiper 330.

Upon operating, flight reset relay 280 does not prepare certain previously described busy circuits that are prepared when date reset relay 270 is operated. Since the operating circuit of relay 320 now remains open at contacts 276 of relay 270, relay 320 is not operated as previously described. Therefore, the circuits of level busy relays, such as relay 390 are not prepared, and the relays remain unoperated to permit regular selectors to have access to indicators that are in the same date group as that selected by the reset selector. Furthermore, since the circuit of busy-guard relay 250 is open at contacts 287, the circuit arrangement for delaying the rotary operation of the reset selector while any flight selector corresponding to the selected date is engaged, is ineffective.

Directed operation of the reset selector

After operating the Flight Reset key, the operator manipulates the dial to transmit the first digit. The wipers 2901 to 2908 are raised to the level corresponding to the digit dialed, and relays 160 and 200 are operated in the manner previously described. The impulsing circuit differs from the circuit previously traced for operating the vertical magnet only in that the circuit now includes contacts 281 rather than contacts 271. At the conclusion of the series of impulses, slow-releasing relay 160 releases and then relay 200 releases to operate transfer relay 150 in the manner described for the date resetting operation. The operation of the reset converter at this time differs from that of the previous description in that the open circuit at contacts 276 prevents the operation of relays 300, 320, and 170; and thus prevents the automatic operation of impulsing relay 310.

Directed operation of a reset connector

In response to dialing the second digit, rotary magnet 199 steps wipers 2901 to 2908 to the set of contacts for seizing the desired reset connector, for example Reset Connector, Figure 29. Upon releasing at the conclusion of the second digit, relays 160 and 200 complete the operation of transfer relay 140, which connects the impulsing circuit to vertical magnet 2930.

Vertical magnet 2930 of the reset connector receives impulses to raise wipers 2931 to 2937 to the level corresponding to the third digit dialed.

Transfer relay 130 operates at the conclusion of the transmission of the third digit in the manner previously described and, in addition to transferring the impulsing circuit to the rotary magnet 2938, prepares at contacts 136 a circuit for operating relay 300.

When the fourth digit is dialed, rotary magnet 2938 is energized to step the rotary wipers to a corresponding set of contacts, the set being connected to space indicators that are to be reset. When relay 160 releases but before relay 200 releases the following circuit is closed to operate relay 300: negative battery, winding of relay 300, conductor 317, contacts 136, conductor 318, contacts 288, conductor 314, contacts 305, conductor 266, contacts 254, contacts 201, conductor 167, contacts 162, and ground. Relay 300 at contacts 304 transfers its operating circuit to holding conductor 289, at contacts 308 disconnects the initial controlling circuit from impulsing relay 310 and at contacts 301 connects a previously traced circuit which is controlled by relay 170, at contacts 303 closes a previously traced locking circuit for maintaining relay 200 operated, and at contacts 307 prepares an operating circuit for relay 170.

*Busy test*

If the selected space indicators, as illustrated in Figure 27, are engaged by a regular connector, negative battery is applied to conductor 2946 through circuits of the regular connector. The negative battery applied through the regular connector circuits shunts relay 240 and thus prevents its immediate operation. When the indicators are no longer engaged by the regular reset connectors, relay 240 operates over the previously traced circuit including the busy lamp 2750 and ground. The resetting operation continues exactly as previously described until all space indicators of the selected flight are reset to read the initial spaces available.

*Restoration of the converter*

When all the indicators of the flight have been reset, relay 220 is operated as previously described. However, now relay 220 at contacts 222 completes the release circuit which has been prepared at contacts 284 of flight reset relay 280. Relays 180 and 230 operate over the following circuit: negative battery, upper winding of relay 180, conductor 175, contacts 222, upper winding of relay 230, contacts 284, conductor 209, wiper 183, conductor 2903, contacts 2924 of vertical off-normal springs V. O. N., and ground. Release relay 260 is shunted to prevent its operation until the connector has restored to normal. Relay 180 at contacts 183 closes an obvious locking circuit to conductor 209, at contacts 189 opens an additional point in the circuit of release magnet 177, and at contacts 182 completes a previously traced circuit for operating release magnet 2939. Relay 230 at contacts 231 closes a circuit to ensure the subsequent operation of relay 260. When wipers 2931 to 2937 of the reset connector return to normal, vertical off-normal springs V. O. N. are actuated for opening contacts 2924 to open the circuit shunting relay 260. Since relay 180 has a low resistance winding it may not remain operated through the circuit which includes the realtively high resistance of the upper winding of relay 260. In responses to the opening of the shunt circuit, the following circuit is effective to operate relay 260: ground, contacts 290 of the selector vertical off-normal springs, upper winding of relay 260, contacts 284, lower winding of relay 230, and negative battery. Upon operating relay 260 closes circuits for signalling the operator, closes the circuit to release magnet 177, and by removing ground from holding conductor 289 causes the release of relays as previously described. When the operator restores the Flight Reset key, the energizing circuit of relay 280 is opened at contacts 234, and at contacts 235 opens the circuit to restore relay 260 and also to extinguish lamp 346. Relay 260 at contacts 269 opens the circuit of release magnet 177, and at contacts 264 opens the circuit of an audible signal device to indicate that all circuits of the reset converter are restored to normal.

What is claimed is:

1. In a space reservation system, a plurality of operator positions, a display panel having numerical space indicators, each indicator visually displaying the number of available passage reservations between successive adjacent stopping points in a route including an initial starting point, intermediate stopping points and a final terminating point, said indicators arranged in groups, each group including all the indicators for a particular complete route from its initial starting point, the intermediate stopping points, and the final terminating point, controlling circuits individual to each indicator, means directively controlled from each of said positions for selecting a particular one of said groups corresponding to a particular one of said routes and for selecting particular ones of said controlling circuits of said selected group in accordance with the desired entry and departure of a passenger on the selected route, and means controlled from each position for energizing said selected controlling circuits to register the number of reservations desired by the passenger and to change the display on the corresponding indicators to show the remaining available reservations.

2. In a space reservation system, a plurality of operator positions, a display panel having numerical space indicators each indicator usually displaying the number of available passage reservations between successive adjacent stopping points in a route including an initial starting point, intermediate stopping points and a final terminating point, said indicators arranged in groups, each group including all the indicators for a particular complete route from its initial starting point, the intermediate stopping points, and the final terminating point, controlling circuits individual to each indicator, means directively controlled from each of said positions for selecting a particular one of said groups corresponding to a particular one of said routes, for selecting all of said controlling circuits of said selected group in case a passenger desires space accommodations over the entire selected route, and for selecting only particular ones of said controlling circuits of said selected group in cose a passenger desires space accommodations over only a certain portion of the selected route, and means controlled from each position for energizing said selected controlling circuits to change the display of the number of available space reservations on the corresponding indicators.

3. In a space reservation system, a plurality of clerks' positions, a plurality of local converters, means associated with each position for selecting and connecting any idle one of said converters with a calling one of said positions; means in said connected converter responsive to the successive transmission of a date code, a flight code, a departure-destination code, and a send code from said calling position for successively storing a date marking, a flight marking, a departure-destination marking, and a send marking; a sender in said connected converter for transmitting impulses corresponding to all of said markings, space indicators arranged in groups, each different group corresponding to a different date, each group arranged in sub-groups, each sub-group corresponding to a flight and containing as many space indicators as there are stopping points enroute in the corresponding flight; and means including a switch train comprising step by step selector and connector switches operated in response to said sender transmitting impulses corresponding to said date, flight and departure-destination markings to select a group of said indicators in accordance with said date marking, to select a sub-group of said indicators in said selected group in accordance with said flight marking, to select predetermined ones of said indicators in said selected sub-group in accordance with said departure-destination marking, and to operate said selected predetermined indicators in accordance with said send marking.

4. In a space reservation system, as claimed in claim 3 including operator controlled checking means for checking the proper selection of said indicators, and means effective in case the operator fails to operate said operator controlled checking means before the transmission of said send code for preventing the operation of said predetermined selected indicators.

5. In a space reservation system, as claimed in claim 3 including an alarm and timing means in said connected converter effective after a predetermined time in case said converter fails to receive transmission of codes from the calling position for operating said alarm.

6. In a space reservation system, as claimed in claim 3 including an alarm and means for operating said alarm in case of an incorrect transmission of a date code which does not exist, of a flight code which does not exist, or of a departure-destination code which does not exist.

7. In a space reservation system, as claimed in claim 3 including an impulse control switch in said converter, reserve bank contacts and cancel bank contacts in said impulse control switch marked in accordance with said send markings, means dependent upon said converter being seized for a reservation operation for operating said sender in accordance with said stored send marking to utilize said reserve bank contacts and to control the sending of the number of impulses corresponding to the desired number of reservations, and means dependent upon said converter being seized for a cancellation operation for utilizing said cancel bank contacts of said impulse control switch for, operating said sender to send a predetermined number of impulses minus a number correspond to the stored send markings corresponding to the desired number of cancellations.

8. In a space reservation system, as claimed in claim 3 including recording means and a scanning switch individual thereto, means for operating said scanning switch to successively engage said date markings, flight markings, departure point markings, destination point markings and send markings, and means for operating said recording means in accordance with said engaged markings to make a record corresponding thereto.

9. In a space reservation system, as claimed in claim 3 having limiting means associated with said converters for limiting the number of reservations that can be completed in a single operation to a predetermined number, and means associated with said limiting means effective in response to the storage of said send marking for a number of reservations greater than said predetermined number to disable said one converter, thereby, to prevent the operation of said selected preedtermined space indicators.

10. In a space reservation system as claimed in claim 9 wherein said limiting means comprises a limit key, a limit relay, and normally open contacts on said relay, means responsive to the operation of said limit key for operating said limit relay to close said contacts, and circuits completed by the closure of said contacts to permit a greater number of reservations than said predetermined number to be completed in a single operation.

11. In a space reservation system as claimed in claim 9 including a preedtermined number of send marking circuits, a plurality of said marking circuits normally effective for controlling the opeartion of said indicators and a greater plurality of said marking circuits ineffective for controlling said operation of said indicators, an alarm relay normally connected to said greater plurality of said marking circuits, and means effective in responsive to the storage of said send marking for a number of reservations greater than said predetermined number to operate said alarm relay over any one of said greater plurality of said marking circuits.

12. In a space reservation system for reserving passage space on different routes between different geopraphical destinations comprising a series of departure-destination points for each route, space indicators arranged in groups, each different group corresponding to a different route, there being a space indicator for registering the number of pasenger spaces available between adjacent ones of said points in each route, means controlled by an operator for selecting a particular one of said groups of indicators to thereby select a corresponding route, translating means common to all of said groups of indicators, means for assigning said common translating means to said selected group of indicators in response to the selection of said group of indicators, means operated by the operator in accordance with the numerical code assigned to one of said indicators as a departure point in said selected route for operating said translating means in accordance therewith and also operated by the operator in accordance with the numerical code assigned to another one of said indicators as a destination point in said selected route for operating said translating means in accordance therewith and circuit means completed by the operated translating means for selecting the space indicators corresponding to the departure point, destination point and all indicators corresponding to points therebetween, and means for thereafter operating the said selected space indicators in accordance with a desired number of passage reservations.

13. In a space reservation system, a plurality of clerks positions, a plurality of local converters, means associated with each position for selecting and connecting an idle one of said converters with a calling one of said positions, identification markings assigned to each of said positions, said markings being different for each different position for identifying such positions, means responsive to said connection for connecting the identification markings of said calling position to said connected converter, and storing means in said connected converter operated in accordance with said connected identification markings to store a position marking corresponding to said calling position.

14. In a space reservation system, a plurality of clerk's positions, sets of register relays accessible to said positions, terminals for each of said positions arranged in groups corresponding to said sets and each terminal in each of said groups corresponding to one of said relays in a corresponding set, a source of current connected to a predetermined combination of terminals in each of said groups to identify the associated position, a key at each of said positions, means responsive to the operation of said key at any one of said positions for connecting said sets of relays succesively to corresponding groups of said terminals individual to said one position, and said relays in said sets which correspond to terminals in each of said predetermined combinations for said one position operated automatically in response to said successive connections to identify said one position.

15. In a space reservation system, groups of space indicators for displaying space information, a plurality of operating circuits common to said groups, each operating circuit having access to a corresponding indicator in each of said groups, sets of register relays, relays in each set operable in combinations for registering different digits, a clerk's position having different digit keys and a check key, means for connecting successively said digit keys to different sets of said relays, the relays in each of said connected sets operating in a particular combination in response to the operation of one of said digit keys, said operated relays effective subsequently for preparing desired ones of said operating circuits, means for associating said position with a particular group of said indicators, check lamps for each of said groups, means operated in response to the operation of said check key for illuminating said check lamp corresponding to said associated group, digit check lamps, means for associating said digit check lamps with said register relays, means responsive to the repeated re-operation of said check key for illuminating successively said digit check lamps corresponding to different digits previously registered on said sets of register relays, means responsive to the final re-operation of said check key to prepare certain ones of said operating circuits in accordance with said operated digit relays, and means responsive to the subsequent operation of one of said digit keys for operating said indicators corresponding to said prepared operating circuits.

16. In a space reservation system, a clerk's position having digit keys, groups of register relays a control switch, means for connecting said position to the first group of said register relays, groups of space indicators for indicating available space, selector switches having access to said indicators, means for successively registering digits on successive groups of said register relays in response to the operation of said digit keys, means operated in response to said registration for operating said control switch in response to said registration, control circuits effective in response to the said operation of said control switch for operating certain ones of said selector switches to sequentially select a group of said indicators in accordance with the registrations on said register relays, means operated in response to a further operation of said keys for operating said selected indicators to change the indications of the available space, and a position release relay connected to said control switch and operated subsequent to said change of indication for disconnecting said position from said register relays and for restoring said operated selector switch while said indication is maintained on said indicators.

17. In a space reservation system, groups of register relays, means for operating said register relays to store digits, space indicators, means controlled by said register relays in accordance with said stored digits for selecting and operating certain ones of said indicators, a printer, a scanning switch connected to said printer and having access to said register relay, and means effective after operation of said indicators for operating said scanning switch to transmit digital impulses corresponding all to said stored digits to said printer.

18. In a flight space reservation system, space indicators arranged in groups in accordance with different flights and each flight group having an indicator corresponding to each point of departure and destination enroute on the corresponding flight, a clerk's position having control keys for controlling the selection and operation of said indicators, a plurality of marking conductors; registering means operated in response to the operation of said control keys for marking certain ones of said marking conductors to register numbers corresponding to a particular flight, the point of departure and the point of destination; means for selecting said space indicators corresponding to said previously registered numbers, marking circuits, means responsive to the operation of said control keys subsequent to the registering of said numbers for connecting said marking conductors to said marking circuits, indicator marking relays, there being an indicator marking relay for each indicator, certain ones of said indicator marking relays opearted in accordance with said previously registered numbers and said marked conductors in response to said connection of said marking conductors to said marking circuits, an operating circuit corresponding to each said operated indicator marking relay prepared for subsequently operating the corresponding ones of said selected space indicators in accordance with the number of desired reservations, and means operated in response to the operation of any one of said indicator marking relays for disconnecting said marking conductors from said marking circuits to enable reuse of said marking circuits.

19. In a space reservation system, a group of indicators; an impulse sender, means for selecting said group of indicators and for connecting said impulse sender to said selected group, a cut-off relay for each indicator, a busy test circuit individual to said group effective in response to the selection of said group for operating said sender, means for operating said selected indicators in response to the operation of said sender, means operated in response to each said operated indicator displaying a predetermined number for operating its corresponding cut-off relay to individually disconnect the corresponding indicator from said sender, a marking circuit individual to said selected group, a marking finder having access to said marking circuit, means responsive to the operation of all said cutoff relays for connecting said finder to said sender and for thereafter releasing all said cut-off relays to reconnect said selected indicators to said sender, means including said sender for thereafter operating said finder and said indicators in unison, and means operative in response to said finder encountering said marking circuit for disabling said sender to stop said indicators at a predetermined setting.

20. In a space reservation system, space indicators arranged in groups according to date and each group arranged in sub-groups according to routes, a reset converter having access to said indicators, a date reset key, means responsive to the operation of said date reset key for conditioning said converter to reset all of said indicators in any one of said groups, means in said converter responsive to the receipt of series of impulses corresponding to a given date for operating said conditioned converter to reset all of the indicators in the group corresponding to said given date, a route reset key, means responsive to the operation of said route key for conditioning said converter to reset all the indicators in any one of said sub-groups, and means in said converter effective after operation of said route key and responsive to the receipt of series of impulses corresponding to a predetermined date followed by the receipt of another series of impulses corresponding to a predetermined route for resetting all the indicators in the sub-group corresponding to said predetermined route and located in the group corresponding to said predetermined date.

21. In a space reservation system, a space indicator for displaying the number of spaces available for reservations, a stepping magnet having two windings for operating said indicator, off-normal springs for said indicator, an impulse sender, an alarm relay; a series circuit connecting said impulse sender, said alarm relay, said two windings and said off-normal springs in series; means responsive to the transmission of more than a predetermined number of impulses from said sender to said two windings over said series circuit for operating said indicator to operate said off-normal springs, and means responsive to the operation of said off-normal springs for disconnecting one of said windings from said series circuit to operate said alarm relay.

22. In a space reservation system, indicators arranged in groups, a plurality of manually operable date marking switches each corresponding to a different date, each date marking switch having a plurality of positions and each corresponding position in each date marking switch corresponding to a particular group of said indicators, manual means for operating each said date marking switch to a different position corresponding to a different group of indicators to thereby assign a different date to each group of indicators, means for registering the date of a desired registration, a date finder, means responsive to said registration for operating said finder to find said registered date, means including circuit connections between said date marking switches and said date finder in its operated position for marking the particular group of indicators corresponding to the registered date for selection, and means controlled by said marking for selecting the group of indicators corresponding to said marking to thereby select the group of indicators assigned to said registered date.

23. In a space reservation system, space indicators for numerically displaying the number of available reservations, a reserve-cancel key having a reserve position and a cancel position, means for selecting a plurality of said indicators, an impulse control switch, a sender, means for operating said sender after said selection to transmit impulses simultaneously to both said selected indicators and to said impulse control switch, means including a first wiper in said impulse control switch effective in case said key is operated to its reserve position for determining the number of impulses to be transmitted to said selected indicators, and means including a second wiper in said impulse control switch effective in case said key is operated to its cancel position for determining the number of impulses to be transmitted to said selected indicators.

24. In a space reservation system, a plurality of groups of space indicators for numerically designating the number of spaces available for space reservations on different travel routes, each group of indicators designating a particular route and each indicator designating a stopping point in its particular route, a group of departure relays common to said indicators and comprising as many relays as there are departure points in any one route, each successive departure relay corresponding to a successive departure point in each of said routes, a group of destination relays common to said indicators and comprising as many relays as there are destination points in any one route, each successive destination relay corresponding to a successive destination point in each of said routes, means for selecting a particular group of indicators corresponding to a desired route, means for operating a particular one of said departure relays corresponding to a departure point in said desired route, means for operating a particular one of said destination relays corresponding to a destination point in said desired route, contacts on said operated departure and destination relays, one or more marking circuits completed through said contacts on said operated departure and destination relays for determining the particular ones of said indicators in said selected group of indicators to be operated, and means for operating only said determined ones of said indicators in said selected group of indicators.

25. In a space reservation system, space indicators arranged in groups and each group divided into sub-groups containing a predetermined number of said indicators, a single group of indicator marking relays common to said groups of indicators, said group of indicator marking relays divided into a plurality of sub-groups corresponding in number to the number of sub-groups in any one of said indicator groups, each indicator marking relay in each sub-group corresponding to an indicator in each corresponding sub-group of indicators, means including said indicator marking relays for marking predetermined ones of said indicators in one of said groups for operation, means including an automatic switch directively operated to select and connect with a first sub-group of indicators in said one group of indicators, means effective in case an indicator in a sub-group other than said first sub-group is marked for operation by said marking relays for automatically stepping said switch to select and connect with said other sub-group, and means for operating the indicators marked by said indicator marking relays.

26. In a space reservation system, space indicators arranged in groups and each group divided into sub-groups containing a predetermined number of said indicators, a single group of indicator marking relays common to said groups of indicators, said group of indicator marking relays divided into a plurality of sub-groups corresponding in number to the number of sub-groups in any one of said indicator groups, each indicator marking relay in each sub-group corresponding to an indicator in each corresponding sub-group of indicators, means including said indicator marking relays for marking predetermined ones of said indicators in one of said groups for operation, means including an automatic switch directively operated to select and connect with a first sub-group of indicators in said one group of indicators, means for automatically stepping said switch to select and connect successively with said other sub-groups in said one group of indicators, and a sender responsive to said directive and said successive connections to said first and other sub-groups for operating the indicators marked by said indicator marking relays.

27. In a space reservation system for reserving space over different travel routes, space indicators arranged in groups for indicating available space over said routes, each group corresponding to a particular date, each group divided into a plurality of sub-groups with each sub-group corresponding to a particular route, each indicator corresponding to a stopping departure-destination point in its route, a train step-by-step of switches having access to said indicators, means for serially operating said switches in accordance with the date and the desired route to connect with one group of said indicators corresponding to the date of a desired reservation and to connect with a sub-group of said indicators of said one group corresponding to the desired route, and means for thereafter operating only certain ones of said indicators in said connected sub-group of indicators in accordance with the particular points of departure and destination in said desired route.

28. In a space reservation system as claimed in claim 27 including another switch train having access to said indicators, means for operating said other switch train to select a particular group of indicators, normally closed individual busy test circuits for each switch of a certain order of switches in said first mentioned switch train extending to a corresponding switch in said other switch train, and means in said corresponding switch in said other switch train for opening only certain ones of said individual busy test circuits dependent upon the group selected by said corresponding switch in response to its operation.

29. In a space reservation system, space indicators, a clerk's position having a cancel-reserve key and digit keys, space indicators, an impulse sender, means responsive to the operation of said cancel-reserve key to its "reserve" position and to the subsequent operation of a certain one of said digit keys for transmitting a particular number of impulses corresponding to the value of the operated digit key from said sender to said indicators to register the number of spaces to be registered, and said means effective in case said cancel-reserve key is operated to its "cancel" position and thereafter in response to a subsequent operation of the same or another one of said digit keys for transmitting from said sender a predetermined number of impulses less the number of impulses corresponding to the value of the last operated digit key to cancel on said indicators the number of spaces corresponding to said last mentioned operated digit key, an alarm circuit associated with said means, said alarm circuit completed to operate an alarm in response to the transmission of a number of impulses greater than a limited number in case said cancel-reserve key is in its "reserve" position, and said alarm circuit completed in response to the transmission of a number of impulses greater than said predetermined number in case said cancel-reserve key is in its "cancel" position.

30. In a space reservation system, space indicators, a clerk's position having a cancel-reserve key and digit keys, a plurality of digit registering relays adapted to cooperate with said clerk's position, an impulse sender, means responsive to the operation of said cancel-reserve key to its "reserve" position and to the subsequent operation of certain ones of said digit keys for operating the corresponding ones of said register relays to store a digit corresponding to the operated digit keys, means controlled by the operated register relays and by said key in "reserve" position for transmitting a particular number of impulses corresponding to the value of the stored digit and the operated digit key from said sender to said indicators to register the number of spaces to be reserved, and the operation of said cancel-reserve key to its "cancel" position and the subsequent operation of the same or another one of said digit keys operating said digit registering relays to store a digit corresponding in value to the last operated digit key, and said transmitting means controlled by said last operated registering relays and by said key in a "cancel" position for transmitting a predetermined number of impulses less the number of impulses corresponding to the value of the last stored digit to ultimately cancel on said indicators the number of spaces corresponding to the last mentioned operated digit key.

31. In a space reservation system, a plurality of operator positions, a display panel having space indicators, each indicator corresponding to passage reservations between successive adjacent stopping points in a route including an initial starting point, intermediate points and a final terminating point, said indicators arranged in groups, each group including all the indicators for a particular complete route from its initial starting point, the intermediate stopping points, and the final terminating points, a plurality of translating means some idle and some busy common to said plurality of operator positions, selecting means for selecting and connecting with and idle one of said translating means, and means at each operator's position for controlling said selected translating means for selecting a desired group of indicators corresponding to the entry and departure points along a route, and means included in said selected translating means controlled from said operator's position for operating selected said indicators.

32. In a space reservation system, an operator's position, groups of space indicators divided into panels and each panel corresponding to a different date, each panel having a plurality of groups of indicators and each group of indicators corresponding to a route, each indicator in each group corresponding to succsesive departure and destination points, an impulse sender, means controlled from said position for operating said impulse sender according to the particular date, route and number of reservations desired, means operated by said impulse sender for selecting in accordance with said desired date and route the group of desired indicators and other means controlled from said position for selecting the particular indicators in a route corresponding to a desired departure point and destination point to be operated by said impulse sender according to the number of reservations desired.

IMRE MOLNAR.

References Cited in the file of this patent

UNITED STATES PATENTS

| Number | Name | Date |
|---|---|---|
| 579,473 | Davidson et al. | Mar. 23, 1897 |
| 1,523,429 | Keckler et al. | Jan. 20, 1925 |
| 1,958,208 | Scheidegger | May 8, 1934 |
| 1,986,972 | Hershey | Jan. 8, 1935 |
| 2,096,819 | Myers | Oct. 26, 1937 |
| 2,432,324 | May | Dec. 9, 1947 |
| 2,446,037 | Ammann et al. | July 27, 1948 |
| 2,478,361 | Bartelink | Aug. 9, 1949 |
| 2,481,780 | Preston et al. | Sept. 13, 1949 |
| 2,568,756 | McWhirter et al. | Sept. 25, 1951 |
| 2,594,960 | May | Apr. 29, 1952 |
| 2,611,813 | Sharpless | Sept. 23, 1952 |